(12) United States Patent
Wu et al.

(10) Patent No.: US 7,989,670 B2
(45) Date of Patent: Aug. 2, 2011

(54) PROCESS TO PRODUCE HIGH VISCOSITY FLUIDS

(75) Inventors: Margaret May-Som Wu, Skillman, NJ (US); Catalina L. Coker, Baytown, TX (US); John F. Walzer, Jr., Seabrook, TX (US); Peijun Jiang, League City, TX (US); Steven P. Rucker, Warren, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 1002 days.

(21) Appl. No.: 11/656,208

(22) Filed: Jan. 22, 2007

(65) Prior Publication Data

US 2008/0177121 A1 Jul. 24, 2008

Related U.S. Application Data

(63) Continuation-in-part of application No. 11/483,313, filed on Jul. 7, 2006, now abandoned.

(60) Provisional application No. 60/700,600, filed on Jul. 19, 2005.

(51) Int. Cl.
*C07C 2/08* (2006.01)

(52) U.S. Cl. ........ 585/523; 585/250; 585/254; 585/255; 585/500; 585/502; 585/520; 585/521; 585/522; 585/525; 585/530; 585/532

(58) Field of Classification Search .................. 585/521, 585/522, 523, 502, 250, 254, 255, 520, 500, 585/525, 530, 532
See application file for complete search history.

(56) References Cited

U.S. PATENT DOCUMENTS

| | | | |
|---|---|---|---|
| 2,978,442 A | 4/1961 | Brightbill et al. |
| 3,149,178 A | 9/1964 | Hamilton et al. |
| 3,164,578 A | 1/1965 | Baker et al. |
| 3,382,291 A | 5/1968 | Brennan |
| 3,742,082 A | 6/1973 | Brennan |
| 3,769,363 A | 10/1973 | Brennan |
| 3,780,128 A | 12/1973 | Shubkin |
| 3,876,720 A | 4/1975 | Heilman et al. |
| 3,883,417 A | 5/1975 | Woo et al. |
| 4,016,349 A | 4/1977 | McKenna |
| 4,132,663 A | 1/1979 | Heilman et al. |
| 4,149,178 A | 4/1979 | Estes |
| 4,172,855 A | 10/1979 | Shubkin et al. |
| 4,180,575 A | 12/1979 | Rochling et al. |
| 4,239,930 A | 12/1980 | Allphin et al. |
| 4,263,465 A | 4/1981 | Sheng et al. |
| 4,263,712 A | 4/1981 | Schroder |
| 4,367,352 A | 1/1983 | Watts, Jr. et al. |
| 4,413,156 A | 11/1983 | Watts, Jr. et al. |
| 4,434,408 A | 2/1984 | Baba et al. |
| 4,451,684 A | 5/1984 | Pasky |
| 4,469,912 A | 9/1984 | Blewett et al. |
| 4,587,368 A | 5/1986 | Pratt |
| 4,701,489 A | 10/1987 | Hughes et al. |
| 4,704,491 A | 11/1987 | Tsutsui et al. |
| 4,827,064 A | 5/1989 | Wu |
| 4,827,073 A | 5/1989 | Wu |
| 4,892,851 A | 1/1990 | Ewen et al. |
| 4,910,355 A | 3/1990 | Shubkin et al. |
| 4,912,272 A | 3/1990 | Wu |
| 4,914,254 A | 4/1990 | Pelrine |
| 4,926,004 A | 5/1990 | Pelrine et al. |
| 4,950,822 A | 8/1990 | Dileo et al. |
| 4,956,122 A | 9/1990 | Watts et al. |
| 4,962,262 A | 10/1990 | Winter et al. |
| 4,967,032 A | 10/1990 | Ho et al. |
| 4,990,709 A | 2/1991 | Wu |
| 4,990,771 A | 2/1991 | Minoura et al. |
| 5,012,020 A | 4/1991 | Jackson et al. |
| 5,017,299 A | 5/1991 | Gutierrez et al. |
| 5,017,714 A | 5/1991 | Welborn, Jr. |
| 5,068,487 A | 11/1991 | Theriot |
| 5,087,788 A | 2/1992 | Wu |
| 5,177,276 A | 1/1993 | Beach et al. |
| 5,186,851 A | 2/1993 | Gutierrez et al. |
| 5,188,724 A | 2/1993 | Heilman et al. |
| 5,220,100 A | 6/1993 | Massie et al. |
| 5,264,642 A | 11/1993 | Wu |
| 5,369,196 A | 11/1994 | Matsumoto et al. |
| 5,382,739 A | 1/1995 | Atkins et al. |
| 5,462,995 A | 10/1995 | Hosaka et al. |
| 5,498,815 A | 3/1996 | Schaerfl, Jr. et al. |
| 5,552,504 A | 9/1996 | Bennett et al. |
| 5,637,400 A | 6/1997 | Brekner et al. |

(Continued)

FOREIGN PATENT DOCUMENTS

EP 0 277 004 8/1988

(Continued)

OTHER PUBLICATIONS

TIBA data, "TIBA datasheet" available on-line at www.albemarle. com on Aug. 26, 2010.*
Wills, J.G., "*Synthetic Lubricants*," Lubrication Fundamentals, Marcel Dekker Inc., New York, 1980, pp. 75-80.
U.S. Appl. No. 60/700,600, filed Jul. 19, 2005, Wu et al.
U.S. Appl. No. 60/700,603, filed Jul. 19, 2005, Wu et al.
J. Brennan, "*Wide-Temperature Range Synthetic Hydrocarbon Fluids*", Ind. Eng. Chem. Prod. Res. Dev., 1980, vol. 19, pp. 2-6.
K. Denbigh, "*The Kinetics of Continuous Reaction Processes: Application to Polymerization*", J. Applied Chem, 1951, vol. 1, pp. 227-236.
K. Denbigh, "*Continuous Reactions: Part II. The Kinetics of Steady State Polymerisation*", Trans Faraday Soc., 1947, vol. 43, pp. 648-660.

(Continued)

*Primary Examiner* — In Suk Bullock
*Assistant Examiner* — Bradley Etherton
(74) *Attorney, Agent, or Firm* — Nancy T. Krawczyk; Catherine L. Bell

(57) ABSTRACT

This invention relates to processes to produce liquid poly-alpha-olefins (PAOs) having a kinematic viscosity at 100° C. of more than 20 cSt in the presence of a metallocene catalyst with a non-coordinating anion activator and hydrogen.

69 Claims, 6 Drawing Sheets

U.S. PATENT DOCUMENTS

| | | | |
|---|---|---|---|
| 5,679,812 A | 10/1997 | Winter et al. | |
| 5,688,887 A | 11/1997 | Bagheri et al. | |
| 5,690,832 A | 11/1997 | Tavlarides et al. | |
| 5,731,254 A | 3/1998 | Winter et al. | |
| 5,811,379 A | 9/1998 | Rossi et al. | |
| 5,846,896 A | 12/1998 | Ewen | |
| 5,852,143 A | 12/1998 | Sishta et al. | |
| 5,859,159 A * | 1/1999 | Rossi et al. | 526/170 |
| 6,043,401 A * | 3/2000 | Bagheri et al. | 585/12 |
| 6,087,307 A | 7/2000 | Kaminski et al. | |
| 6,133,209 A | 10/2000 | Rath et al. | |
| 6,147,271 A | 11/2000 | Strebel et al. | |
| 6,180,575 B1 | 1/2001 | Nipe | |
| 6,388,032 B1 | 5/2002 | Yamaura et al. | |
| 6,414,090 B2 | 7/2002 | Minami et al. | |
| 6,414,091 B2 | 7/2002 | Moritomi et al. | |
| 6,479,722 B1 | 11/2002 | De Wet et al. | |
| 6,548,724 B2 | 4/2003 | Bagheri et al. | |
| 6,642,169 B2 * | 11/2003 | Weatherhead | 502/118 |
| 6,646,174 B2 | 11/2003 | Clarembeau | |
| 6,706,828 B2 | 3/2004 | DiMaio | |
| 6,713,438 B1 | 3/2004 | Baillargeon et al. | |
| 6,824,671 B2 | 11/2004 | Goze et al. | |
| 6,858,767 B1 | 2/2005 | DiMaio et al. | |
| 6,960,700 B1 | 11/2005 | Sethna et al. | |
| 7,060,768 B2 | 6/2006 | Brookhart et al. | |
| 7,129,197 B2 | 10/2006 | Song et al. | |
| 7,473,815 B2 | 1/2009 | Lambert et al. | |
| 7,544,850 B2 | 6/2009 | Goze et al. | |
| 7,547,811 B2 | 6/2009 | Kramer et al. | |
| 7,592,497 B2 | 9/2009 | Yang et al. | |
| 7,601,256 B2 | 10/2009 | Beall | |
| 2001/0041817 A1* | 11/2001 | Bagheri et al. | 585/517 |
| 2001/0041818 A1 | 11/2001 | Bagheri et al. | |
| 2003/0055184 A1* | 3/2003 | Song et al. | 526/160 |
| 2004/0022508 A1 | 2/2004 | Belardi et al. | |
| 2004/0033908 A1 | 2/2004 | Deckman et al. | |
| 2004/0087746 A1 | 5/2004 | Razavi | |
| 2004/0097772 A1 | 5/2004 | Deckers et al. | |
| 2004/0147693 A1* | 7/2004 | DiMaio | 526/160 |
| 2004/0220359 A1 | 11/2004 | Abhari et al. | |
| 2004/0230016 A1 | 11/2004 | Blackborow et al. | |
| 2005/0059563 A1 | 3/2005 | Sullivan et al. | |
| 2005/0101761 A1 | 5/2005 | Lambert et al. | |
| 2005/0183988 A1 | 8/2005 | Freerks et al. | |
| 2007/0000807 A1 | 1/2007 | Wu et al. | |
| 2007/0011832 A1 | 1/2007 | Keidel et al. | |
| 2007/0043248 A1 | 2/2007 | Wu et al. | |
| 2007/0208151 A1 | 9/2007 | Okada et al. | |
| 2009/0005279 A1 | 1/2009 | Wu et al. | |
| 2009/0156874 A1 | 6/2009 | Patil et al. | |
| 2009/0281360 A1 | 11/2009 | Knowles et al. | |
| 2010/0069687 A1 | 3/2010 | Kosover et al. | |

FOREIGN PATENT DOCUMENTS

| | | |
|---|---|---|
| EP | 0 349 276 | 1/1990 |
| EP | 0 377 306 | 7/1990 |
| EP | 0 403 866 | 12/1990 |
| EP | 0 321 852 | 12/1991 |
| EP | 0 613 873 | 9/1994 |
| EP | 0 680 942 | 11/1995 |
| EP | 0 284 708 | 1/1996 |
| EP | 0 513 380 | 10/1997 |
| EP | 0 930 320 | 7/1999 |
| EP | 0 992 517 | 4/2000 |
| EP | 1 028 128 | 8/2000 |
| EP | 1 309 633 | 5/2003 |
| EP | 1 342 707 | 9/2003 |
| EP | 1607415 A1 * | 12/2005 |
| GB | 938069 | 9/1963 |
| IN | 191553 | 12/2003 |
| JP | 6336590 | 12/1994 |
| JP | 2001 323015 | 10/2001 |
| JP | 2005-200446 | 7/2005 |
| WO | WO 96/23751 | 8/1996 |
| WO | WO 99/67347 | 12/1999 |
| WO | 00/58423 | 10/2000 |
| WO | WO 02/14384 | 2/2002 |
| WO | 03/009136 | 1/2003 |
| WO | 03/051943 | 6/2003 |
| WO | 03/071369 | 8/2003 |
| WO | 03/104292 | 12/2003 |
| WO | 2004/046214 | 6/2004 |
| WO | 2007/011462 | 1/2007 |
| WO | 2007/011832 | 1/2007 |
| WO | 2007/011973 | 1/2007 |
| WO | WO 2007/005094 | 1/2007 |
| WO | WO 2007/011459 | 1/2007 |
| WO | 2007/145924 | 12/2007 |
| WO | 2007/146081 | 12/2007 |
| WO | 2008/010862 | 1/2008 |
| WO | 2008/010865 | 1/2008 |
| WO | 2009/017953 | 2/2009 |
| WO | 2009/137264 | 11/2009 |

OTHER PUBLICATIONS

A. Munoz-Escalona et al., "Single-Site Supported Catalysts for Ethylene Polymerization", Metallocene Tech., 1999, pp. 2242-2246.

Z. Fan et al., "Effect Of Ethoxy- And Methoxysilane Donors In Propene/1-Hexene Copolymerization With High-Yield Supported Ziegler-Natta Catalysts", Macromolecular Chemistry and Physics, 1994, vol. 195, pp. 3889-3899.

G. Gokel ed, Dean's Handbook of Organic Chemistry, 2nd Edition, McGraw-Hill, 2004, available on-line at hhtp://knovel.com.

M. LeVan et al. "Adsorption and Ion Exchange" Perry's Chemical Engineer's Handbook, 7th ed. 1997 pp. 16-1-16-66.

O. Levenspiel, "Ch. 7 Design for Multiple Reactions", Chemical Reaction Engineering, 2nd ed., 1972, pp. 196-209.

N. Naga et al., "Effect Of Co-Catalyst System On a-Olefin Polymerization With Rac- And Meso-[Dimethylsilylenebis(2,3,5-Trimethyl-Cyclopentadienyl)]Zirconium Dichloride", Macromol. Rapid Commun., 1997, vol. 18, pp. 581-589.

N. Naga et al, "Polymerization Behavior Of a-Olefins With Rac- And Meso-Type Ansa-Metallocene Catalysts: Effects Of Cocatalyst And Metallocene Ligand", Macromolecular Chemistry Physics, 1999, vol. 200, pp. 1587-1594.

F. Rodriguez, "The Molecular Weight of Polymers", Principles of Polymer Systems, 1970, Chapter 6, pp. 115-144.

M. Sacchi et al., "Use of Different Alkoxysilanes As External Donors In $MgCl_2$-Supported Ziegler-Natta Catalysts To Obtain Propene/1-Butene Copolymers With Different Microstructure", Macromolecular Chemistry and Physics, 1994, vol. 195, pp. 2805-2816.

T. Seraidaris et al., "High-Molar-Mass Polypropene with Tunable Elastic Properties by Hafnocene/Borate Catalysts", Journal of Polymer Science: Part A: Polymer Chemistry, 2006, vol. 44, pp. 4743-4751.

"Mobil Releases SuperSyn PAOs", Lubrication Engineers, 1999, vol. 55, Part 8, pp. 45.

* cited by examiner

US 7,989,670 B2

PROCESS TO PRODUCE HIGH VISCOSITY FLUIDS

PRIORITY CLAIM FOR PCT

This invention claims priority to U.S. Ser. No. 11/489,313, filed Jul. 19, 2006.

PRIORITY CLAIM FOR US

This invention claims priority, and is a continuation-in-part, to U.S. Ser. No. 11/483,313, filed Jul. 7, 2006, which claims the benefit of U.S. Ser. No. 60/700,600, filed on Jul. 19, 2005.

FIELD OF THE INVENTION

This invention relates to a process to produce poly-alpha-olefins (PAOs) in the presence of a metallocene catalyst with a non-coordinating anion activator and hydrogen.

DESCRIPTION OF RELATED ART

Efforts to improve upon the performance of natural mineral oil-based lubricants by the synthesis of oligomeric hydrocarbon fluids have been the subject of important research and development in the petroleum industry for at least fifty years. These efforts have led to the relatively recent market introduction of a number of synthetic lubricants. In terms of lubricant property improvement, the thrust of the industrial research efforts involving synthetic lubricants has been towards fluids exhibiting useful viscosities over a wide temperature range, i.e., improved viscosity index (VI), while also showing lubricities, thermal stabilities, oxidative stabilities and pour points equal to or better than those for mineral oil.

The viscosity-temperature relationship of a lubricating oil is one of the main criteria considered when selecting a lubricant for a particular application. The mineral oils commonly used as a base for single and multigrade lubricants exhibit a relatively large change in viscosity with a change in temperature. Fluids exhibiting such a relatively large change in viscosity with temperature are said to have a low viscosity index (VI). VI is an empirical number which indicates the rate of change in the viscosity of an oil within a given temperature range. A high VI oil, for example, will thin out at elevated temperatures more slowly than a low VI oil. Usually, a high VI oil is more desirable because it has higher viscosity at higher temperature, which translates into better lubrication and better protection of the contacting machine elements, preferably at high temperatures and or at temperatures over a wide range. VI is calculated according to ASTM method D 2270.

Good low temperature properties of a lubricant are also important if the lubricant is expected to provide lubrication at low temperature environment. These low temperature properties can be measured by pour points of pure fluids according to ASTM D 97, by low temperature Brookfield viscosities of pure or blended fluids according to ASTM D 2983, or other appropriate method such as Cold Cranking Simulator viscosity (CCS), etc. Good shear stability of a lubricant is also becoming more important as newer equipment or engines are often operated under more severe conditions. Shear stability of a pure fluid or lubricant blends can be measured by many methods, such as sonic shear test according to ASTM D 2603 method or tapered roller bearing (TRB) shear test according to CEC L-45-T/A to D methods, etc.

PAOs comprise a class of hydrocarbons manufactured by the catalytic oligomerization (polymerization to low-molecular-weight products) of linear α-olefin (LAO) monomers. These typically range from 1-octene to 1-dodecene, with 1-decene being a preferred material, although oligomeric copolymers of lower olefins such as ethylene and propylene may also be used, including copolymers of ethylene with higher olefins as described in U.S. Pat. No. 4,956,122 and the patents referred to therein. PAO products have achieved importance in the lubricating oil market. Typically there are two classes of synthetic hydrocarbon fluids (SHF) produced from linear alpha-olefins, the two classes of SHF being denoted as PAO and HVI-PAO (high viscosity index PAO's). PAO's of different viscosity grades are typically produced using promoted $BF_3$ or $AlCl_3$ catalysts.

Specifically, PAOs may be produced by the polymerization of olefin feed in the presence of a catalyst such as $AlCl_3$, $BF_3$, or promoted $AlCl_3$, $BF_3$. Processes for the production of PAOs are disclosed, for example, in the following patents: U.S. Pat. Nos. 3,149,178; 3,382,291; 3,742,082; 3,769,363; 3,780,128; 4,172,855 and 4,956,122, which are fully incorporated by reference. PAOs are also discussed in: Will, J. G. Lubrication Fundamentals, Marcel Dekker: New York, 1980. Subsequent to polymerization, the PAO lubricant range products are typically hydrogenated in order to reduce the residual unsaturation, generally to a level of greater than 90% of hydrogenation. High viscosity PAO's may be conveniently made by the polymerization of an alpha-olefin in the presence of a polymerization catalyst such as Friedel-Crafts catalysts. These include, for example, boron trifluoride, aluminum trichloride, or boron trifluoride, promoted with water, with alcohols such as ethanol, propanol, or butanol, with carboxylic acids, or with esters such as ethyl acetate or ethyl propionate or ether such as diethyl ether, diisopropyl ether, etc. (See for example, the methods disclosed by U.S. Pat. No. 4,149,178 or U.S. Pat. No. 3,382,291.) Other descriptions of PAO synthesis are found in the following U.S. Pat. No. 3,742,082 (Brennan); U.S. Pat. No. 3,769,363 (Brennan); U.S. Pat. No. 3,876,720 (Heilman); U.S. Pat. No. 4,239,930 (Allphin); U.S. Pat. No. 4,367,352 (Watts); U.S. Pat. No. 4,413,156 (Watts); U.S. Pat. No. 4,434,408 (Larkin); U.S. Pat. No. 4,910,355 (Shubkin); U.S. Pat. No. 4,956,122 (Watts); and U.S. Pat. No. 5,068,487 (Theriot).

Another class of HVI-PAOs may be prepared by the action of a supported, reduced chromium catalyst with an alpha-olefin monomer. Such PAOs are described in U.S. Pat. No. 4,827,073 (Wu); U.S. Pat. No. 4,827,064 (Wu); U.S. Pat. No. 4,967,032 (Ho et al.); U.S. Pat. No. 4,926,004 (Pelrine et al.); and U.S. Pat. No. 4,914,254 (Pelrine). Commercially available PAOs include SpectraSyn™ 2, 4, 5, 6, 8, 10, 40, 100 and SpectraSyn Ultra™ 150, SpectraSyn Ultra™ 300, SpectraSyn Ultra™ 1000, etc. (ExxonMobil Chemical Company, Houston, Tex.).

Synthetic PAOs have found wide acceptance and commercial success in the lubricant field for their superiority to mineral based lubricants. In terms of lubricant property improvement, industrial research efforts on synthetic lubricants have led to PAO fluids exhibiting useful viscosities over a wide range of temperature, i.e., improved viscosity index, while also showing lubricity, thermal stability, oxidative stability and pour point equal to or better than mineral oil. These relatively new synthetic lubricants lower mechanical friction, enhancing mechanical efficiency over the full spectrum of mechanical loads and do so over a wider range of operating conditions than mineral oil lubricants.

Performance requirements of lubricants are becoming increasingly stringent. New PAOs with improved properties, such as high viscosity index (VI), low pour point, reduced volatility, high shear stability, improved wear performance, increased thermal stability, oxidative stability, and/or wider viscosity range, are needed to meet new performance requirements for lubricants. New methods to provide such new PAOs with improved properties are also needed.

Efforts have been made to prepare various PAOs using metallocene catalyst systems. Examples include U.S. Pat. No. 6,706,828 (equivalent to US 2004/0147693), where PAOs are produced from meso-forms of certain metallocene catalysts under high hydrogen pressure with methyl alumoxane as an activator. Comparative example D of U.S. Pat. No. 6,706,828, however, uses rac-dimethylsilylbis(2-methyl-indenyl)zirconium dichloride in combination with methylalumoxane (MAO) at 100° C. in the presence of hydrogen to produce polydecene. Likewise, WO 02/14384 discloses, among other things, in examples J and K the use of rac-ethyl-bis(indenyl) zirconium dichloride or rac-dimethylsilyl-bis(2-methyl-indenyl)zirconium dichloride in combination with MAO at 40° C. (at 200 psi hydrogen or 1 mole of hydrogen) to produce isotactic polydecene reportedly having a Tg of −73.8° C., a $KV_{100}$ of 702 cSt, and a VI of 296; or to produce polydecene reportedly having a Tg of −66° C., a $KV_{100}$ of 1624, and a VI of 341, respectively. Further WO 99/67347 discloses in Example 1 the use of ethylidene bis(tetrahydroindenyl)zirconium dichloride in combination with MAO at 50° C. to produce a polydecene reportedly having an $M_n$ of 11,400 and 94% vinylidene double bond content.

Others have made various PAOs, such as polydecene, using various metallocene catalysts not typically known to produce polymers or oligomers with any specific tacticity. Examples include WO 96/23751, EP 0 613 873, U.S. Pat. No. 5,688,887, U.S. Pat. No. 6,043,401, WO 03/020856 (equivalent to US 2003/0055184), U.S. Pat. No. 5,087,788, U.S. Pat. No. 6,414,090, U.S. Pat. No. 6,414,091, U.S. Pat. No. 4,704,491, U.S. Pat. No. 6,133,209, and U.S. Pat. No. 6,713,438.

To date however, PAO's made with metallocenes have not found wide application in the marketplace, particularly the lubricant marketplace, due to inefficient process, manufacturing processes, high costs and/or property deficits. The instant invention addresses such and other needs by providing new PAO's having excellent property combinations and an improved process to produce them.

U.S. Pat. No. 6,548,724 (equivalent to US 2001/0041817 and U.S. Pat. No. 6,548,723) discloses production of oligomer oils using certain metallocene catalysts, typically in combination with methyl alumoxane. In column 20, lines 40 to 44 of U.S. Pat. No. 6,548,724, Examples 10-11 indicate that di-, tri-, or tetra-substitutions on the cyclopentadienyl rings of the metallocenes are useful for production of high viscosity polyalphaolefins, (viscosities in the range of 20 to 5000 cSt at 100° C.) with improved yields whereas penta-alkyl-substituted cyclopentadienyl rings are poor." Further examples 12 and 13 show production of polydecenes in the absence of hydrogen with reported KV100's of 154 and 114.6. Additionally Examples 14—discloses polymerization of decene with $Cp_2ZrMe_2$ or $(iPr—Cp)_2ZrCl_2$ with N,N-dimethylanalinium tetra(phenyl)borate at 100° C. or 110° C. to produce polydecenes with reported KV100's of from 5.3 to 11.4 cSt.

PCT/US06/21231 filed Jun. 2, 2006 claiming the benefit of U.S. Ser. No. 60/700,600, filed Jul. 19, 2005 describes the production of liquids from monomers having 5 to 24 carbon atoms using racemic metallocenes and non-coordinating anion activators.

Other references of interest include: EP0284708, U.S. Pat. No. 5,846,896, U.S. Pat. No. 5,679,812, EP0321852, U.S. Pat. No. 4,962,262 EP0513380, US2004/0230016, and U.S. Pat. No. 6,642,169.

SUMMARY OF INVENTION

This invention relates to a process to produce a polyalphaolefin having a $KV_{100}$ of greater than 20 cSt to about 10,000 cSt comprising:
contacting one or more alpha-olefin monomers having 3 to 24 carbon atoms with an unbridged substituted bis(cyclopentadienyl) transition metal compound represented by the formula:

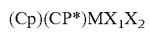

$(Cp)(CP^*)MX_1X_2$ wherein:
M is the metal center, and is a Group 4 metal;
Cp and Cp* are the same or different cyclopentadienyl rings that are each bonded to M, and both Cp and Cp* are substituted with at least one non-hydrogen substituent R group or 2) Cp is substituted with from two to five substituent R groups, each substituent group R being, independently, a radical group which is a hydrocarbyl, substituted hydrocarbyl, halocarbyl, substituted halocarbyl, silylcarbyl or germylcarbyl, or Cp and Cp* are the same or different cyclopentadienyl rings in which any two adjacent R groups are optionally joined to form a substituted or unsubstituted, saturated, partially unsaturated, or aromatic cyclic or polycyclic substituent;
$X_1$ and $X_2$ are, independently, hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand; and
a non-coordinating anion activator, and optionally an alkyl-aluminum compound, where the molar ratio of transition metal compound to activator is 10:1 to 0.1:1, and if the alkyl aluminum compound is present then the molar ratio of alkyl aluminum compound to transition metal compound is 1:4 to 4000:1, under polymerization conditions wherein:
  i) hydrogen is present at a partial pressure of 0.1 to 300 psi, based upon the total pressure of the reactor or the concentration of the hydrogen is from 1 to 30,000 ppm or less by weight;
  ii) wherein the alpha-olefin monomer(s) having 3 to 24 carbon atoms are present at 10 wt % or more based upon the total wt of the catalyst/activator/alkylaluminum compound solutions, monomers, and any diluents or solvents present in the reaction;
  iii) provided that ethylene is not present at more than 40 wt % of the monomers entering the reactor.

R=0.98993 (Examples 1 through 9, Table 1). ◇ Dimer selectivity by methods of U.S. Pat. No. 6,548,724, y=231.55*x^(-0.90465) R=0.93734.

Figure 3:
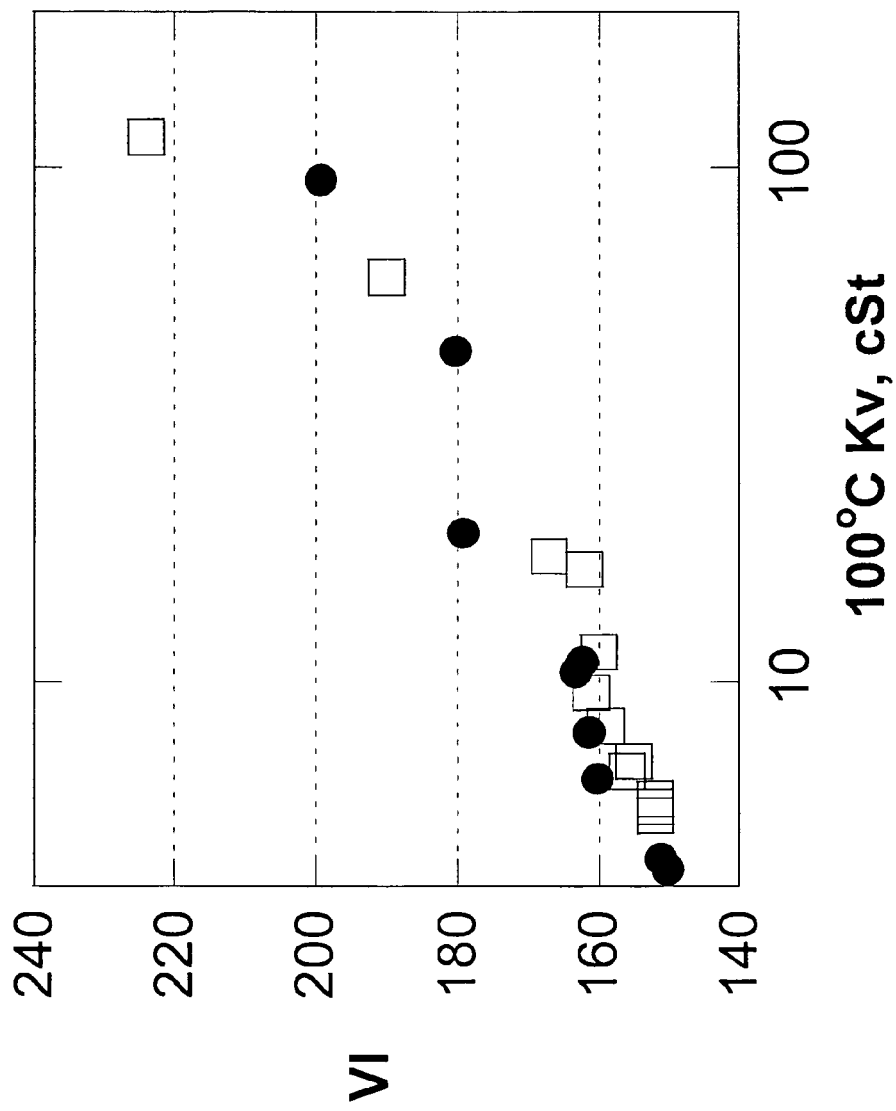

FIG. 3 represents VI of fluids made by the present invention versus those disclosed in U.S. Pat. No. 6,548,742. ● represents the VI's of experiments 1 through 9 in Table 1. □ represents VI's of materials prepared in U.S. Pat. No. 6,548,742.

Figure 4:
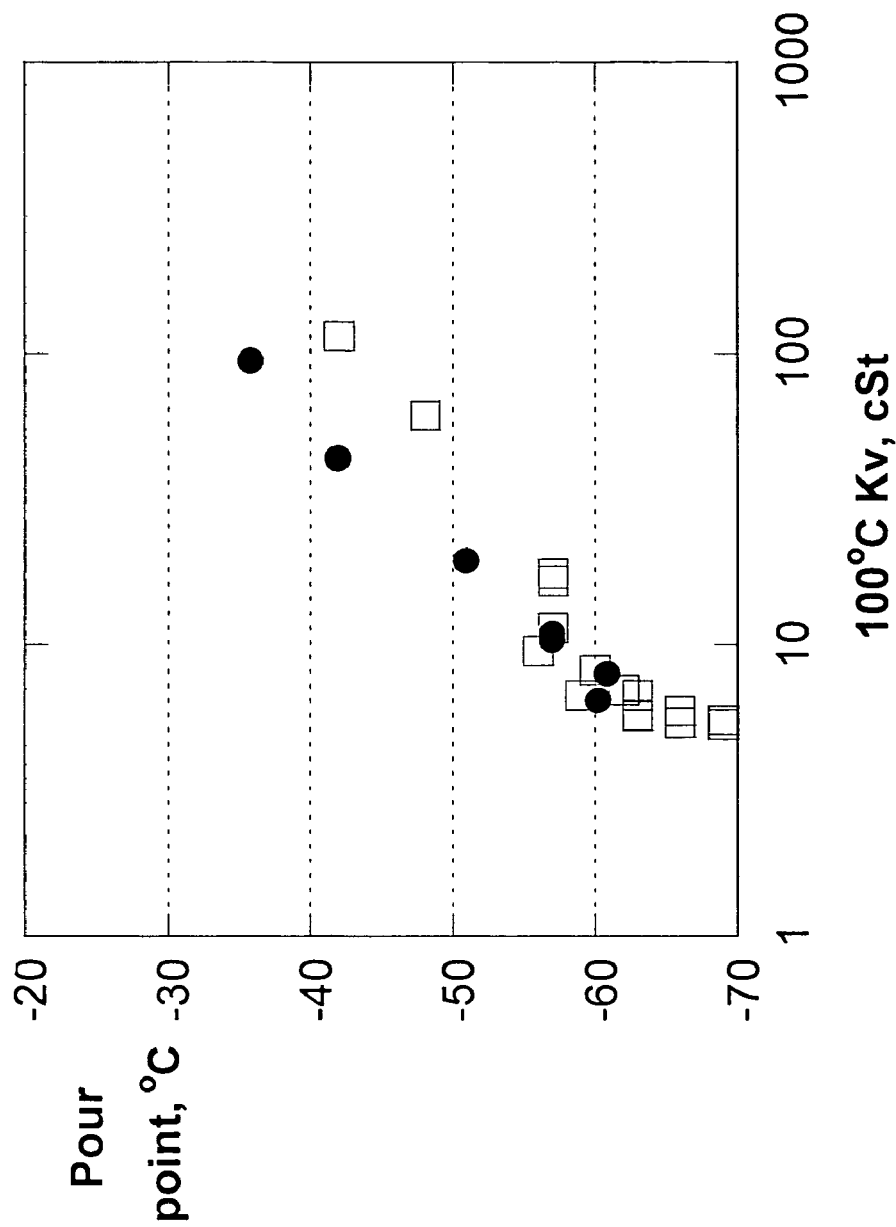

FIG. 4 provides pour points of PAO fluids made by the present invention versus materials prepared in U.S. Pat. No. 6,548,742. ● represents the pour point of experiments 1 through 9 in Table 1. □ represents pour point of materials prepared in U.S. Pat. No. 6,548,742.

Figure 5:
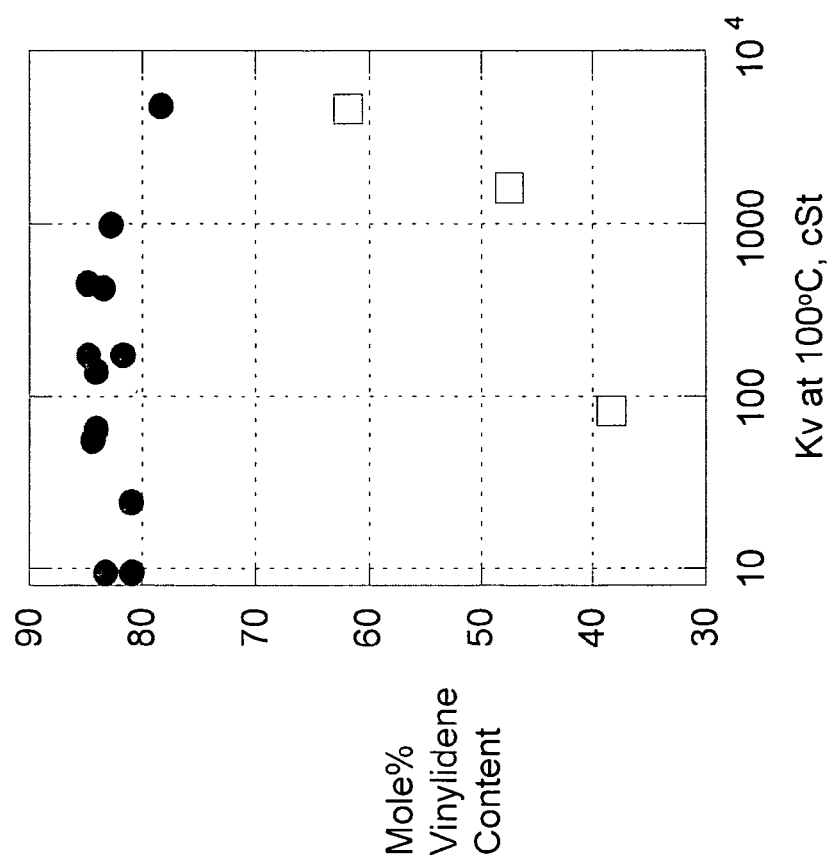

FIG. 5 provides vinylidene content of examples 10 through 21 (Table 3) versus comparative examples 14 through 17 (Table 4). ● represents values of examples 10 to 21 in Table 3, poly-1-butenes by Catalyst A or B activated by NCA. □ represents comparative Examples 14 to 17 in Table 4, poly-1-butene by Catalyst B activated by MAO.

Figure 6:
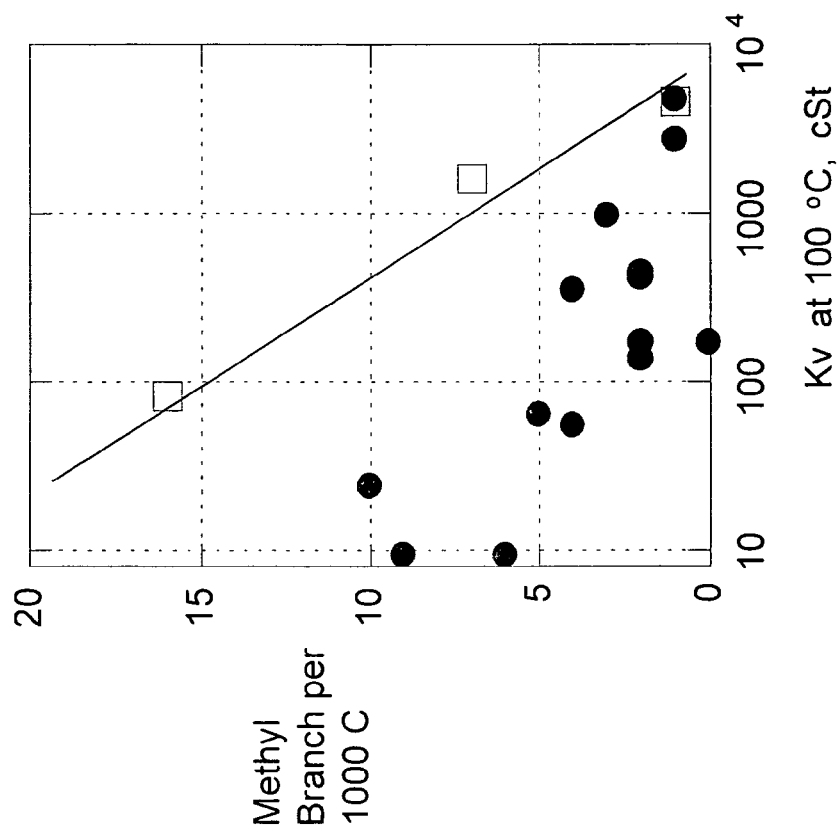

FIG. 6 provides branch methyl content of examples 10 through 21 (Table 3) versus comparative examples 14 through 17 (Table 4). ● represents values of examples 10 to 21 in Table 3, poly-1-butenes by Catalyst A or B activated by NCA. □ represents comparative Examples 14 to 17 in Table 4, poly-1-butene by Catalyst B activated by MAO. The line is depicted as y=-3.4309Ln(x)+29.567, y=methyl branch per 1000 C, x=Kv at 100° C. in cSt.

DETAILED DESCRIPTION OF THE INVENTION

As used herein, the new numbering scheme for the Periodic Table of the Elements is used as set out in CHEMICAL AND ENGINEERING NEWS, 63(5), 27 (1985).

Unless otherwise stated all pressures in psi are psig.

For purposes of this invention and the claims thereto, when a polymer or oligomer is referred to as comprising an olefin, the olefin present in the polymer or oligomer is the polymerized or oligomerized form of the olefin, respectively. Likewise the use of the term polymer is meant to encompass homopolymers and copolymers, where copolymers include any polymer having two or more chemically distinct monomers. Likewise the use of the term oligomer is meant to encompass homooligomers and cooligomers, where cooligomers include any oligomer or having two or more chemically distinct monomers.

For the purposes of this invention and the claims thereto the term "Polyalpha-olefin," "polyalphaolefin," or "PAO" includes homooligomers, cooligomers, homopolymers and copolymers of C3 or greater alpha-olefin monomers.

The PAO's of the present invention can include oligomers, polymers or combinations of both. The PAO compositions (whether it be oligomers, polymers or combinations thereof) of the present invention are liquids and have a $M_w$ of 200,000 or less.

For the purposes of this invention and the claims thereto the active species in a catalytic cycle may comprise the neutral or ionic forms of the catalyst.

The term "catalyst system" is defined to mean a catalyst precursor/activator pair, such as a metallocene/activator pair. When "catalyst system" is used to describe such a pair before activation, it means the unactivated catalyst (precatalyst) together with an activator and, optionally, a co-activator (such as a trialkylaluminum compound). When it is used to describe such a pair after activation, it means the activated catalyst and the activator or other charge-balancing moiety. Additionally, the catalyst system may optionally comprise a co-activator and/or other charge-balancing moiety.

"Catalyst precursor" is also often referred to as precatalyst, catalyst, catalyst compound, precursor, metallocene, transition metal compound, unactivated catalyst, or transition metal complex. These words are used interchangeably. Activator and cocatalyst are also used interchangeably. A scavenger is a compound that is typically added to facilitate oligomerization or polymerization by scavenging impurities. Some scavengers may also act as activators and may be referred to as co-activators. A co-activator which is not a scavenger may also be used in conjunction with an activator in order to form an active catalyst with a transition metal compound. In some embodiments, a co-activator can be pre-mixed with the transition metal compound to form an alkylated transition metal compound, also referred to as an alkylated catalyst compound or alkylated metallocene.

For purposes of this invention and the claims thereto non-coordinating anion (NCA) is defined to mean an anion which either does not coordinate to the catalyst metal cation or that coordinates only weakly to the metal cation. An NCA coordinates weakly enough that a neutral Lewis base, such as an olefinically or acetylenically unsaturated monomer, can displace it from the catalyst center. Any metal or metalloid that can form a compatible, weakly coordinating complex with the catalyst metal cation may be used or contained in the noncoordinating anion. Suitable metals include, but are not limited to, aluminum, gold, and platinum. Suitable metalloids include, but are not limited to, boron, aluminum, phosphorus, and silicon. A subclass of non-coordinating anions comprises stoichiometric activators, which can be either neutral or ionic. The terms ionic activator, and stoichiometric ionic activator can be used interchangeably. Likewise, the terms neutral stoichiometric activator and Lewis acid activator can be used interchangeably.

In addition, a reactor is any container(s) in which a chemical reaction occurs.

"Isoalkyl" is a branched alkyl group or radical having at least one tertiary or quaternary carbon atom and which possess at least one $C_1$ to $C_{18}$ alkyl branch along at least a portion of each chain.

Polyalpha-olefins

In a preferred embodiment, this invention relates to liquid polyalpha-olefins (PAO's) comprising more than 50 mole % of one or more C3 to C24 alpha-olefin monomers preferably 55 mole % or more, preferably 60 mole % or more, preferably 65 mole % or more, preferably 70 mole % or more, preferably 75 mole % or more, preferably 80 mole % or more, preferably 85 mole % or more, preferably 90 mole % or more, preferably 95 mole % or more, preferably 100 mole % based on the total moles of monomers present in the polyalpha-olefin, as measured by carbon -13 NMR.

For purposes of this invention and the claims thereto, a liquid is defined to be a material that flows at room temperature, has a pour point of less than 25° C., and has a kinematic viscosity at 100° C. of 30,000 cSt or less.

In another embodiment, any of the polyalpha-olefins described herein preferably have less than 300 ppm of Group 4 metals (preferably Ti, Hf or Zr), preferably less than 200 ppm, preferably less than 100 ppm, preferably less than 50 ppm, preferably less than 10 ppm, or preferably less than 5 ppm, as measured by ASTM D 5185.

In another embodiment, any of the polyalpha-olefins described herein preferably have less than 300 ppm of Ti, preferably less than 200 ppm, preferably less than 100 ppm, preferably less than 50 ppm, preferably less than 10 ppm, or preferably less than 5 ppm as measured by ASTM D 5185.

In another embodiment, any of the polyalpha-olefins described herein preferably have less than 300 ppm of Hf, preferably less than 200 ppm, preferably less than 100 ppm, preferably less than 50 ppm, preferably less than 10 ppm, or preferably less than 5 ppm as measured by ASTM D 5185.

In another embodiment, any of the polyalpha-olefins described herein preferably have less than 300 ppm of Zr, preferably less than 200 ppm, preferably less than 100 ppm, preferably less than 50 ppm, preferably less than 10 ppm, or preferably less than 5 ppm as measured by ASTM D 5185.

In another embodiment, any of the polyalpha-olefins described herein preferably have less than 100 ppm of Group 13 metals (preferably B or Al), preferably less than 50 ppm, preferably less than 10 ppm, or preferably less than 5 ppm as measured by ASTM D 5185.

In another embodiment, any of the polyalpha-olefins described herein preferably have less than 100 ppm of boron, preferably less than 50 ppm, preferably less than 10 ppm, or preferably less than 5 ppm as measured by ASTM D 5185.

In another embodiment, any of the polyalpha-olefins described herein preferably have less than 600 ppm of aluminum, preferably less than 500 ppm, preferably less than 400 ppm, preferably less than 300 ppm, preferably less than 200 ppm, preferably less than 100 ppm, preferably less than 50 ppm, preferably less than 10 ppm, or preferably less than 5 ppm as measured by ASTM D 5185.

In another embodiment, any of the polyalpha-olefins described herein preferably have an $M_w$ (weight average molecular weight) of about 200,000, preferably between about 250 and about 200,000, preferably between about 280 and about 100,000, preferably between about 336 to about 150,000, and preferably between about 336 and about 100,000 g/mol.

In another embodiment, any of the polyalpha-olefins described herein preferably have an $M_n$ (number average molecular weight) of less than 200,000 preferably between 250 and about 150,000, preferably between about 250 and about 125,000 and preferably between 280 and 100,000 g/mol.

In another embodiment, any of the polyalpha-olefins described herein preferably have an $M_w/M_n$ of greater than 1 and less than 5, preferably less than 4, preferably less than 3, preferably less than 2.5, preferably less than 2. Alternatively, any of the polyalpha-olefins described herein preferably have an $M_w/M_n$ of between 1 and 3.5, alternatively between 1 and 2.5.

For purposes of this invention and the claims herein, MWD is equal to $M_w/M_n$.

Figure 1:
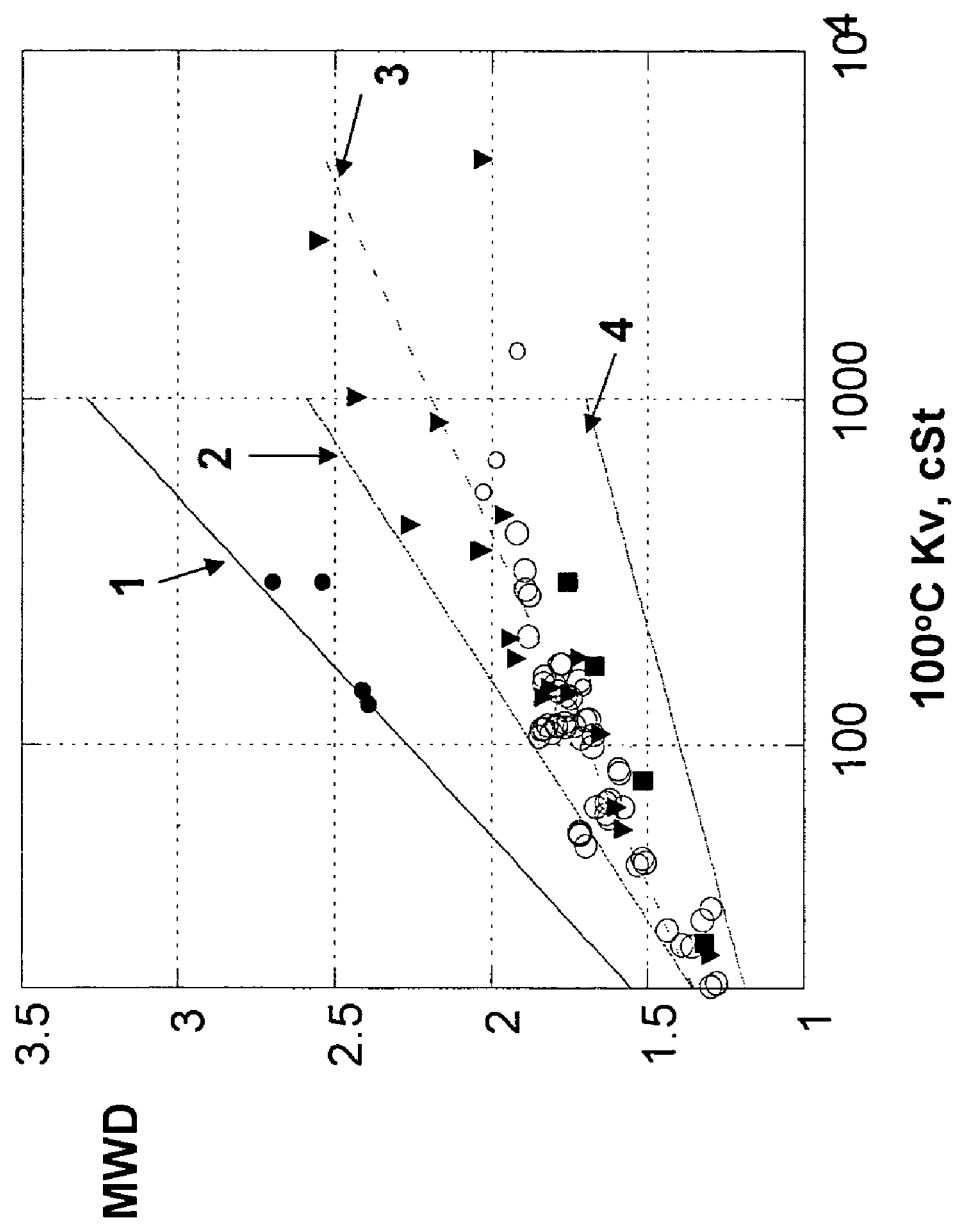
FIG. 1 shows MWD of polyalpha-olefins (PAO) produced by the present invention showing typical values and upper and lower limits. Line 1 ● represents PAO made by non-metallocene catalysts, y=0.2223+1.0232 log(x) R=0.97035. Line 2 provides an upper MWD limit by the present invention, y=0.8+0.3 log(x). Line 3 ▼ provides typical MWD of poly-1-butene prepared by methods of the present invention, y=0.71263+0.49387 log(x) R=0.91343. Line 4 provides a lower MWD limit by the present invention, y=0.41667+0.725 log(x). ■ represent MWDs of Examples 1 to 9 (Table 1), y=0.66017+0.44922 log(x) R=0.99809.

For many applications when superior shear stability, thermal stability or thermal/oxidative stability is preferred, it is preferable to have the polyalpha-olefins made with the narrowest possible MWD. PAO fluids with different viscosities, but made from the same feeds or catalysts, usually have different MWDs. In other words, MWDs of PAO fluids are dependent on fluid viscosity. Usually, lower viscosity fluids have narrower MWDs (smaller MWD value) and higher viscosity fluids have broader MWDs (larger MWD value). For most fluids with 100° C. Kv of less than 1000 cSt, the MWD of is usually less than 2.5, and typically around 2.0±0.5. For fluids with 100° C. viscosity greater than 1000 cSt, they usually have broader MWDs, usually greater than 1.8. A typical range of MWD correlation vs. 100° C. fluid viscosity can be found in FIG. 1. Usually, the narrower a fluid's MWD, the better its shear stability. Such narrow MWD fluids will exhibit less viscosity loss due to high stress or shear in the TRB test, and will have higher high-temperature, high-shear rate (HTHSR) viscosity under more severe conditions, providing a thicker lubricant film and concomitantly better lubrication and wear protection. In certain applications, when shear stability or HTHSR viscosity is not so critical, fluids with broader MWD may provide better blending property or other advantages.

The $M_w$, $M_n$ and MWD are measured by size exclusion chromatography (SEC), also known as gel permeation chromatography (GPC) method using a column for medium- to low-molecular weight polymers, with tetrahydrofuran as solvent and polystyrene as calibration standard. Unless otherwise indicated, the Mn and Mw values reported herein are measured GPC values and not calculated from kinematic viscosity at 100° C.

In a preferred embodiment of this invention, any PAO described herein may have a pour point of less than 10° C. (as measured by ASTM D 97), preferably less than 0° C., preferably less than −10° C., preferably less than −20° C., preferably less than −25° C., preferably less than −30° C., preferably less than −35° C., preferably less than −40° C., preferably less than −55° C., preferably between −10 and −80° C., preferably between −15° C. and −70° C.

In a preferred embodiment according to the present invention, any polyalpha olefin described herein may have a kinematic viscosity at 100° C. from greater than 20 to about 5000 cSt, preferably from greater than 20 to about 3000 cSt, preferably from greater than 20 cSt to about 1500 cSt. In a another embodiment of this invention, any PAO described herein may have a kinematic viscosity at 40° C. as measured by ASTM D 445 from about 50 to about 500,000 cSt, preferably from about 75 cSt to about 100,000 cSt at 40° C., alternatively from about 100 to about 8,000 cSt.

In a preferred embodiment according to the present invention, the polyalpha-olefin fluid described herein may have a viscosity index (VI) of greater than 60. VI is determined according to ASTM Method D 2270-93 [1998]. VI of a fluid is usually dependent on the viscosity and feed composition. Higher VI is more desirable. Higher viscosity fluid of the same feed composition usually has higher VI. The typical VI range for fluids made from $C_3$ or $C_4$ or $C_5$ linear alpha-olefin (LAO) are from 65 to 250. Typical VI range for fluids made from $C_6$ or $C_7$ are from 100 to 300, again depending on fluid viscosity. Typical VI range for fluids made from $C_8$ to $C_{14}$ LAO, such as 1-octene, 1-nonene, 1-decene or 1-undecene or 1-dodecene, 1-tetra-decene, are from 120 to >450, depending on viscosity. More specifically, the VI range for fluids made from 1-decene or 1-decene equivalent feeds are from about 100 to about 500, preferably from about 120 to about 400. When two or three or more alpha-olefins were used as feeds, such as combination of $C_3+C_{10}$, $C_3+C_{14}$, $C_3+C_{16}$, $C_3+C_{18}$, $C_4+C_8$, $C_4+C_{12}$, $C_4+C_{16}$, $C_3+C_4+C_8$, $C_3+C_4+C_{12}$, $C_4+C_{10}+C_{12}$, $C_4+C_{10}+C_{14}$, $C_6+C_{12}$, $C_6+C_{12}+C_{14}$, $C_4+C_6+C_{10}+C_{14}$, $C_4+C_6+C_8+C_{10}+C_{12}+C_{14}+C_{16}+C_{18}$, etc. The product VI depends on the fluid viscosity and also on the choice of feed olefin composition. For the most demanding lubricant applications, it is better to use fluids with higher VI.

In another embodiment, it is preferable that the PAO fluid does not contain a very light fraction. These light fractions contribute to high volatility, unstable viscosity, poor oxidative and thermal stability. They are usually removed in the final product. It is generally preferable to have less than 1 wt % fluid with C20 or lower carbon numbers, more preferably less than 1 wt % fluid with C24 or lower carbon numbers or more preferably less than 1 wt % fluid with C26 or lower carbon numbers. It is preferable to have less than 0.5 wt % fluid with C20 or lower carbon numbers, more preferably less than 0.5 wt % fluid with C24 or lower carbon numbers or more preferably less than 0.5 wt % fluid with C26 or lower carbon numbers. Also, the lower the amount of any of these light hydrocarbons, the better the fluid property as can be determined by Noack volatility testing. Preferably, the PAO fluid has a Noack volatility of less than 5 wt %, preferably less than 2 wt % and preferably less than 0.5 wt %.

In another embodiment any polyalpha olefin described herein may have a kinematic viscosity at 100° C. from greater than 20 to 5000 cSt and a flash point of 150° C. or more, as measured by ASTM D 56.

In another embodiment any polyalpha olefin described herein may have a dielectric constant of 3 or less, usually 2.5 or less (1 kHz at 23° C. as determined by ASTM D 924).

In another embodiment any polyalpha olefin described herein may have a specific gravity of 0.6 to 0.9 g/cm$^3$, preferably 0.7 to 0.88 g/cm$^3$.

The PAO's prepared herein, particularly those of moderate to high viscosity (such as those with a $KV_{100}$ of greater than 20 cSt), are especially suitable for use in the formulation of high performance automotive engine oils, general industrial lubricants, grease, various types of automotive or industrial gears oils, aviation lubricants, hydraulic fluids or lubricants, heat transfer fluids, etc. They can be used by themselves or by blending with other fluids in 0.1 wt % up to 95 wt %, such as Group I, II, Group II+, Group III, Group III+ base stocks or lube base stocks derived from hydroisomerization of wax fractions from Fischer-Tropsch hydrocarbon synthesis from $CO/H_2$ syn gas, or other Group IV or Group V or Group VI base stocks. These blend stocks, when combined with additives, are used to formulated into full synthetic lubricants, partial synthetics, or used as special additive components with other base stocks.

All kinematic viscosity values reported for fluids herein are measured at 100° C. unless otherwise noted. Dynamic viscosity can then be obtained by multiplying the measured kinematic viscosity by the density of the liquid. The units for kinematic viscosity are in m$^2$/s, commonly converted to cSt or centistokes (1 cSt=10$^{-6}$ m$^2$/s or 1 cSt=1 mm$^2$/sec).

The PAO's produced according to this invention are typically dimers, trimers, tetramers, or higher oligomers of one or more $C_3$ to $C_{24}$ olefin monomers, preferably one or more $C_4$ to $C_{20}$ alpha-olefin monomers, preferably one or more $C_5$ to $C_{20}$ linear alpha-olefin monomers. Alternatively, an alpha-olefin with alkyl substituent at least 2 carbons away from the olefinic double bond can also be used. Typically, the PAO's produced herein are usually a mixture of many different oligomers. In one embodiment, smallest oligomers from these alpha-olefins have carbon numbers ranging from $C_{10}$ to $C_{20}$. These small oligomers are usually separated from the higher oligomers with carbon number of greater than $C_{20}$, for example $C_{24}$ and higher which are typically used as high performance fluids. These separated $C_{10}$ to $C_{20}$ oligomer olefins or the corresponding paraffins after hydrogenation can be used in specialty applications, such as drilling fluids, solvents, paint thinner, etc with excellent biodegradability, toxicity, viscosities, etc. Sometimes, the smaller oligomers up to $C_{40}$ are separated from the residual lube fraction to give products with most desirable properties. The high performance fluid fraction in the $C_{20}$, or $C_{30}$ and higher fractions typically have lower viscosities making them beneficial for some applications, such as better fuel economy, better biodegradability, better low temperature flow properties, or lower volatility.

In this invention, the oligomerization or polymerization process is typically carried out in such a manner to produce a final product with 100° C. Kv of greater than 20 cSt. The process and catalyst employed to produce these fluids are unique that they produce polymers with narrow molecular weight distribution. Because of this feature, the polymerization process produces very high selectivity to lube fraction product with very low amount of light fraction of $C_{20}$ or $C_{24}$ or $C_{28}$ or $C_{30}$ or lower fractions, depending on feed types. Furthermore, because of this narrow distribution, the final lube fraction does not contain excessive high molecular weight fraction, which may contribute to the instability under shear, thermal, oxidative stress, etc.

The PAOs described herein can be further blended with other base stocks (Gr I to VI) and additives, including antioxidants, antiwear additives, friction modifiers, dispersants, detergents, corrosion inhibitors, defoamants, extreme pressure additives, seal swell additives, and optionally viscosity modifiers, etc. Description of typical additives, formulation and application can be found in the book "Synthetics, Mineral Oils, and Bio-Based Lubricants, Chemistry and Technology", Ed. L. R. Rudnick, CRC Press, Taylor & Francis Group, Boca Raton, Fla. and in "Lubricant Additives" Chemistry and Applications, ed. L. R. Rudnick, Marcel Dekker, Inc., New York, 2003.

In another embodiment, the PAO's produced herein have a volatility as measured by the Noack Volatility test (ASTM D5800) of 25 wt % or less, preferably 20 wt % or less, preferably 14 wt % or less, preferably less than 10 wt % or less, preferably less than 5 wt % or less. Often the oil has NOACK volatility of less than 2 wt %.

In another embodiment, the PAO's produced directly from the oligomerization or polymerization process are unsaturated olefins. The amount of unsaturation can be quantitatively measured by bromine number measurement according to the ASTM D 1159, or by proton or carbon-13 NMR. Proton NMR spectroscopic analysis can also differentiate and quantify the types of olefinic unsaturation: vinylidene, 1,2-disubstituted, trisubstituted, or vinyl. Carbon-13 NMR spectroscopy can confirm the olefin distribution calculated from the proton spectrum.

Both proton and carbon-13 NMR spectroscopy can quantify the extent of short chain branching (SCB) in the olefin oligomer, although carbon-13 NMR can provide greater specificity with respect to branch lengths. In the proton spectrum, the SCB branch methyl resonances fall in the 1.05-0.7 ppm range. SCBs of sufficiently different length will give methyl peaks that are distinct enough to be integrated separately or deconvoluted to provide a branch length distribution. The remaining methylene and methine signals resonate in the 3.0-1.05 ppm range. In order to relate the integrals to CH, $CH_2$, and $CH_3$ concentrations, each integral must be corrected for the proton multiplicity. The methyl integral is divided by three to derive the number of methyl groups; the remaining aliphatic integral is assumed to comprise one CH signal for each methyl group, with the remaining integral as $CH_2$ signal. The ratio of $CH_3/(CH+CH_2+CH_3)$ gives the methyl group concentration.

Similar logic applies to the carbon-13 NMR analysis, with the exception that no proton multiplicity corrections need be made. Furthermore, the enhanced spectral/structural resolution of $^{13}C$ NMR vis a vis $^1H$ NMR allows differentiation of ions according to branch lengths. Typically, the methyl resonances can be integrated separately to give branch concentrations for methyls (20.5–15 ppm), propyls (15–14.3 ppm), butyl-and-longer branches (14.3–13.9 ppm), and ethyls (13.9–7 ppm).

Olefin analysis is readily performed by proton NMR, with the olefinic signal between 5.9 and 4.7 ppm subdivided according to the alkyl substitution pattern of the olefin. Vinyl group CH protons resonate between 5.9-5.7 ppm, and the vinyl $CH_2$ protons between 5.3 and 4.85 ppm. 1,2-disubstituted olefinic protons resonate in the 5.5-5.3 ppm range. The trisubstituted olefin peaks overlap the vinyl $CH_2$ peaks in the 5.3-4.85 ppm region; the vinyl contributions to this region are removed by substraction based on twice the vinyl CH integral. The 1,1-disubstituted—or vinylidene—olefins resonate in the 4.85-4.6 ppm region. The olefinic resonances, once corrected for the proton multiplicities can be normalized to give a mole-percentage olefin distribution, or compared to the multiplicity-corrected aliphatic region (as was described above for the methyl analysis) to give fractional concentrations (e.g. olefins per 100 carbons).

Generally, the amount of unsaturation strongly depends on the fluid viscosity or fluid molecular weight. Lower viscosity fluid has higher degree of unsaturation and higher bromine number. Higher viscosity fluid has lower degree of unsaturation and lower bromine number. If a large amount of hydrogen or high hydrogen pressure is applied during the polymerization step, the bromine number maybe lower than without the hydrogen presence. Typically, for greater than 20 to 5000 cSt polyalpha-olefin produced from 1-decene or other LAOs in this inventive process, the as-synthesized PAO will have bromine number of from 25 to less than 1, depending on fluid viscosity.

The types of olefinic unsaturations in the PAO fluids produced by this inventive process are unique, as confirmed by $^1$H and $^{13}$C-NMR. They contain a very high amount of vinylidene olefins, $CH_2=CR^1R^2$, and much less of the other types of unsaturation, including trisubstituted or di-substituted olefins. The vinylidene content is preferably also much higher than the vinylidene content of the polyalpha-olefins produced in prior art cases based on metallocene used with MAO promoters. FIG. 5 demonstrates the mole % of vinylidene content of poly-1-butene by the present invention vs. material generated according to methods generally disclosed in U.S. Pat. No. 6,548,724. In the present invention, the vinylidene content is more than 65 mole %, or more than 70% or more than 80%. A higher amount of vinylidene unsaturation is usually more desirable because these types of olefins are much more reactive for further hydrogenation or for further functionalization. There are many methods described to maximize the amount of vinylidene olefins, such as those disclosed in U.S. Pat. No. 5,286,823. Vinylidene olefins usually react faster with maleic anhydride in an ene reaction. They are much more readily hydrogenated to give fully saturated hydrocarbons for high performance base stocks. Usually, the degree of hydrogenation affects the oxidative stability of the fluid. Fluids with a higher degree of hydrogenation, and concomitantly lower bromine number, usually have better oxidative stability. The PAO in the present invention has high vinylidene content and is therefore more amenable to hydrogenation, to provide the formation of low bromine number fluids. The bromine number after hydrogenation is preferably less than 5, more preferably less than 3, more preferably less than 2, more preferably less than 1, more preferably less than 0.5, more preferably less than 0.1. Generally, the lower the bromine number, the better the oxidative stability.

The PAO produced by the present invention also preferably has decreased amounts of methyl groups per 1000 carbons than the PAO produced by known methods. FIG. 6 provides the amount of $CH_3$ group in PAO per 1000 carbon for poly-1-butene fluids made by the catalysts and processes pertaining to the present invention in comparison to known methods. The product made in this invention has a methyl content less than the amount defined by the following equation:

(Methyl branch per 1000 C)=−3.4309×$Ln$(Kv at 100° C. in cSt)+29.567

Methyl branching usually is less desirable, because such branching tends to depress VI and/or to reduce oxidative stability.

The PAOs produced herein are liquids. For purposes of this invention and the claims thereto, a liquid is defined to be a material that flows at room temperature, having a pour point of less than 25° C., and has a kinematic viscosity at 100° C. of 30,000 cSt or less In a preferred embodiment, the PAO produced in this invention contains substantial amount of atactic polymer structure. In other words, the PAO have mostly atactic arrangements of the monomer units. This atactic polymer is beneficial for the lubricant applications. In a preferred embodiment, the PAO produced by this invention has an atatic polymer structure of at least 50%, preferably at least 75%, preferably at least 85%, preferably at least 90%, preferably at least 95%, preferably at least 99% as determined by carbon-13 NMR described below.

In another embodiment this invention further relates to PAO's having 90 mole % or less of mm triads, preferably 80 mole % or less, preferably 70 mole % or less, preferably 60 mole % or less, preferably 50 mole % or less, preferably 40 mole % or less, preferably 30 mole % or less, preferably 20 mole % or less, preferably 10 mole % or less, preferably 5 mole % or less as determined by Carbon-13 Nuclear Magnetic Resonance (NMR) spectroscopy according to the procedure below.

In another embodiment this invention further relates to PAO's having 90 mole % or less of rr triads, preferably 80 mole % or less, preferably 70 mole % or less, preferably 60 mole % or less, preferably 50 mole % or less, preferably 40 mole % or less, preferably 30 mole % or less, preferably 20 mole % or less, preferably 10 mole % or less, preferably 5 mole % or less as determined by Carbon-13 Nuclear Magnetic Resonance (NMR) spectroscopy according to the procedure below.

In another embodiment this invention further relates to PAO's having 20 mole % or more of mr triads, preferably 30 mole % or more, preferably 40 mole % or more, preferably 50 mole % or more, preferably 55 mole % or more, preferably 60 mole % or more, preferably 70 mole % or more, preferably 75 mole % or more as determined by Carbon-13 Nuclear Magnetic Resonance (NMR) spectroscopy according to the procedure below.

In another embodiment this invention further relates to PAO's having the ratio of mm/mr of less than 5, preferably less than 4, preferably less than 3, preferably less than 2, preferably less than 1, as determined by Carbon-13 Nuclear Magnetic Resonance (NMR) spectroscopy according to the procedure below.

As noted above, Carbon-13 NMR is used to determine tacticity of the polyalphaolefins of the present invention—quantitatively in some cases, and qualitatively in others. Carbon-13 NMR can be used to determine the concentration of the triads, denoted mm (meso, meso), mr (meso, racemic) and rr (racemic, racemic), as well as molar composition of the sample. The concentrations of these triads defines whether the polymer is isotactic, atactic or syndiotactic. Spectra for a PAO sample are acquired in the following manner. Approximately 100-1000 mg of the PAO sample is dissolved in 2-3 ml of chloroform-d for Carbon 13 analysis. Approximately 10 mg/ml (solvent basis) of chromium acetylacetonate relaxation agent, $Cr(acac)_3$, is added to the sample to enhance the data acquisition rate. Analysis of the spectra is performed according to the paper by Kim, I.; Zhou, J.-M.; and Chung, H. *Journal of Polymer Science: Part A: Polymer Chemistry* 2000, 38 1687-1697, augmented by the identification and integration of end group resonances, and removal of their contributions to the peaks used in the analysis. The deconvolutions are executed with Acorn NMR Inc.'s NutsPro NMR data analysis software, using an 85/15 Lorentzian/Gaussian line shape. The component peaks are lumped together into clusters according to the mm, mr, and rr triad assignments, and fit with a Bernoullian distribution. The adjustable parameter for these fits is Pr, the fraction of monomer added with racemic stereochemistry. For details of going from a set of triad measurements (such as described by Kim above) to a statistical model (such as the Bernoullian) see "Polymer Sequence Determination, James C. Randall, Academic Press, New York, 1977" For examples of measurements of tacticity of polydecene and polydodecene please see the examples section of PCT patent application PCT/US2006/021231, filed Jun. 2, 2006.

In another embodiment of this invention, 1,2 disubstituted olefins are present in the polyalpha-olefin product at less than Z mole %, where Z=8.420*Log(V)−4.048 where V is the kinematic viscosity of the polyalpha-olefin in cSt measured at 100° C., preferably at 7 mole % or less, preferably at 5 mole % or less. For information on how to measure 1,2 disubstituted olefin content, please see PCT/US06/21231 filed Jun. 2, 2006.

In another embodiment, the polyalpha-olefin has less than Z mole % of units represented by the formula:

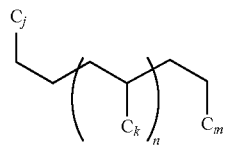

where j, k and m are each, independently, 3, 4, 5, 6, 7, 8, 9, 10, 11, 12, 13, 14, 15, 16, 17, 18, 19, 20, 21, or 22, n is an integer from 1 to 350, and where Z=8.420*Log(V)−4.048, where V is the kinematic viscosity of the polyalpha-olefin measured at 100° C. in cSt.

In a preferred embodiment, the product produced herein has a selectivity of 70% or more for $C_{20}$ and greater hydrocarbons, preferably 80% or more, preferably 90% or more, more preferably 95% or more, preferably 98% or more, preferably 99% or more for $C_{20}$ and greater hydrocarbons.

In a preferred embodiment, the productivity of the process is at least 1.5 kg of total product per gram of transition metal compound, preferably at least 2 kg of total product per gram of transition metal compound, preferably at least 3 kg of total product per gram of transition metal compound, preferably at least 5 kg of total product per gram of transition metal compound, preferably at least 7 kg of total product per gram of transition metal compound, preferably at least 10 kg of total product per gram of transition metal compound, preferably at least 20 kg of total product per gram of transition metal compound.

In another preferred embodiment, the productivity of the process is at least 1.5 kg of total product per gram of non-coordinating anion activator compound, preferably at least 2 kg of total product per gram of non-coordinating anion activator compound, preferably at least 3 kg of total product per gram of non-coordinating anion activator compound, preferably at least 5 kg of total product per gram of non-coordinating anion activator compound, preferably at least 7 kg of total product per gram of non-coordinating anion activator compound, preferably at least 10 kg of total product per gram of non-coordinating anion activator compound, preferably at least 20 kg of total product per gram of non-coordinating anion activator compound.

It is of interest to have high productivity for the metallocene or non-coordinating anion activator, as these components are usually the more expensive components than other components in the catalyst system. For an economical operation, it is important to have productivity of at least 1.5 kg/g of transition metal compound or non-coordinating anion activator.

In a preferred embodiment, the product produced herein has a selectivity of 60% or less for $C_{24}$ or less hydrocarbons, preferably 50% or less, preferably 40% or less, more preferably 20% or less, preferably 10% or less, preferably 5% or less, preferably 1% or less for $C_{24}$ or less hydrocarbons. (% by weight unless otherwise noted).

In a preferred embodiment, the product produced herein has a selectivity of 60% or less for $C_{10}$ dimer (i.e. a $C_{20}$ product), preferably 50% or less, preferably 40% or less, more preferably 30% or less for $C_{10}$ dimer, more preferably 10% or less for $C_{10}$ dimer, more preferably 5% or less for $C_{10}$ dimer, more preferably 1% or less for $C_{10}$ dimer. (% by weight unless otherwise noted).

In a preferred embodiment, the lube or high-performance fluid produced herein has a selectivity of 10% or more, preferably 20% or more, preferably 40% or more, more preferably 50% or more, preferably 70% or more, preferably 80% or less, preferably 90% or more, or preferably 95% or more. (% by weight unless otherwise noted).

Process

This invention relates to an improved process to produce poly-alpha-olefins. This improved process employs metallocene catalysts together with one or more non-coordinating anion activators. The metallocene catalysts are unbridged, substituted bis(cyclopentadienyl) transition metal compounds. One preferred class of catalysts comprises highly substituted metallocenes that give high catalyst productivity and with product kinematic viscosities of greater than 20 cSt as measured at 100° C. Another preferred class of metallocenes is unbridged and substituted cyclopentadienes, including unbridged and substituted or unsubstituted indenes and or flourenes. One aspect of the processes described herein also includes treatment of the feed olefins and solvents (if used), or purging nitrogen gas stream to remove catalyst poisons, such as peroxides, oxygen-, sulfur-, and nitrogen-containing organic compounds, and or acetylenic compounds. This treatment is believed to increase catalyst productivity, typically by more than 30% increase in catalyst productivity, or more than 50% increase in catalyst productivity, or more than 100% increase in catalyst productivity, or more than 200% increase in catalyst productivity, or more than 500% increase in catalyst productivity, or more than 1000% increase in catalyst productivity, or more than 2000% increase in catalyst productivity. In many cases, without purification of feed olefins, solvents if used, or purging gas stream, one would obtain no conversion or very low conversion, (e.g. less than 5%).

In a preferred embodiment, this invention relates to a process (preferably a continuous or semi-continuous or batch process) to produce a polyalpha-olefin having a KV at 100° C. of greater than 20 cSt to about 10,000 cSt comprising:

1) contacting one or more alpha-olefin monomers having 3 to 24 carbon atoms with an unbridged substituted bis cyclopentadienyl transition metal compound having the structure:

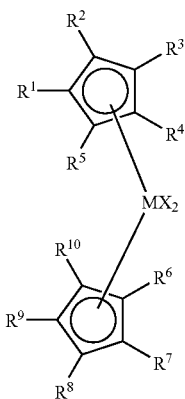

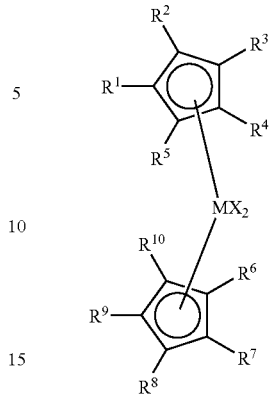

where M is a Group 4 metal;

each X is, independently, is hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from 3 to 20 carbon atoms; or both X together can be an olefin, diolefin or aryne ligand;

$R^1$ to $R^{10}$ are each independently, a radical group which is a hydrogen, a heteroatom, hydrocarbyl, substituted hydrocarbyl, halocarbyl, substituted halocarbyl, silylcarbyl or germylcarbyl, provided that at least one of $R^1$ to $R^5$ is not hydrogen and at least one of $R^6$ to $R^{10}$ is not hydrogen and where any two adjacent R groups are optionally joined to form a substituted or unsubstituted, saturated, partially unsaturated, or aromatic cyclic or polycyclic substituent; and a non-coordinating anion activator, and optionally an alkyl-aluminum compound, where the molar ratio of transition metal compound to activator is 10:1 to 0.1:1, and when the alkyl aluminum compound is present, the molar ratio of alkyl aluminum compound to transition metal compound is 1:4 to 4000:1, under polymerization conditions wherein:

i) hydrogen is present at a partial pressure of 0.1 to 100 psi, based upon the total pressure of the reactor or the concentration of the hydrogen is from 1 to 30,000 ppm or less by weight;

ii) wherein the alpha-olefin monomer(s) having 3 to 24 carbon atoms are present at 10 volume % or more based upon the total volume of the catalyst/activator/alkylaluminum compound solutions, monomers, and any diluents or solvents present in the reaction;

iii) provided that ethylene is not present at more than 40 wt % of the feed olefin composition of the monomers entering the reactor.

In a preferred embodiment, this invention relates to a process to produce a liquid poly-alpha-olefin having a $KV_{100}$ of greater than 20 cSt or more comprising:

a) contacting in a reaction zone, in the presence of hydrogen (preferably from 10 to 10,000 ppm by weight of hydrogen), one or more C3 to C20 alpha-olefin monomers, with no more than 40 wt % ethylene, with a non-coordinating anion activator and a transition metal compound represented by the formula:

where M is a Group 4 metal;

each X is, independently, a hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals, or both X are joined and bound to the metal atom to form a metallacycle ring containing from about 3 to about 20 carbon atoms, or both together can be an olefin, diolefin or aryne ligand; and $R^1$ to $R^{10}$ are each independently, a radical group which is a hydrogen, a heteroatom, hydrocarbyl, substituted hydrocarbyl, halocarbyl, substituted halocarbyl, silylcarbyl or germylcarbyl, provided that: 1) at least one of $R^1$ to $R^5$ is not hydrogen or an iso-alkyl group and at least one of $R^6$ to $R^{10}$ is not hydrogen or an isoalkyl or 2) at least two of $R^1$ to $R^5$ are not hydrogen, or 3) at least two of $R^1$ to $R^5$ are not hydrogen and at least two of $R^6$ to $R^{10}$ are not hydrogen, and where any two adjacent $R^1$ to $R^5$ groups may form a C4 to C20 cyclic or poly cyclic moiety, and where any two adjacent R to $R^{10}$ groups may form a C4 to C20 cyclic or poly cyclic moiety, and optionally a co-activator, $R^1R^2R^3M$, where M is aluminum or boron and $R^1$, $R^2$ and $R^3$ can be the same or different C1 to C24 hydrocarbyl radicals, including trialkylaluminum, a trialkylboron compound, or a mixture of different compounds.

By continuous is meant a system that operates (or is intended to operate) without interruption or cessation. For example a continuous process to produce a polymer would be one where the reactants (such as monomers and catalyst components and/or poison scavengers) are continually introduced into one or more reactors and polymer product is continually withdrawn. By semi-continuous is meant a system that operates (or is intended to operate) with periodic interruption. For example a semi-continuous process to produce a polymer would be one where the reactants (such as monomers and catalyst components and/or scavengers) are continually introduced into one or more reactors and polymer product is intermittently withdrawn.

A batch process is not continuous or semi-continuous.

In a preferred embodiment of this invention the oligomerization reaction temperature is controlled by several means, such as continuous or semi-continuous operation, by heat removal, rate of catalyst or feed addition or solvent addition. Since catalyst solution, feed olefins and/or solvents and/or scavengers are usually added at room or ambient temperature or can be pre-cooled to a desired temperature, their addition to the reactor can mitigate the heat of reaction and can help maintain constant reaction temperature. This mode of operation can control the temperature to within 20° C. of the desired reaction temperature, usually preferably to within 10° C. of the desired temperature, preferably to within 5° C. of the desired temperature, preferably to within 3° C. of the desired temperature, or preferably to within 1° C. of the desired temperature over a 30 minute period, and preferably for the entire reaction.

Usually, a reactor, containing a small amount of starting liquid is pre-heated to within 10° C. of the desired reaction temperature in a semi-continuous run. This starting liquid can be feed olefins, catalyst components, solvents or polyalpha-olefins heels from previous runs, or polyalpha-olefin products from previous runs or any other appropriate liquids. Usually, part of the feed olefins, solvent or PAO heels from previous runs or PAO products from previous runs are a more preferred starting liquid. When the reactor is at a desired temperature, feed olefins, catalyst components, hydrogen of a selected amount, solvents and other components can be added continuously at selected rates. The co-activator(s) or scavenger(s), part of all of or all of the intended amount, can be added to the starting liquid. Or optionally, part or all of the co-activator(s) or scavenger(s) can be added to the feed olefins or solvent streams to maximize the effectiveness. As the polymerization reaction starts at the reaction temperature, heat is released. In order to maintain a reaction temperature to be as constant as possible, heat is removed by one or more of several methods as mentioned in the text, or as generally known in the art. One possible method for heat removal is to continuously circulate a stream of the reactor contents through a heat exchanger by pumping this side stream through a heat exchanger to cool the side stream slightly and then pumping it back into the reaction zone. The rate of this circulation and the degree of cooling of this side stream can be used to effectively control the reaction zone temperature. Alternatively, if the reaction rate is not high enough to maintain the reaction temperature, external heating is supplied to the reactor to maintain a desired temperature. Another method to maintain a constant reaction temperature is by controlling the addition rate of feed olefin or solvent and the temperature of the feed olefin or solvent. After the addition of reactants is completed, the reaction is allowed to proceed for the desired amount of time to obtain highest feed olefin conversion.

In a continuous mode of operation, the operation is similar to the semi-continuous run, except when the reactor is filled up to a pre-determined level, a pre-determined amount of reaction product mixture is withdrawn from the reactor while the addition of all components is continued. The rate of feed addition and the amount of reaction product withdrawn from the reactor determine the reaction time or residence time. This can be pre-determined to obtain high feed olefin conversion and high reactor throughput for economical operation.

In this process, several factors are balanced for optimum results. First is the choice of catalyst components. An un-bridged, substituted metallocene activated by a non-coordinating anion (NCA) with a small amount of trialkylaluminum is an effective catalyst. The metallocene components can be dihalide or dialkyls. But, usually, the dialkyl form of the metallocene is the active chemical component to interact with an NCA activator to give the active catalyst. When the metallocene di-halide is used, it typically requires addition of tri-alkylaluminum or other alkylating reagents to convert the dihalide form into dialkyl form. In this case the molar ratio of tri-alkylaluminum to metallocene is anywhere from 4 to 4000, preferably 8 to 500. When the metallocene dialkyls are used, (such as bis(tetrahydroindenyl)zirconium dimethyl, bis (1,2-dimethylcyclopentadienyl)zirconium dimethyl, bis(1,3-dimethylcyclopentadienyl)zirconium dimethyl, bis(1,2,4-trimethylcyclopentadienyl)zirconium dimethyl, bis (tetramethylcyclopentadienyl)zirconium dimethyl or bis (methyl-3-n-butycyclopentadienyl)zirconium dimethyl, or many other dialkyl metallocenes, etc.), a small amount of tri-alkylaluminums is used to give the optimum catalyst productivity. In this case the molar ratio of trialkylaluminum to metallocene is typically 2 to 500, preferably 3 to 200, more preferably 3 to 100 or 3 to 10. The amount of NCA used is also important. The molar ratio of metallocene to NCA can ranged from 10 to 0.1. The more preferred molar ratio of metallocene to NCA is close to 1 to 1 or 0.5 to 2.

In addition, the amount of metallocene concentration is important. In order to achieve the highest catalyst productivity, highest selectivity to lube range product and best temperature control and operability, the preferred amount of metallocene per gram of olefin feeds ranges from 1 microgram (or 0.001 milligram)/gram to 1 milligram/gram of olefins. When amounts of catalyst components used are too high, the temperature control can become difficult, product selectivity can suffer and catalyst cost can become un-economical.

The amount of hydrogen present in the reactor is also important. Usually smaller amounts of hydrogen is preferred. The hydrogen head pressure is usually maintained at or below 300 psi, preferably below 50 psi, preferably below 30 psi, preferably below 20 psi, preferably below 10 psi. Alternatively, the amount of hydrogen in the feed composition is present in a concentration of 1 ppm to 30,000 ppm, preferably 10 to 10,000 ppm, preferably, 10 to 1,000 ppm. Usually, lower hydrogen pressure is maintained to boost activity. Surprisingly, it has been found that hydrogen present in the reaction medium does not readily hydrogenate the starting alpha-olefin feeds into corresponding alkanes at low levels of hydrogen pressure or hydrogen concentration. In fact, when hydrogen is present in the reaction mixture, it has been found that the catalyst productivity increases significantly. This is also desirable in that the presence of low levels of hydrogen leads to olefinic polymers with high vinylidene content which can later be functionalized by known methods, such as those disclosed in U.S. Pat. No. 6,043,401 Therefore, it is preferred to maintain reactor hydrogen pressure below 300 psi, more preferably below 100 psi, preferably less than 50 psi, preferably less than 25 psi, preferably less than 10 psi. Low pressure of hydrogen is not only advantageous for producing unsaturated polymers, it is also important to minimize the hydrogenation of feed stock into low value alkanes. Likewise a minimum amount of hydrogen is desired, preferably the hydrogen is present at least 1 psi, preferably at least 5 psi. Usually, it is practical to add 5 to 100 psi hydrogen to the reactor.

The reaction time or residence time also influences the extent of conversion of the feed olefins. Usually, longer reaction time or residence time favors higher feed olefin conversion. However, to balance high conversion and the high reactor throughput, the reaction time or residence time is usually between 1 minutes to 30 hours, more preferred 5 minutes to 16 hours, more preferred 10 minutes to 10 hours. This total residence time can be achieved by using a single reactor or a series of cascading or parallel reactors or by controlling the reactant feed rates.

By selective choice of metallocenes, activated with NCA and/or co-activator, and by selective choice of reaction operation conditions, including the amount of catalyst used, and with right amount of trialkylaluminum as co-activator or scavenger, residence time or reaction time, and amount of hydrogen, polyalpha-olefins are produced with high catalyst productivity of more than 1.5 kilogram total product per gram of metallocene used. This high productivity makes the process economically and commercially attractive.

After the reaction is completed in the semi-continuous run or batch run or the product withdrawn from the continuous run, the crude product can be worked up by deactivating the catalyst by addition of small amount of oxygen, carbon dioxide, air, water, alcohol, acids or any other catalyst poison agents; washing the product with dilute aqueous sodium hydroxide or hydrochloric acid solution and water; and separating the organic layer. The organic layer typically contains un-reacted olefins, olefin oligomers and solvent. The product fractions can be separated from solvent and un-reacted starting olefins by distillation or other methods known in the art. The product fractions can be further fractionated into light fractions and residual fractions. These fractions typically have one unsaturated double bond per molecule. The double bonds are mostly vinylidene, with some the balance of the olefins being 1,2-disubstituted olefins or tri-substituted olefins. These olefins are suitable for further functionalization into other functional fluids or performance additives according to well-known olefin functionalization reaction, such as alkylation with aromatic containing compounds, with maleic anhydrides, with $CO/H_2$ via hydroformylation reactions, etc. The residual fractions, which usually have little or no light hydrocarbons with less than 24 carbons, can be used as lube base stock or high performance fluids if their bromine number is below 2. If the bromine number is above 2, it can be readily hydrogenated by conventional lube hydrofinishing processes and converted into fully saturated paraffin fluids with bromine number less than 2, usually significantly less than 2. Usually, lower bromine number is more preferred, as it indicates better oxidative stability. These hydrogenated, saturated hydrocarbon paraffins are used as high performance lubricant base stocks or used as high performance functional fluids after formulation. Description of the typical lubricant or functional fluids formulation can be found in the book and the references in "Synthetic Lubricants and High—Performance Functional Fluids", $2^{nd}$ edition, ed. by L. R. Rudnick and R. L. Shubkin, Marcel Dekker, Inc., N.Y. 1999.

Alternatively, the crude product from the polymerization reactor can be worked up by absorbing the catalyst components and scavenger components and any other heteroatom-containing components using a solid sorbent. This is a preferred method and is used in the examples below. In this method, a catalyst de-activator as described above is added to the crude reaction, followed by the addition of a solid absorbent. Or alternatively, a solid absorbent, such as alumina, acid clay, Celite®, or any known filter aid, is added to the crude product. The slurry is stirred for a pre-determined amount of time, usually greater than 5 minutes. Then the solid is filtered and the filtrate is ready for further distillation or fractionation. This method is described more fully in concurrently filed patent application U.S. Ser. No. 60/831,995, filed Jul. 19, 2006.

In another embodiment, the process further comprises contacting PAO produced herein with hydrogen under typical hydrogenation conditions with hydrogenation catalyst to give a mostly saturated paraffinic PAO.

Metallocene Catalyst Compounds

For purposes of this invention and the claims thereto, the terms "hydrocarbyl radical," "hydrocarbyl," and hydrocarbyl group" are used interchangeably throughout this document. Likewise the terms "group," "radical," and "substituent" are also used interchangeably throughout this document. For purposes of this disclosure, "hydrocarbyl radical" is defined to be a $C_1$-$C_{100}$ radical and may be linear, branched, or cyclic. When cyclic, the hydrocarbon radical may be aromatic or non-aromatic. "Hydrocarbon radical" is defined to include substituted hydrocarbyl radicals, halocarbyl radicals, substituted halocarbyl radicals, silylcarbyl radicals, and germylcarbyl radicals as these terms are defined below. Substituted hydrocarbyl radicals are radicals in which at least one hydrogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$ and the like or where at least one non-hydrocarbon atom or group has been inserted within the hydrocarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure.

Halocarbyl radicals are radicals in which one or more hydrocarbyl hydrogen atoms have been substituted with at least one halogen (e.g. F, Cl, Br, I) or halogen-containing group (e.g. $CF_3$).

Substituted halocarbyl radicals are radicals in which at least one halocarbyl hydrogen or halogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$ and the like or where at least one non-carbon atom or group has been inserted within the halocarbyl radical such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical provided that at least one halogen atom remains on the original halocarbyl radical. Additionally, two or more R* may join together to form a substituted or unsubstituted saturated, partially unsaturated or aromatic cyclic or polycyclic ring structure.

Silylcarbyl radicals (also called silylcarbyls) are groups in which the silyl functionality is bonded directly to the indicated atom or atoms. Examples include $SiH_3$, $SiH_2R^*$, $SiHR^*_2$, $SiR^*_3$, $SiH_2(OR^*)$, $SiH(OR^*)_2$, $Si(OR^*)_3$, $SiH_2(NR^*_2)$, $SiH(NR^*_2)_2$, $Si(NR^*_2)_3$, and the like where R* is independently a hydrocarbyl or halocarbyl radical and two or more R* may join together to form a substituted or unsubstituted saturated, partially unsaturated or aromatic cyclic or polycyclic ring structure.

Germylcarbyl radicals (also called germylcarbyls) are groups in which the germyl functionality is bonded directly to the indicated atom or atoms. Examples include $GeH_3$, $GeH_2R^*$, $GeHR^*_2$, $GeR^5_3$, $GeH_2(OR^*)$, $GeH(OR^*)_2$, $Ge(OR^*)_3$, $GeH_2(NR^*_2)$, $GeH(NR^*_2)_2$, $Ge(NR^*_2)_3$, and the like where R* is independently a hydrocarbyl or halocarbyl radical and two or more R* may join together to form a substituted or unsubstituted saturated, partially unsaturated or aromatic cyclic or polycyclic ring structure.

Polar radicals or polar groups are groups in which a heteroatom functionality is bonded directly to the indicated atom or atoms. They include heteroatoms of groups 1-17 of the periodic table (except carbon and hydrogen) either alone or connected to other elements by covalent bonds or other interactions such as ionic bonds, van der Waals forces, or hydrogen bonding. Examples of functional heteroatom containing groups include carboxylic acids, acid halides, carboxylic esters, carboxylic salts, carboxylic anhydrides, aldehydes and their chalcogen (Group 14) analogues, alcohols and phenols, ethers, peroxides and hydroperoxides, carboxylic amides, hydrazides and imides, amidines and other nitrogen analogues of amides, nitriles, amines and imines, azos, nitros, other nitrogen compounds, sulfur acids, selenium acids, thiols, sulfides, sulfoxides, sulfones, phosphines, phosphates, other phosphorus compounds, silanes, boranes, borates, alanes, aluminates. Functional groups may also be taken broadly to include organic polymer supports or inorganic support material such as alumina, and silica. Preferred examples of polar groups include $NR*_2$, $OR*$, $SeR*$, $TeR*$, $PR*_2$, $AsR*_2$, $SbR*_2$, $SR*$, $BR*_2$, $SnR*_3$, $PbR*_3$ and the like where $R*$ is independently a hydrocarbyl, substituted hydrocarbyl, halocarbyl or substituted halocarbyl radical as defined above and two $R*$ may join together to form a substituted or unsubstituted saturated, partially unsaturated or aromatic cyclic or polycyclic ring structure.

In using the terms "substituted or unsubstituted cyclopentadienyl ligand", "substituted or unsubstituted indenyl ligand", "substituted or unsubstituted fluorenyl ligand" and "substituted or unsubstituted tetrahydroindenyl ligand", the substitution to the aforementioned ligand may be hydrocarbyl, substituted hydrocarbyl, halocarbyl, substituted halocarbyl, silylcarbyl, or germylcarbyl. The substitution may also be within the ring giving heterocyclopentadienyl ligands, heteroindenyl ligands, heterofluorenyl ligands, or heterotetrahydoindenyl ligands, each of which can additionally be substituted or unsubstituted.

In some embodiments, the hydrocarbyl radical is independently selected from methyl, ethyl, ethenyl, and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, triacontynyl, butadienyl, pentadienyl, hexadienyl, heptadienyl, octadienyl, nonadienyl, and decadienyl. Also included are isomers of saturated, partially unsaturated and aromatic cyclic and polycyclic structures wherein the radical may additionally be subjected to the types of substitutions described above. Examples include phenyl, methylphenyl, dimethylphenyl, ethylphenyl, diethylphenyl, propylphenyl, dipropylphenyl, benzyl, methylbenzyl, naphthyl, anthracenyl, cyclopentyl, cyclopentenyl, cyclohexyl, cyclohexenyl, methylcyclohexyl, cycloheptyl, cycloheptenyl, norbornyl, norbornenyl, adamantyl and the like. For this disclosure, when a radical is listed, it indicates that radical type and all other radicals formed when that radical type is subjected to the substitutions defined above. Alkyl, alkenyl and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl and 2-methyl-2-propenyl (and cyclobutenyls and cyclopropenyls). Cyclic compound having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl. Examples of cyclopentadienyl and indenyl ligands are illustrated below as part of the ligands.

A "ring carbon atom" is a carbon atom that is part of a cyclic ring structure. By this definition, an indenyl ligand has nine ring carbon atoms; a cyclopentadienyl ligand has five ring carbon atoms and a flourenyl ligand has 13 carbon atoms. Thus an indene is equivalent to a Cp ring with two alkyl radical substituents and a fluorene is equivalent to a Cp ring with four alkyl radical substituents. In addition, the cyclic ring can also be hydrogenated, for example, di-hydro- or tetra-hydro-indenyl ligand, di-hydro, tetra-hydro or octa-hydro-flurorenyl ligands are suitable.

The metallocene compounds (pre-catalysts), useful herein are preferably cyclopentadienyl derivatives of titanium, zirconium and hafnium. In general, useful titanocenes, zirconocenes and hafnocenes may be represented by the following formulae:

$$(CpCp*)MX_1X_2 \qquad (2)$$

wherein:

M is the metal center, and is a Group 4 metal preferably titanium, zirconium or hafnium, preferably zirconium or hafnium;

Cp and Cp* are the same or different cyclopentadienyl rings that are each bonded to M, and 1) both Cp and Cp* are substituted with at least one non-isoalkyl substituent, or 2) Cp is substituted with from two to five substituents "R", preferably both Cp and Cp* are substituted with from two to five substituents "R", each substituent group R being, independently, a radical group which is a hydrocarbyl, substituted hydrocarbyl, halocarbyl, substituted halocarbyl, silylcarbyl or germylcarbyl, or Cp and Cp* are the same or different cyclopentadienyl rings in which any two adjacent R groups are optionally joined to form a substituted or unsubstituted, saturated, partially unsaturated, or aromatic cyclic or polycyclic substituent;

$X_1$ and $X_2$ are, independently, hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand.

Table A depicts representative constituent moieties for the metallocene components of formula 2. The list is for illustrative purposes only and should not be construed to be limiting in any way. A number of final components may be formed by permuting all possible combinations of the constituent moieties with each other. When hydrocarbyl radicals including alkyl, alkenyl, alkynyl, cycloalkyl, cycloalkenyl, cycloalkynyl and aromatic radicals are disclosed in this application the term includes all isomers. For example, butyl includes n-butyl, 2-methylpropyl, tert-butyl, and cyclobutyl; pentyl includes n-pentyl, 1-methylbutyl, 2-methylbutyl, 3-methylbutyl, 1-ethylpropyl, neopentyl, cyclopentyl and methylcyclobutyl; butenyl includes E and Z forms of 1-butenyl, 2-butenyl, 3-butenyl, 1-methyl-1-propenyl, 1-methyl-2-propenyl, 2-methyl-1-propenyl and 2-methyl-2-propenyl. This includes when a radical is bonded to another group, for example, propylcyclopentadienyl include n-propylcyclopentadienyl, isopropylcyclopentadienyl and cyclopropylcyclopentadienyl.

In general, the ligands or groups illustrated in Table A include all isomeric forms. For example, dimethylcyclopentadienyl includes 1,2-dimethylcyclopentadienyl and 1,3-dimethylcyclopentadienyl; methylindenyl includes 1-methylindenyl, 2-methylindenyl, 3-methylindenyl, 4-methylindenyl, 5-methylindenyl, 6-methylindenyl and 7-methylindenyl; methylethylphenyl includes ortho-methylethylphenyl, meta-methylethylphenyl and para-methylethylphenyl. To illustrate members of the transition metal component, select any combination of the species listed in Tables A.

TABLE A

| M | Cp, Cp* |
|---|---|
| titanium | methylcyclopentadienyl |
| zirconium | dimethylcyclopentadienyl |
| hafnium | trimethylcyclopentadienyl |
| | tetramethylcyclopentadienyl |
| | ethylcyclopentadienyl |
| | diethylcyclopentadienyl |
| | propylcyclopentadienyl |
| | dipropylcyclopentadienyl |
| | butylcyclopentadienyl |
| | dibutylcyclopentadienyl |
| | pentylcyclopentadienyl |
| | dipentylcyclopentadienyl |
| | hexylcyclopentadienyl |
| | dihexylcyclopentadienyl |
| | heptylcyclopentadienyl |
| | diheptylcyclopentadienyl |
| | octylcyclopentadienyl |
| | dioctylcyclopentadienyl |
| | nonylcyclopentadienyl |
| | dinonylcyclopentadienyl |
| | decylcyclopentadienyl |
| | didecylcyclopentadienyl |
| | undecylcyclopentadienyl |
| | dodecylcyclopentadienyl |
| | tridecylcyclopentadienyl |
| | tetradecylcyclopentadienyl |
| | pentadecylcyclopentadienyl |
| | hexadecylcyclopentadienyl |
| | heptadecylcyclopentadienyl |
| | octadecylcyclopentadienyl |
| | nonadecylcyclopentadienyl |
| | eicosylcyclopentadienyl |
| | heneicosylcyclopentadienyl |
| | docosylcyclopentadienyl |
| | tricosylcyclopentadienyl |
| | tetracosylcyclopentadienyl |
| | pentacosylcyclopentadienyl |
| | hexacosylcyclopentadienyl |
| | heptacosylcyclopentadienyl |
| | octacosylcyclopentadienyl |
| | nonacosylcyclopentadienyl |
| | triacontylcyclopentadienyl |
| | cyclohexylcyclopentadienyl |
| | phenylcyclopentadienyl |
| | diphenylcyclopentadienyl |
| | triphenylcyclopentadienyl |
| | tetraphenylcyclopentadienyl |
| | tolylcyclopentadienyl |
| | benzylcyclopentadienyl |
| | phenethylcyclopentadienyl |
| | cyclohexylmethylcyclopentadienyl |
| | napthylcyclopentadienyl |
| | methylphenylcyclopentadienyl |
| | methyltolylcyclopentadienyl |
| | methylethylcyclopentadienyl |
| | methylpropylcyclopentadienyl |
| | methylbutylcyclopentadienyl |
| | methylpentylcyclopentadienyl |
| | methylhexylcyclopentadienyl |
| | methylheptylcyclopentadienyl |
| | methyloctylcyclopentadienyl |
| | methylnonylcyclopentadienyl |
| | methyldecylcyclopentadienyl |
| | vinylcyclopentadienyl |

TABLE A-continued

| M | Cp, Cp* |
|---|---|
| | propenylcyclopentadienyl |
| | butenylcyclopentadienyl |
| | indenyl |
| | methylindenyl |
| | dimethylindenyl |
| | trimethylindenyl |
| | tetramethylindenyl |
| | pentamethylindenyl |
| | methylpropylindenyl |
| | dimethylpropylindenyl |
| | methyldipropylindenyl |
| | methylethylindenyl |
| | methylbutylindenyl |
| | ethylindenyl |
| | propylindenyl |
| | butylindenyl |
| | pentylindenyl |
| | hexylindenyl |
| | heptylindenyl |
| | octylindenyl |
| | nonylindenyl |
| | decylindenyl |
| | phenylindenyl |
| | (fluorophenyl)indenyl |
| | (methylphenyl)indenyl |
| | biphenylindenyl |
| | (bis(trifluoromethyl)phenyl)indenyl |
| | napthylindenyl |
| | phenanthrylindenyl |
| | benzylindenyl |
| | benzindenyl |
| | cyclohexylindenyl |
| | methylphenylindenyl |
| | ethylphenylindenyl |
| | propylphenylindenyl |
| | methylnapthylindenyl |
| | ethylnapthylindenyl |
| | propylnapthylindenyl |
| | (methylphenyl)indenyl |
| | (dimethylphenyl)indenyl |
| | (ethylphenyl)indenyl |
| | (diethylphenyl)indenyl |
| | (propylphenyl)indenyl |
| | (dipropylphenyl)indenyl |
| | methyltetrahydroindenyl |
| | ethyltetrahydroindenyl |
| | propyltetrahydroindenyl |
| | butyltetrahydroindenyl |
| | phenyltetrahydroindenyl |
| | (diphenylmethyl)cyclopentadienyl |
| | trimethylsilylcyclopentadienyl |
| | triethylsilylcyclopentadienyl |
| | trimethylgermylcyclopentadienyl |
| | trifluromethylcyclopentadienyl |
| | cyclopenta[b]thienyl |
| | cyclopenta[b]furanyl |
| | cyclopenta[b]selenophenyl |
| | cyclopenta[b]tellurophenyl |
| | cyclopenta[b]pyrrolyl |
| | cyclopenta[b]phospholyl |
| | cyclopenta[b]arsolyl |
| | cyclopenta[b]stibolyl |
| | methylcyclopenta[b]thienyl |
| | methylcyclopenta[b]furanyl |
| | methylcyclopenta[b]selenophenyl |
| | methylcyclopenta[b]tellurophenyl |
| | methylcyclopenta[b]pyrrolyl |
| | methylcyclopenta[b]phospholyl |
| | methylcyclopenta[b]arsolyl |
| | methylcyclopenta[b]stibolyl |
| | dimethylcyclopenta[b]thienyl |
| | dimethylcyclopenta[b]furanyl |
| | dimethylcyclopenta[b]pyrrolyl |
| | dimethylcyclopenta[b]phospholyl |
| | trimethylcyclopenta[b]thienyl |
| | trimethylcyclopenta[b]furanyl |
| | trimethylcyclopenta[b]pyrrolyl |
| | trimethylcyclopenta[b]phospholyl |

TABLE A-continued

| M | Cp, Cp* |
|---|---|
| | ethylcyclopenta[b]thienyl |
| | ethylcyclopenta[b]furanyl |
| | ethylcyclopenta[b]pyrrolyl |
| | ethylcyclopenta[b]phospholyl |
| | diethylcyclopenta[b]thienyl |
| | diethylcyclopenta[b]furanyl |
| | diethylcyclopenta[b]pyrrolyl |
| | diethylcyclopenta[b]phospholyl |
| | triethylcyclopenta[b]thienyl |
| | triethylcyclopenta[b]furanyl |
| | triethylcyclopenta[b]pyrrolyl |
| | triethylcyclopenta[b]phospholyl |
| | propylcyclopenta[b]thienyl |
| | propylcyclopenta[b]furanyl |
| | propylcyclopenta[b]pyrrolyl |
| | propylcyclopenta[b]phospholyl |
| | dipropylcyclopenta[b]thienyl |
| | dipropylcyclopenta[b]furanyl |
| | dipropylcyclopenta[b]pyrrolyl |
| | dipropylcyclopenta[b]phospholyl |
| | tripropylcyclopenta[b]thienyl |
| | tripropylcyclopenta[b]furanyl |
| | tripropylcyclopenta[b]pyrrolyl |
| | tripropylcyclopenta[b]phospholyl |
| | butylcyclopenta[b]thienyl |
| | butylcyclopenta[b]furanyl |
| | butylcyclopenta[b]pyrrolyl |
| | butylcyclopenta[b]phospholyl |
| | dibutylcyclopenta[b]thienyl |
| | dibutylcyclopenta[b]furanyl |
| | dibutylcyclopenta[b]pyrrolyl |
| | dibutylcyclopenta[b]phospholyl |
| | tributylcyclopenta[b]thienyl |
| | tributylcyclopenta[b]furanyl |
| | tributylcyclopenta[b]pyrrolyl |
| | tributylcyclopenta[b]phospholyl |
| | ethylmethylcyclopenta[b]thienyl |
| | ethylmethylcyclopenta[b]furanyl |
| | ethylmethylcyclopenta[b]pyrrolyl |
| | ethylmethylcyclopenta[b]phospholyl |
| | methylpropylcyclopenta[b]thienyl |
| | methylpropylcyclopenta[b]furanyl |
| | methylpropylcyclopenta[b]pyrrolyl |
| | methylpropylcyclopenta[b]phospholyl |
| | butylmethylcyclopenta[b]thienyl |
| | butylmethylcyclopenta[b]furanyl |
| | butylmethylcyclopenta[b]pyrrolyl |
| | butylmethylcyclopenta[b]phospholyl |
| | cyclopenta[c]thienyl |
| | cyclopenta[c]furanyl |
| | cyclopenta[c]selenophenyl |
| | cyclopenta[c]tellurophenyl |
| | cyclopenta[c]pyrrolyl |
| | cyclopenta[c]phospholyl |
| | cyclopenta[c]arsolyl |
| | cyclopenta[c]stibolyl |
| | methylcyclopenta[c]thienyl |
| | methylcyclopenta[c]furanyl |
| | methylcyclopenta[c]selenophenyl |
| | methylcyclopenta[c]tellurophenyl |
| | methylcyclopenta[c]pyrrolyl |
| | methylcyclopenta[c]phospholyl |
| | methylcyclopenta[c]arsolyl |
| | methylcyclopenta[c]stibolyl |
| | dimethylcyclopenta[c]thienyl |
| | dimethylcyclopenta[c]furanyl |
| | dimethylcyclopenta[c]pyrrolyl |
| | dimethylcyclopenta[c]phospholyl |
| | trimethylcyclopenta[c]thienyl |
| | trimethylcyclopenta[c]furanyl |
| | trimethylcyclopenta[c]pyrrolyl |
| | trimethylcyclopenta[c]phospholyl |
| | ethylcyclopenta[c]thienyl |
| | ethylcyclopenta[c]furanyl |
| | ethylcyclopenta[c]pyrrolyl |
| | ethylcyclopenta[c]phospholyl |
| | diethylcyclopenta[c]thienyl |
| | diethylcyclopenta[c]furanyl |
| | diethylcyclopenta[c]pyrrolyl |
| | diethylcyclopenta[c]phospholyl |
| | triethylcyclopenta[c]thienyl |
| | triethylcyclopenta[c]furanyl |
| | triethylcyclopenta[c]pyrrolyl |
| | triethylcyclopenta[c]phospholyl |
| | propylcyclopenta[c]thienyl |
| | propylcyclopenta[c]furanyl |
| | propylcyclopenta[c]pyrrolyl |
| | propylcyclopenta[c]phospholyl |
| | dipropylcyclopenta[c]thienyl |
| | dipropylcyclopenta[c]furanyl |
| | dipropylcyclopenta[c]pyrrolyl |
| | dipropylcyclopenta[c]phospholyl |
| | tripropylcyclopenta[c]thienyl |
| | tripropylcyclopenta[c]furanyl |
| | tripropylcyclopenta[c]pyrrolyl |
| | tripropylcyclopenta[c]phospholyl |
| | butylcyclopenta[c]thienyl |
| | butylcyclopenta[c]furanyl |
| | butylcyclopenta[c]pyrrolyl |
| | butylcyclopenta[c]phospholyl |
| | dibutylcyclopenta[c]thienyl |
| | dibutylcyclopenta[c]furanyl |
| | dibutylcyclopenta[c]pyrrolyl |
| | dibutylcyclopenta[c]phospholyl |
| | tributylcyclopenta[c]thienyl |
| | tributylcyclopenta[c]furanyl |
| | tributylcyclopenta[c]pyrrolyl |
| | tributylcyclopenta[c]phospholyl |
| | ethylmethylcyclopenta[c]thienyl |
| | ethylmethylcyclopenta[c]furanyl |
| | ethylmethylcyclopenta[c]pyrrolyl |
| | ethylmethylcyclopenta[c]phospholyl |
| | methylpropylcyclopenta[c]thienyl |
| | methylpropylcyclopenta[c]furanyl |
| | methylpropylcyclopenta[c]pyrrolyl |
| | methylpropylcyclopenta[c]phospholyl |
| | butylmethylcyclopenta[c]thienyl |
| | butylmethylcyclopenta[c]furanyl |
| | butylmethylcyclopenta[c]pyrrolyl |
| | butylmethylcyclopenta[c]phospholyl |
| | pentamethylcyclopentadienyl |
| | tetrahydroindenyl |
| | methyltetrahydroindenyl |
| | dimethyltetrahydroindenyl |

In a preferred embodiment of the invention, when used with an NCA, Cp is the same as Cp* and is a substituted cyclopentadienyl, indenyl or tetrahydroindenyl ligand.

Preferred metallocene compounds (pre-catalysts) which, according to the present invention, provide catalyst systems which are specific to the production of PAO of greater than 20 cSt include:

bis(1,2-dimethylcyclopentadienyl)zirconium dichloride
bis(1,3-dimethylcyclopentadienyl)zirconium dichloride
bis(1,2,3-trimethylcyclopentadienyl)zirconium dichloride
bis(1,2,4-trimethylcyclopentadienyl)zirconium dichloride
bis(1,2,3,4-tetramethylcyclopentadienyl)zirconium dichloride
bis(1,2,3,4,5-pentamethylcyclopentadienyl)zirconium dichloride
bis(1-methyl-2-ethylcyclopentadienyl)zirconium dichloride
bis(1-methyl-2-n-propylcyclopentadienyl)zirconium dichloride
bis(1-methyl-2-n-butylcyclopentadienyl)zirconium dichloride
bis(1-methyl-3-ethylcyclopentadienyl)zirconium dichloride
bis(1-methyl-3-n-propylcyclopentadienyl)zirconium dichloride
bis(1-methyl-3-n-butylcyclopentadienyl)zirconium dichloride bis(1-methyl-3-n-pentylcyclopentadienyl)zirconium dichloride
bis(1,2-dimethyl-4-ethylcyclopentadienyl)zirconium dichloride
bis(1,2-dimethyl-4-n-propylcyclopentadienyl)zirconium dichloride
bis(1,2-dimethyl-4-n-butylcyclopentadienyl)zirconium dichloride
bis(1,2-diethylcyclopentadienyl)zirconium dichloride
bis(1,3-diethylcyclopentadienyl)zirconium dichloride
bis(1,2-di-n-propylcyclopentadienyl)zirconium dichloride
bis(1,2-di-n-butylcyclopentadienyl)zirconium dichloride
bis(1-methyl-2,4-diethylcyclopentadienyl)zirconium dichloride
bis(1,2-diethyl-4-n-propylcyclopentadienyl)zirconium dichloride
bis(1,2-diethyl-4-n-butylcyclopentadienyl)zirconium dichloride
bis(1-methyl-3-i-propylcyclopentadienyl)zirconium dichloride
bis(1-ethyl-3-i-propylcyclopentadienyl)zirconium dichloride
(1,2-dimethylcyclopentadienyl)(cyclopentadienyl)zirconium dichloride
(1,3-dimethylcyclopentadienyl)(cyclopentadienyl)zirconium dichloride
(1,2-dimethylcyclopentadienyl)(methylcyclopentadienyl)zirconium dichloride
(1,2-dimethylcyclopentadienyl)(ethylcyclopentadienyl)zirconium dichloride
(1,2-dimethylcyclopentadienyl)(1,2-di-n-butylcyclopentadienyl)zirconium dichloride
(1,3-dimethylcyclopentadienyl)(cyclopentadienyl)zirconium dichloride
(1,3-dimethylcyclopentadienyl)(1,2-dimethylcyclopentadienyl)zirconium dichloride
(1,3-dimethylcyclopentadienyl)(1,3-diethylcyclopentadienyl)zirconium dichloride
bis(indenyl)zirconium dichloride
bis(1-methylindenyl)zirconium dichloride
bis(2-methylindenyl)zirconium dichloride
bis(4-methylindenyl)zirconium dichloride
bis(4,7-dimethylindenyl)zirconium dichloride
bis(4,5,6,7-tetrahydroindenyl)zirconium dichloride
bis(4,5,6,7-tetrahydro-2-methylindenyl)zirconium dichloride
bis(4,5,6,7-tetrahydro-4,7-dimethylindenyl)zirconium dichloride
(cyclopentadienyl)(4,5,6,7-tetrahydroindenyl)zirconium dichloride The preferred catalysts also include the zirconium dihalides, di-methyl, di-isobutyl, di-n-octyl or other di-alkyl analogs of the above compounds, and the hafnium dichloride, dihalides, or the hafnium di-methyl or di-alkyl analogs of the above compounds.

Particularly preferred catalyst compounds also include bis(1,2-dimethylcyclopentadienyl)zirconium dichloride, bis(1,3-dimethylcyclopentadienyl)zirconium dichloride, bis(1,2,3-trimethylcyclopentadienyl)zirconium dichloride, bis(1,2,4-trimethylcyclopentadienyl)zirconium dichloride and bis(tetramethylcyclopentadienyl)zirconium dichloride, bis(1-methyl-2-ethylcyclopentadienyl)zirconium dichloride, bis(1-methyl-3-ethylcyclopentadienyl)zirconium dichloride, bis(1-methyl-3-n-propylcyclopentadienyl)zirconium dichloride, bis(1-methyl-3-n-butylclopentadienyl)zirconium dichloride, bis(4,5,6,7-tetrahydro indenyl)zirconium dichloride, bis(indenyl)zirconium dichloride, bis(1,2-dimethylcyclopentadienyl)zirconium dimethyl, bis(1,3-dimethylcyclopentadienyl)zirconium dimethyl, bis(1,2,3-trimethylcyclopentadienyl)zirconium dimethyl, bis(1,2,4-trimethylcyclopentadienyl)zirconium dimethyl and bis(tetramethylcyclopentadienyl)zirconium dimethyl, bis(1-methyl-2-ethylcyclopentadienyl)zirconium dimethyl, bis(1-methyl-3-ethylcyclopentadienyl)zirconium dimethyl, bis(1-methyl-3-n-propylcyclopentadienyl)zirconium dimethyl, bis(1-methyl-3-n-butylclopentadienyl)zirconium dimethyl, bis(4,5,6,7-tetrahydro indenyl)zirconium dichloride, bis(indenyl)zirconium dimethyl, or their diisobutyl analogs These metallocene dialkyl components maybe present in the catalyst system by using the preformed metallocene as the starting material. Sometimes, they are present as reaction products from metallocene dihalides with trialkylaluminum compounds (co-activators/scavengers)

In an alternate embodiment, the metallocene compound is not racemic.

Activators and Catalyst Activation

The catalyst precursors, when activated by an activator such as non-coordinating anion activator, form active catalysts for the polymerization or oligomerization of olefins. Activators that may be used include Lewis acid activators such as triphenylboron, tris-perfluorophenylboron, tris-perfluorophenylaluminum and the like and or ionic activators such as dimethylanilinium tetrakisperfluorophenylborate, triphenylcarboniumtetrakis perfluorophenylborate, dimethylaniliniumtetrakisperfluorophenylaluminate, and the like.

A co-activator is a compound capable of alkylating the transition metal complex, such that when used in combination with an activator, an active catalyst is formed. Co-activators include alumoxanes such as methylalumoxane, modified alumoxanes such as modified methylalumoxane, and aluminum alkyls such trimethylaluminum, tri-isobutylaluminum, triethylaluminum, and tri-isopropylaluminum, tri-n-hexylaluminum, tri-n-octylaluminum, tri-n-decylaluminum or tri-n-dodecylaluminum. Co-activators are typically used in combination with Lewis acid activators and ionic activators when the pre-catalyst is not a dihydrocarbyl or dihydride complex. Sometimes co-activators are also used and added to the feed streams or to the catalyst stream or to the reactor in single or multiple streams as scavengers to deactivate impurities in feed or reactors. In many cases, even when the dialkyl form of the metallocene component is used, small amounts of co-activator is also added to the catalyst system or to the reactor system for a further promoting effect or to scavenge an impurity of the reactor system.

Particularly preferred co-activators include alkylaluminum compounds represented by the formula: $R_3Al$, where each R is, independently, a C1 to C18 alkyl group, preferably each R is, independently, selected from the group consisting of methyl, ethyl, n-propyl, iso-propyl, iso-butyl, n-butyl, t-butyl, n-pentyl, iso-pentyl, neopentyl, n-hexyl, iso-hexyl, n-heptyl, iso-heptyl, n-octyl, iso-octyl, n-nonyl, n-decyl, n-undecyl, n-dodecyl, n-tridecyl, n-tetradecyl, n-pentadecyl, n-hexadecyl, n-heptadecyl, n-octadecyl, and their iso-analogs.

Ionic activators (at times used in combination with a co-activator) may be used in the practice of this invention. Preferably, discrete ionic activators such as [Me$_2$PhNH] [B(C$_6$F$_5$)$_4$], [Ph$_3$C] [B(C$_6$F$_5$)$_4$], [Me$_2$PhNH] [B((C$_6$H$_3$-3,5-(CF$_3$)$_2$))$_4$], [Ph$_3$C][B((C$_6$H$_3$-3,5-(CF$_3$)$_2$))$_4$], [NH$_4$][B(C$_6$H$_5$)$_4$] or Lewis acidic activators such as B(C$_6$F$_5$)$_3$ or B(C$_6$H$_5$)$_3$ can be used, where Ph is phenyl and Me is methyl. Preferred co-activators, when used, are alumoxanes such as methylalumoxane, modified alumoxanes such as modified methylalumoxane, and aluminum alkyls such as tri-isobutylaluminum, and trimethylaluminum, triethylaluminum, and tri-isopropylaluminum, tri-n-hexylaluminum, tri-n-octylaluminum, tri-n-decylaluminum or tri-n-dodecylaluminum.

It is within the scope of this invention to use an ionizing or stoichiometric activator, neutral or ionic, such as tri(n-butyl) ammoniumtetrakis(pentafluorophenyl)borate, a trisperfluorophenyl boron metalloid precursor or a trisperfluoronaphthyl boron metalloid precursor, polyhalogenated heteroborane anions (WO 98/43983), boric acid (U.S. Pat. No. 5,942,459) or combination thereof.

Examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, naphthyl or mixtures thereof. Even more preferably, the three groups are halogenated, preferably fluorinated, aryl groups. Most preferably, the neutral stoichiometric activator is trisperfluorophenyl boron or trisperfluoronaphthyl boron.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

Ionic catalysts can be prepared by reacting a transition metal compound with an activator, such as $B(C_6F_6)_3$, which upon reaction with the hydrolyzable ligand (X') of the transition metal compound forms an anion, such as $([B(C_6F_5)_3(X')]^-)$, which stabilizes the cationic transition metal species generated by the reaction. The catalysts can be, and preferably are, prepared with activator components which are ionic compounds or compositions. However preparation of activators utilizing neutral compounds is also contemplated by this invention.

Compounds useful as an activator component in the preparation of the ionic catalyst systems used in the process of this invention comprise a cation, which is preferably a Brønsted acid capable of donating a proton, and a compatible non-coordinating anion which anion is relatively large (bulky), capable of stabilizing the active catalyst species which is formed when the two compounds are combined and said anion will be sufficiently labile to be displaced by olefinic, diolefinic, and acetylenically unsaturated substrates or other neutral Lewis bases such as ethers, nitriles, and the like. Two classes of compatible non-coordinating anions have been disclosed in EPA 277,003 and EPA 277,004 published 1988:1) anionic coordination complexes comprising a plurality of lipophilic radicals covalently coordinated to and shielding a central charge-bearing metal or metalloid core, and 2) anions comprising a plurality of boron atoms such as carboranes, metallacarboranes and boranes. In a preferred embodiment, the stoichiometric activators include a cation and an anion component, and may be represented by the following formula: $(L^{}-H)^{d+}(A^{d-})$ wherein $L^{}$ is a neutral Lewis base; H is hydrogen; $(L^{**}-H)^{d+}$ is a Brønsted acid, $A^{d-}$ is a non-coordinating anion having the charge d−, d is an integer from 1 to 3.

The cation component, $(L^{**}-H)^{d+}$ may include Brønsted acids such as protons or protonated Lewis bases or reducible Lewis acids capable of protonating or abstracting a moiety, such as an alkyl or aryl, from the precatalyst after alkylation.

The activating cation $(L^{}-H)^{d+}$ may be a Brønsted acid, capable of donating a proton to the alkylated transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo-N,N-dimethylaniline, p-nitro-N,N-dimethylaniline, phosphoniums from triethylphosphine, triphenylphosphine, and diphenylphosphine, oxoniums from ethers such as dimethyl ether, diethyl ether, tetrahydrofuran and dioxane, sulfoniums from thioethers, such as diethyl thioethers and tetrahydrothiophene, and mixtures thereof. The activating cation $(L^{}-H)^{d+}$ may also be a moiety such as silver, tropylium, carbeniums, ferroceniums and mixtures, preferably carboniums and ferroceniums; most preferably triphenyl carbonium.

The anion component $A^{d-}$ include those having the formula $[M^{k+}Q_n]^{d-}$ wherein k is an integer from 1 to 3; n is an integer from 2-6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting, examples of boron compounds which may be used as an activating cocatalyst in combination with a co-activator in the preparation of the improved catalysts of this invention are tri-substituted ammonium salts such as: trimethylammonium tetraphenylborate, triethylammonium tetraphenylborate, tripropylammonium tetraphenylborate, tri(n-butyl)ammonium tetraphenylborate, tri(tert-butyl)ammonium tetraphenylborate, N,N-dimethylanilinium tetraphenylborate, N,N-diethylanilinium tetraphenylborate, N,N-dimethyl-(2,4,6-trimethylanilinium) tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium) tetrakis(pentafluorophenyl)borate, trimethylammonium tetrakis-(2,3,4,6-tetrafluorophenyl)borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluorophenyl)borate, dimethyl(tert-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium)tetrakis-(2,3,4,6-tetrafluorophenyl)borate, trimethylammonium tetrakis(perfluoronaphthyl)borate, triethylammonium tetrakis(perfluoronaphthyl)borate, tripropylammonium tetrakis (perfluoronaphthyl)borate, tri(n-butyl)ammonium tetrakis (perfluoronaphthyl)borate, tri(tert-butyl)ammonium tetrakis (perfluoronaphthyl)borate, N,N-dimethylanilinium tetrakis (perfluoronaphthyl)borate, N,N-diethylanilinium tetrakis (perfluoronaphthyl)borate, N,N-dimethyl-(2,4,6-trimethylanilinium) tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl) ammonium tetrakis(perfluorobiphenyl)borate, tri(tert-butyl) ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium) tetrakis (perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri (n-butyl)ammonium tetrakis(3,5-bis(trifluoromethyl)phenyl)borate, tri(tert-butyl)ammonium tetrakis(3,5-bis (trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium) tetrakis(3,5-bis (trifluoromethyl)phenyl)borate, and dialkyl ammonium salts such as: di-(iso-propyl)ammonium tetrakis(pentafluorophenyl)borate, and dicyclohexylammonium tetrakis(pentafluorophenyl)borate; and other salts such as tri(o-tolyl)phosphonium tetrakis(pentafluorophenyl)borate, tri(2,6-dimethylphenyl)phosphonium tetrakis(pentafluorophenyl) borate, tropylium tetraphenylborate, triphenylcarbenium tetraphenylborate, triphenylphosphonium tetraphenylborate, triethylsilylium tetraphenylborate, benzene(diazonium)tetraphenylborate, tropylium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene (diazonium) tetrakis(pentafluorophenyl)borate, tropylium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium)tetrakis-(2,3,4,6-tetrafluorophenyl)borate, tropylium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium) tetrakis(perfluoronaphthyl)borate, tropylium tetrakis(perfluorobiphenyl)borate, triphenylcarbenium tetrakis(perfluorobiphenyl)borate, triphenylphosphonium tetrakis (perfluorobiphenyl)borate, triethylsilylium tetrakis (perfluorobiphenyl)borate, benzene(diazonium) tetrakis (perfluorobiphenyl)borate, tropylium tetrakis(3,5-bis (trifluoromethyl)phenyl)borate, triphenylcarbenium tetrakis (3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl) phenyl)borate, and benzene(diazonium)tetrakis(3,5-bis(trifluoromethyl)phenyl)borate.

Most preferably, the ionic stoichiometric activator (L**–H)$_d^+$(A$^{d-}$) is N,N-dimethylanilinium tetrakis(perfluorophenyl)borate, N,N-dimethylanilinium tetrakis(perfluoronaphthyl)borate, N,N-dimethylanilinium tetrakis (perfluorobiphenyl)borate, N,N-dimethylanilinium tetrakis (3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis (3,5-bis(trifluoromethyl)phenyl)borate, or triphenylcarbenium tetra(perfluorophenyl)borate.

The catalyst precursors can also be activated with cocatalysts or activators that comprise non-coordinating anions containing metalloid-free cyclopentadienide ions. These are described in U.S. Patent Publication 2002/0058765 A1, published on 16 May 2002, and for the instant invention, require the addition of a co-activator to the catalyst pre-cursor. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Preferred non-coordinating anions useful in accordance with this invention are those that are compatible, stabilize the transition metal complex cation in the sense of balancing its ionic charge at +1, yet retain sufficient lability to permit displacement by an ethylenically or acetylenically unsaturated monomer during polymerization. These types of cocatalysts are sometimes used with scavengers such as but not limited to tri-iso-butylaluminum, tri-n-octylaluminum, tri-n-hexylaluminum, triethylaluminum or trimethylaluminum.

Invention processes also can employ cocatalyst compounds or activator compounds that are initially neutral Lewis acids but form a cationic metal complex and a noncoordinating anion, or a zwitterionic complex upon reaction with the alkylated transition metal compounds. The alkylated metallocene compound is formed from the reaction of the catalyst pre-cursor and the co-activator. For example, tris (pentafluorophenyl)boron or aluminum act to abstract a hydrocarbyl ligand to yield an invention cationic transition metal complex and stabilizing noncoordinating anion, see EP-A-0 427 697 and EP-A-0 520 732 for illustrations of analogous Group-4 metallocene compounds. Also, see the methods and compounds of EP-A-0 495 375. For formation of zwitterionic complexes using analogous Group 4 compounds, see U.S. Pat. Nos. 5,624,878; 5,486,632; and 5,527, 929.

Additional neutral Lewis-acids are known in the art and are suitable for abstracting formal anionic ligands. See in particular the review article by E. Y.-X. Chen and T. J. Marks, "Cocatalysts for Metal-Catalyzed Olefin Polymerization: Activators, Activation Processes, and Structure-Activity Relationships", *Chem. Rev.,* 100, 1391-1434 (2000).

When the cations of noncoordinating anion precursors are Brønsted acids such as protons or protonated Lewis bases (excluding water), or reducible Lewis acids such as ferrocenium or silver cations, or alkali or alkaline earth metal cations such as those of sodium, magnesium or lithium, the catalyst-precursor-to-activator molar ratio may be any ratio. Combinations of the described activator compounds may also be used for activation.

When an ionic or neutral stoichiometric activator (such as an NCA) is used, the catalyst-precursor-to-activator molar ratio is from 1:10 to 1:1; 1:10 to 10:1; 1:10 to 2:1; 1:10 to 3:1; 1:10 to 5:1; 1:2 to 1.2:1; 1:2 to 10:1; 1:2 to 2:1; 1:2 to 3:1; 1:2 to 5:1; 1:3 to 1.2:1; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; 1:1 to 1:1.2. The catalyst-precursor-to-co-activator molar ratio is from 1:500 to 1:1, 1:100 to 100:1; 1:75 to 75:1; 1:50 to 50:1; 1:25 to 25:1; 1:15 to 15:1; 1:10 to 10:1; 1:5 to 5:1, 1:2 to 2:1;

1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

Preferred activators and activator/co-activator combinations include trialkylaluminum including trimethyl, triethyl, tri-n-propyl, tri-n-hexyl, tri-n-butyl, tri-n-octyl, tri-n-dodecyl, tri-isopropyl, tri-isobutyl, or tri-isopentyl, etc. with dimethylanilinium tetrakis(pentafluorophenyl)borate or tris(pentafluorophenyl)boron, and mixtures of trimethyl aluminum with dimethylanilinium tetrakis(pentafluorophenyl)borate or tris(pentafluorophenyl)boron In some embodiments, methylalumoxane, modified methylalumoxane, or mixtures of alkylalumoxanes are also used by themselves or as one of the many co-activator components. However, it is often not necessary and less desirable to use alumoxanes because alumoxane compounds are generally more expensive than trialkylaluminum or trialkylboron compounds.

In some embodiments, scavenging compounds are used with stoichiometric activators. Typical aluminum or boron alkyl components useful as scavengers are represented by the general formula $R^xJZ_2$ where J is aluminum or boron, $R^x$ selected from C1 to C20 alkyl radicals and can be the same or different; and each Z is independently $R^x$ or a different univalent anionic ligand such as halogen (Cl, Br, I), alkoxide ($OR^x$) and the like. Most preferred aluminum alkyls include triethylaluminum, diethylaluminum chloride, tri-iso-butylaluminum, tri-n-octylaluminum. tri-n-hexylaluminum, trimethylaluminum and the like. Preferred boron alkyls include triethylboron. Scavenging compounds may also be alumoxanes and modified alumoxanes including methylalumoxane and modified methylalumoxane.

In an alternate embodiment, alkylalumoxane compounds (such as methyl alumoxane, and modified methylalumoxane) are present in the reaction zone at less than 3 milligrams (mg) of alumoxane/gram of olefin feed, preferably less than 1 mg of alumoxane/gram of olefin feed, preferably less than 0.5 mg of alumoxane/g of olefin feed.

Supported Catalysts

Supported catalysts and or supported catalyst systems may be used to prepare PAO's. To prepare uniform supported catalysts, the catalyst precursor preferably dissolves in the chosen solvent. The term "uniform supported catalyst" means that the catalyst precursor, the activator, and or the activated catalyst approach uniform distribution upon the support's accessible surface area, including the interior pore surfaces of porous supports. Some embodiments of supported catalysts prefer uniform supported catalysts; other embodiments show no such preference.

Useful supported catalyst systems may be prepared by any method effective to support other coordination catalyst systems, effective meaning that the catalyst so prepared can be used for oligomerizing or polymerizing olefins in a heterogeneous process. The catalyst precursor, activator, co-activator (if present), suitable solvent, and support may be added in any order or simultaneously.

By one method, the activator, dissolved in an appropriate solvent such as toluene, may be stirred with the support material for 1 minute to 10 hours to prepare the supported catalyst. The total solution volume (of the catalyst solution, the activator solution or both) may be greater than the pore volume of the support, but some embodiments limit the total solution volume below that needed to form a gel or slurry (about 90% to 400%, preferably about 100-200%, of the pore volume). The mixture is optionally heated from 30-200° C. during this time. The catalyst precursor may be added to this mixture as a solid, if a suitable solvent is employed in the previous step, or as a solution. Alternatively, the mixture can be filtered, and the resulting solid mixed with a catalyst precursor solution. Similarly, the mixture may be vacuum dried and mixed with a catalyst precursor solution. The resulting catalyst mixture is then stirred for 1 minute to 10 hours, and the supported catalyst is either filtered from the solution and vacuum dried or subjected to evaporation to remove the solvent.

Alternatively, the catalyst precursor and activator may be combined in solvent to form a solution. The support is then added to the solution, and the resulting mixture is stirred, typically for 1 minute to 10 hours. The total activator/catalyst-precursor solution volume may be greater than the pore volume of the support, but some embodiments limit the total solution volume below that needed to form a gel or slurry (about 90% to 400%, preferably about 100-200% of the pore volume). After stirring, the residual solvent is removed under vacuum, typically at ambient temperature and typically over 10-16 hours; however, greater or lesser times and temperatures may be used.

The catalyst precursor may also be supported absent the activator; in this case, the activator (and optionally co-activator) is added to the liquid phase of a slurry process. For example, a solution of catalyst precursor may be mixed with a support material for a period of about 1 minute to 10 hours. The resulting precatalyst mixture may be filtered from the solution and dried under vacuum or treated with evaporation to remove the solvent. The total catalyst-precursor-solution volume may be greater than the support's pore volume, but some embodiments limit the total solution volume below that needed to form a gel or slurry (about 90% to 400%, preferably about 100-200% of the pore volume).

Additionally, two or more different catalyst precursors may be placed on the same support using any of the support methods disclosed above. Likewise, two or more activators or an activator and a co-activator, may be placed on the same support.

Suitable solid particle supports are typically comprised of polymeric or refractory oxide materials, each being preferably porous. Any support material that has an average particle size greater than 10 µm may be used in this invention. Various embodiments select a porous support material, such as for example, talc, inorganic oxides, inorganic chlorides, for example magnesium chloride and resinous support materials such as polystyrene polyolefin or polymeric compounds or any other organic support material and the like. Some embodiments select inorganic oxide materials as the support material including Group-2, -3, -4, -5, -13, or -14 metal or metalloid oxides. Some embodiments select the catalyst support materials to include silica, alumina, silica-alumina, and their mixtures. Other inorganic oxides may serve either alone or in combination with the silica, alumina, or silica-alumina. These are magnesia, titania, zirconia, and the like. Lewis acidic materials such as montmorillonite and similar clays may also serve as a support. In this case, the support can optionally double as an activator component. But additional activator may also be used. In some cases, a special family of solid support commonly known as MCM-41 can also be used. MCM-41 is a new class of unique crystalline support and can be prepared with tunable pore size and tunable acidity when modified with a second component. A detailed description of this class of materials and their modification can be found in U.S. Pat. No. 5,264,203.

The support material may be pretreated by any number of methods. For example, inorganic oxides may be calcined, chemically treated with dehydroxylating agents such as aluminum alkyls or alumoxanes, such as methylalumoxane, and the like, or both.

As stated above, polymeric carriers will also be suitable in accordance with the invention, see for example the descriptions in WO 95/15815 and U.S. Pat. No. 5,427,991. The methods disclosed may be used with the catalyst compounds, activators or catalyst systems of this invention to adsorb or absorb them on the polymeric supports, particularly if made up of porous particles, or may be chemically bound through functional groups bound to or in the polymer chains.

Useful catalyst carriers may have a surface area of from 10-700 m$^2$/g, and or a pore volume of 0.1-4.0 cc/g and or an average particle size of 10-500 μm. Some embodiments select a surface area of 50-500 m$^2$/g, and or a pore volume of 0.5-3.5 cc/g, and or an average particle size of 20-200 μm. Other embodiments select a surface area of 100-400 m$^2$/g, and or a pore volume of 0.8-3.0 cc/g, and or an average particle size of 30-100 μm. Useful carriers typically have a pore size of 10-1000 Angstroms, alternatively 50-500 Ångstroms, or 75-350 Ångstroms. The metallocenes and or the metallocene/activator combinations are generally deposited on the support at a loading level of 10-100 micromoles of catalyst precursor per gram of solid support; alternatively 20-80 micromoles of catalyst precursor per gram of solid support; or 40-60 micromoles of catalyst precursor per gram of support. But greater or lesser values may be used provided that the total amount of solid catalyst precursor does not exceed the support's pore volume.

The metallocenes and or the metallocene/activator combinations can be supported for bulk, or slurry polymerization, or otherwise as needed. Numerous support methods are known for catalysts in the olefin polymerization art, particularly alumoxane-activated catalysts; all are suitable for use herein. See, for example, U.S. Pat. Nos. 5,057,475 and 5,227,440. An example of supported ionic catalysts appears in WO 94/03056. U.S. Pat. No. 5,643,847 and WO 96/04319A which describe a particularly effective method. Both polymers and inorganic oxides may serve as supports, see U.S. Pat. Nos. 5,422,325, 5,427,991, 5,498,582 and 5,466,649, and international publications WO 93/11172 and WO 94/07928.

In another preferred embodiment, the metallocene and or activator (with or without a support) are combined with an alkylaluminum compound, preferably a trialkylaluminum compound, prior to entering the reactor. Preferably the alkylaluminum compound is represented by the formula: $R_3Al$, where each R is independently a C1 to C20 alkyl group; preferably the R groups are independently selected from the group consisting of methyl, ethyl, propyl, isopropyl, butyl, isobutyl, n-butyl, pentyl, isopentyl, n-pentyl, hexyl, isohexyl, n-hexyl, heptyl, octyl, isooctyl, n-octyl, nonyl, isononyl, n-nonyl, decyl, isodecyl, n-decyl, undecyl, isoundecyl, n-undecyl, dodecyl, isododecyl, and n-dodecyl, preferably isobutyl, n-octyl, n-hexyl, and n-dodecyl. Preferably the alkylaluminum compound is selected from tri-isobutyl aluminum, tri n-octyl aluminum, tri-n-hexyl aluminum, and tri-n-dodecyl aluminum.

Monomers

In a preferred embodiment the catalyst compounds described herein are used to polymerize or oligomerize any unsaturated monomer or monomers. Preferred monomers include the alpha-olfins of $C_3$ to $C_{24}$ olefins, preferably $C_3$ to $C_{20}$ olefins. In some embodiments preferred monomers include linear, branched or cyclic alpha-olefins, preferably $C_3$ to $C_{20}$ alpha-olefins, preferably $C_4$ to $C_{14}$ alpha-olefins, and more preferably $C_8$ to $C_{12}$ alpha-olefins. Preferred olefin monomers may be one or more of e.g., 1-butene, 1-pentene, 1-hexene, 1-heptene, 1-octene, 1-nonene, 1-decene, 1-dodecene, 3-methyl-1-butene, 4-methyl-1-pentene, and 1-tetradecene.

In a preferred embodiment, the process described herein may be used to produce homo-oligomers or co-oligomers (for the purposes of this invention and the claims thereto, a co-oligomer may comprise two, three, four, or more different monomer units). Preferred oligomers produced herein include homo-oligomers or co-oligomers of any of the above monomers of $C_3$ to $C_{20}$ alpha-olefins. In a preferred embodiment the oligomer is a homo-oligomer of any $C_8$ to $C_{12}$ alpha-olefin. Or in another preferred embodiment, the oligomer is a homo-oligomer of propylene, 1-butene, 1-pentene, 1-hexene, 1-heptene, 1-octene, 1-nonene, 1-decene, 1-undecene, or 1-dodecene. Preferably the oligomer is a homo-oligomer of 1-octene, 1-nonene, 1-decene. In another embodiment the oligomer is a co-oligomer comprising two or three or more monomers selecting from C3 to C20 alpha-olefins. For more information on the use of mixed feeds to prepare PAO's please see PCT US2006/027591, particularly page 8, paragraph [0029] to page 16, paragraph [044].

The alpha-olefins used to make PAOs include, but are not limited to, $C_3$ to $C_{24}$ alpha-olefins, with the $C_3$ to $C_{14}$ alpha-olefins, such as propylene, 1-butene, 1-pentene, 1-hexene, 1-heptene, 1-octene, 1-nonene, 1-decene, 1-undecene, 1-dodecene, 1-tridecene and 1-tetradecene being preferred. A preferred group of polyalpha-olefins are polypropylene, poly-1butene, poly-1-pentene, poly-1-hexene, poly1-heptene, poly-1-octene, poly-1-nonene, poly-1-decene, poly1-undencen, poly-1-dodecene, poly-1-tridecene, and poly-1-tetradecene, although the dimers of higher olefins in the range of $C_{12}$ to $C_{18}$ can be present in the final products. Useful PAO's are preferably the oligomers or polymers with carbon numbers starting from $C_{20}$ and higher made from $C_3$ to $C_{20}$ alpha-olefins in one embodiment, and oligomers or polymers with carbon number starting from $C_{24}$ and higher made from $C_3$ to $C_{14}$ alpha-olefins in another embodiment. Suitable olefins include propylene, 1-butene, 1-pentene, 1-hexene, 1-heptene, 1-octene, 1-nonene, 1-decene, 1-undodecene and 1-dodecene, 1-tridecene, 1-tetradecene. In one embodiment, the olefin is propylene, and the polymer product is a mixture of pentamer and higher oligomers or polymers of propylene. In another embodiment, the olefin is 1-butene, and the PAO is a mixture of pentamers and higher oligomers of 1-butenes. In another embodiment, the olefin is 1-pentene, and the PAO is a mixture of tetramers and pentamers and higher of 1-pentene. In another embodiment, the olefin is 1-hexene, and the PAO is a mixture of tetramers and pentamers (and higher) of 1-hexene. In another embodiment, the olefin is 1-heptene, and the PAO is a mixture of trimers and tetramers and higher of 1-hepene. In another embodiment, the olefin is 1-octene, and the PAO is a mixture of trimers and tetramers and higher of 1-octene. In another embodiment, the olefin is 1-nonene, and the PAO is a mixture of trimers and tetramers and higher of 1-nonene. In another embodiment, the olefin is 1-decene, and the PAO is a mixture of dimer, trimers and tetramers and higher of 1-decene. In another embodiment, the olefin is 1-undecene, and the PAO is a mixture of trimers and tetramers and higher of 1-undecene. In another embodiment, the olefin is 1-dodecene, and the PAO is a mixture of dimer and trimers and higher of 1-dodecene.

In another embodiment, the monomers comprise propylene and/or butene, or combination of propylene and/or butene with another alpha-olefin, or other olefins, choosing from $C_5$ to $C_{20}$ alpha-olefins. When large linear alpha-olefins of C14 to C20 are used as feeds, it is preferably to use these large olefins in a mixture containing other linear alpha-olefins of C3 to C12. Polymers or oligomers made from these large alpha-olefins alone usually have high VI, but they also have high tendency to crystallize, thus degrading the low temperature fluidity of the fluid. It is usually more preferably to copolymerize these large alpha-olefins with smaller alpha-olefins of C3 to C12. The co-polymers will not crystallize or solidify as easily. Thus, the copolymers usually have excellent low temperature fluidity, high VI and other good lubricating properties.

In a preferred embodiment, the PAO comprises two or more monomers, alternatively three or more monomers, alternatively four or more monomers, alternatively five or more monomers. For example, a $C_3$, $C_4$, $C_6$, $C_{12}$-alpha-olefin mixture, a $C_3$, $C_{12}$-alpha-olefin mixture, a $C_3$, $C_{12}$, $C_{14}$-alpha-olefin mixture, a $C_4$, $C_{12}$-alpha-olefin mixture, a $C_4$, $C_{12}$, $C_{14}$-alpha-olefin mixture, a $C_4$, $C_{14}$-alpha-olefin mixture, a $C_6$, $C_{12}$-alpha-olefin mixture, a $C_6$, $C_{12}$, $C_{14}$-alpha-olefin mixture, a $C_5$, $C_{12}$, $C_{14}$-alpha-olefin mixture, a $C_6$, $C_{10}$, $C_{14}$-alpha-olefin mixture, a $C_6$, $C_8$, $C_{12}$-alpha-olefin mixture, a $C_8$, $C_{10}$, $C_{12}$-linear alpha-olefin mixture, or a $C_6$, $C_7$, $C_8$, $C_9$, $C_{10}$, $C_{11}$, $C_{12}$, $C_{13}$, $C_{14}$-linear alpha-olefin mixture, or a $C_4$, $C_6$, $C_8$, $C_{10}$, $C_{12}$, $C_{14}$, $C_{16}$, $C_{18}$-linear alpha-olefin mixture can be used as a feed.

In an alternate embodiment, the PAO comprises less than 40 wt % of ethylene. For copolymer with $C_3$ to $C_6$ alpha-olefins, sometimes, it is desirable to have some ethylene as one of the components. In this case, it is preferred to have 1 to 40 wt % ethylene present in the feed. In one alternative embodiment, the feed contains 40 wt % ethylene and 60 wt % 1-butene, or 30 wt % ethylene and 70 wt % 1-butene, or 20 wt % ethylene and 80 wt % 1-butene, 10 wt % ethylene and 90 wt % 1-butene, or 5 wt % ethylene and 95 wt % 1-butene, or 40 wt % ethylene and 60 wt % propylene, or 30 wt % ethylene and 70 wt % propylene, or 20 wt % ethylene and 80 wt % propylene, 10 wt % ethylene and 90 wt % propylene, 5 wt % ethylene and 95 wt % propylene. For copolymers with $C_7$ to $C_{18}$ alpha-olefins, it is preferred to have less amount of ethylene, 0 to 20 wt % ethylene is preferred.

In a preferred embodiment, any of the PAO's described herein may comprise at least 60 wt % 3 to 24 carbon atoms and from 0.5 to 40 wt % ethylene, where at least 80% of the ethylene present in the polyalpha-olefin is present in runs of 1 to 35 carbons or less as measured by carbon-13 NMR. Preferably any of the PAO's described herein may comprise at least 70 wt % 5 to 24 carbon atoms (preferably at least 80 wt %, preferably at least 85 wt %, preferably at least 90 wt %, preferably at least 95 mole %) and from 0.5 to 40 wt % ethylene, where at least 80% (preferably at least 85%, preferably at least 90%, preferably at least 95%, preferably at least 98%, preferably 100%) of the ethylene present in the polyalpha-olefin is present in runs of 1 to 35 carbons (preferably 1 to 30, preferably 1 to 25, preferably 1 to 20, preferably 1 to 15, preferably 1 to 10, preferably 1 to 5) as measured by carbon-13 NMR. Furthermore, the type of runs of ethylene sequence is random with no significant amount of very long poly-ethylene chain in the lube product.

The $C_3$ to $C_{20}$ alpha-olefins used herein can be produced directly from ethylene growth process as practiced by several commercial production processes, or they can be produced from Fischer-Tropsch hydrocarbon synthesis from $CO/H_2$ syngas, or from metathesis of internal olefins with ethylene, or from cracking of petroleum or Fischer-Tropsch synthetic wax at high temperature, or any other alpha-olefin synthesis routes. A preferred feed for this invention is preferably at least 10 weight % alpha-olefin, preferably at least 20 weight % alpha-olefin, at least 50 weight % alpha-olefin, at least 70 weight % alpha-olefin, at least 80 weight % alpha-olefin (preferably linear alpha-olefin), at least 90 weight % alpha-olefin (preferably linear alpha-olefin), or 100% alpha-olefin (preferably linear alpha-olefin).

The olefins for the feed can be very dilute. For example, a suitable feed from a wax cracking reaction contains anywhere from 10 to 90 wt % alpha-olefins and can be used in the invention. Additionally, a feed stream from a Fischer-Tropsch synthesis process provides an alpha-olefin content that may range from 2 to 50 wt %. These are all suitable as feed olefins. However, alpha-olefin-containing mixtures can also be used as feeds in this invention, even if the other components are internal-olefins, branched olefins, paraffins, cyclic paraffins, aromatics (such as toluene and or xylenes). These components have diluent effects and are believed not to have a substantial detrimental effect on the polymerization of alpha-olefins. In other words, the processes described herein can selectively convert alpha-olefins in a mixture and leave the other components unreacted. This technology can be used to separate out alpha-olefins from a mixture by selectively reacting them with polymerization or oligomerization catalyst systems, thereby completely eliminating the need to separate alpha-olefins from the remainder of the components in a mixed feedstream. This is economically advantageous, for example, in a process utilizing Fischer-Tropsch synthesis olefin product streams containing alpha-olefins, internal-olefins, branched olefins and corresponding alkanes. Such a mixture can be utilized in concordance with the oligomerization technology as described herein and can selectively react with the alpha-olefin. No separate step to isolate the alpha-olefin is needed.

Another example of the utility of this process involves alpha-olefins produced by the metathesis of internal olefins with ethylene, which may contain some internal olefins. This mixed olefin feed can be reacted as is in the polymerization/oligomerization process of the present invention, which selectively converts the alpha-olefins into lube products. Thus one can use the alpha-olefin for the base stock synthesis without having to separate the alpha-olefin from internal olefin or other types of hydrocarbons. This can bring a significant improvement in process economics. The feed olefins can be the mixture of olefins produced from other linear alpha-olefin process containing $C_4$ to $C_{20}$ alpha-olefins as described in Chapter 3 "Routes to Alpha-Olefins" of the book Alpha Olefins Applications Handbook, Edited by G. R. Lappin and J. D. Sauer, published by Marcel Dekker, Inc. N.Y. 1989.

In a preferred embodiment, the PAO's produced herein may contain monomers having branches at least 2, preferably at least 3 carbons away from the alpha-unsaturation, such 4-methyl-1-decene, 4-ethyl-1-decene, or 4-methyl-1-hexene, 4-methyl-1-pentene, etc. These olefins may be present in the linear alpha-olefins from the manufacturing process or they can be added deliberately. The copolymers of slightly branched alpha-olefins with completely linear alpha-olefins have improved low temperature properties.

In one embodiment, when 1-butene is used as the feed or one of the feed olefins with other alpha-olefins, 1-butene can be pure 1-butene prepared from any of the commercial process. Alternatively, the 1-butene can be present as one of the components in a mixed $C_4$ stream that is readily available from a petrochemical complex or oil refinery operation. U.S. Pat. No. 5,859,159 A has a more detailed discussion of such $C_4$ streams, such as BB streams (butane-butene stream), or Raffinate 1 or Raffinate 2 streams. These mixed $C_4$ streams are available from steam cracking of light naphtha in the ethylene/propylene production processes, from MTBE processes where most of the iso-butene is removed, from the FCC— operation to produce $C_4$ streams, and/or from other petroleum refining processes. When these mixed $C_4$ streams are used as feed, only 1-butene will be reacted away by the catalyst system. Other $C_4$ components, cis-, trans-2-butenes, iso-butene, n-butane and iso-butane will only act as diluent, but will not react or interfere with the polymerization catalyst. These mixed $C_4$ streams are of interest and economical source for 1-butene to produce poly-1-butene, copolymer with ethylene or other high alpha-olefins of $C_5$ to $C_{20}$.

In another embodiment, when propylene is used as the feed, or as one of the feed olefins with other alpha-olefins, pure propylene from a chemical plant can be used. Alternatively, mixed propylene and propane streams (PP stream) can be used in the same manner. The propylene will selectively polymerize and the propane will act as a diluent and will not participate in the reaction. This PP stream may contain propylene in any amount from 10 wt % to 95 wt %. In another embodiment, mixture of PP and $C_4$ stream can be used as starting olefin or one of the starting olefin feeds.

Polymerization/Oligomerization Process

Many polymerization/oligomerization processes and reactor types used for metallocene-catalyzed polymerizations or oligomerizations such as solution, slurry, and bulk polymerization or oligomerization processed can be used in this invention. In some embodiments, if a solid or supported catalyst is used, a slurry or continuous fixed bed or plug flow process is suitable. In a preferred embodiment, the monomers are contacted with the metallocene compound and the activator and/or co-activator/scavenger in the solution phase, bulk phase, or slurry phase, preferably in a continuous stirred tank reactor or a continuous tubular reactor. In a preferred embodiment, the temperature in any reactor used herein is from −10° C. to 250° C., preferably from 10° C. to 220° C., preferably from 10° C. to 180° C., preferably from 10° C. to 170° C. In a preferred embodiment, the pressure in any reactor used herein is from 0.1 to 100 atmospheres, preferably from 0.5 to 75 atmospheres, preferably from 1 to 50 atmospheres. In another embodiment, the monomer(s), metallocene and activator are contacted for a residence time of between 1 minutes to 30 hours, more preferred 5 minutes to 16 hours, more preferred 10 minutes to 10 hours. In another embodiment, solvent or diluent is present in the reactor and is preferably selected from the group consisting of butanes, pentanes, hexanes, heptanes, octanes, nonanes, decanes, undecanes, dodecanes, tridecanes, tetradecanes, pentadecanes, hexadecanes, toluene, o-xylene, m-xylene, p-xylene, mixed xylenes, ethylbenzene, isopropylbenzene, and n-butylbenzene; preferably toluene and or xylenes and or ethylbenzene, normal paraffins (such as Norpar™ solvents available for ExxonMobil Chemical Company in Houston, Tex.), or isoparaffin solvents (such as Isopar™ solvents available for ExxonMobil Chemical Company in Houston, Tex.). These solvents or diluents are usually pre-treated (e.g. for removal of polar impurities) in the same manners as the feed olefins. These solvents do not generally actively participate in the polymerization reaction. However, they offer diluent effect for polymerization reaction. High concentration of solvent usually has the effect of reducing product viscosity. The concentration of solvent usually ranges from 0 wt % to 80 wt %, alternatively from 10 wt % to 60 wt % and in yet another alternative, from 20 wt % to 40 wt %. For commercial production, it is preferably to use as little solvent as possible.

Typically, in the processes of this invention, one or more transition metal compounds, one or more activators, co-activators or scavengers, and one or more monomers are contacted to produce polymer or oligomer. These catalysts may be supported and as such will be particularly useful in the known slurry, solution, or bulk operating modes conducted in single, series, or parallel reactors. If the catalyst, activator or co-activator is a soluble compound, the reaction can be carried out in a solution mode. Even if one of the components is not completely soluble in the reaction medium or in the feed solution, either at the beginning of the reaction or during or at the later stages of the reaction, a solution or slurry type operation is still applicable. In any instance, the catalyst components, dissolved or suspended in solvents, such as toluene or other conveniently available aromatic solvents, or in aliphatic solvent, or in the feed alpha-olefin stream, are fed into the reactor under inert atmosphere (usually nitrogen or argon blanketed atmosphere) to allow the polymerization or oligomerization to take place. The polymerization or oligomerization can be run in a batch mode, where all the components are added into a reactor and allowed to react to a pre-designed degree of conversion, either to partial conversion or full conversion. Subsequently, the catalyst is deactivated by any possible means, such as exposure to air or water, or by addition of alcohols or solvents containing deactivating agents, or by addition of solid sorbants. The catalyst components can then be separated by conventional aqueous wash or by filtration as in the case when solid sorbant is used. The polymerization or oligomerization can also be carried out in a semi-continuous operation, where feeds and catalyst system components are continuously and simultaneously added to the reactor so as to maintain a constant ratio of catalyst system components to feed olefin(s). When all feeds and catalyst components are added, the reaction is allowed to proceed to a pre-determined stage. The reaction is then discontinued by catalyst deactivation in the same manner as described for batch operation. The polymerization or oligomerization can also be carried out in a continuous operation, where feeds and catalyst system components are continuously and simultaneously added to the reactor so to maintain a constant ratio of catalyst system and feed olefins. The reaction product is continuously withdrawn from the reactor, as in a typical continuous stirred tank reactor (CSTR) operation. The residence times of the reactants are controlled by a pre-determined degree of conversion and catalyst concentration. The withdrawn product is then typically quenched in the separate reactor in a similar manner as other operation. In a preferred embodiment, any of the processes to prepare PAO's described herein are continuous processes. Preferably, the continuous process comprises the steps of a) continuously introducing a feed stream comprising at least 10 mole % of the one or more $C_3$ to $C_{24}$ alpha-olefins into a reactor, b) continuously introducing the metallocene compound and the activator into the reactor, and c) continuously withdrawing the polyalpha-olefin from the reactor. In another embodiment, the continuous process comprises the step of maintaining a partial pressure of hydrogen in the reactor of 0.1 to 300 psi (2068 kPa), based upon the total pressure of the reactor, preferably 0.5 to 200 psi (1379 kPa) preferably 1.0 to 150 psi (1034 kPa), preferably 2.0 to 100 psi (690 kPa) preferably 3 to 50 psi (345 kPa) or less, preferably 5 to 25 psi (173 kPa), preferably 1 to 10 psi (69 kPa). Alternatively the hydrogen, if present, is present in the reactor at 1 to 30,000 ppm by weight, preferably 3,000 ppm or less, preferably 150 ppm or less, preferably 750 ppm or less, preferably 500 ppm or less, preferably 250 ppm or less, preferably 100 ppm or less, preferably 50 ppm or less, preferably 25 ppm or less, preferably 10 ppm or less, preferably 5 ppm or less. During the oligomerization or polymerization reaction, little or no hydrogen is consumed. Therefore the excess hydrogen gas can be recycled after the reaction is completed.

In another embodiment, if ethylene is present in the reactor, the ethylene partial pressure is usually maintained at below 1000 psi, or preferably below 500 psi, or preferably below 200 psi, or preferably below 50 psi, or preferably below 30 psi, or preferably below 10 psi. In another embodiment, if propylene, PP stream, C4 stream, 1-butene, or 1-pentene is present in the reactor, the total partial pressure of these components is usually maintained at below 1000 psi, or preferably below 500 psi, or preferably below 200 psi, or preferably below 50 psi, or preferably below 30 psi, or preferably below 10 psi. As discussed above, the total reactor pressure may be higher than the total partial pressure of the gaseous feeds by the presence of other inert gas, such as nitrogen or argon.

Preferred reactors range in size from 2 ml and up. Usually, it is preferable to use reactors larger than one liter in volume for commercial production. The production facility may have one single reactor or several reactors arranged in series or in parallel or in both to maximize productivity, product properties and general process efficiency. The reactors and associated equipments are usually pre-treated to ensure good reaction rates and catalyst performance. The reaction is usually conducted under inert atmosphere, where the catalyst system and feed components will not be in contact with any catalyst deactivator or poison which is usually polar oxygen, nitrogen, sulfur or acetylenic compounds.

One or more reactors in series or in parallel may be used in the present invention. The transition metal compound, activator and when required, co-activator, may be delivered as a solution or slurry in a solvent or in the alpha-olefin feed stream, either separately to the reactor, activated in-line just prior to the reactor, or preactivated and pumped as an activated solution or slurry to the reactor. Polymerizations/oligomerizations are carried out in either single reactor operation, in which monomer, or several monomers, catalyst/activator/co-activator, optional scavenger, and optional modifiers are added continuously to a single reactor or in series reactor operation, in which the above components are added to each of two or more reactors connected in series. The catalyst components can be added to the first reactor in the series. The catalyst component may also be added to both reactors, with one component being added to first reaction and another component to other reactors. In one preferred embodiment, the precatalyst is activated in the reactor in the presence of olefin. In another embodiment, the precatalyst such as the dichloride form of the metallocenes is pre-treated with alkylaluminum reagents, especially, triisobutylaluminum, tri-n-hexylaluminum and/or tri-n-octylaluminum, etc., followed by charging into the reactor containing other catalyst component and the feed olefins, or followed by pre-activation with the other catalyst component to give the fully activated catalyst, which is then fed into the reactor containing feed olefins. In another alternative, the pre-catalyst metallocene is mixed with the activator and/or the co-activator and this activated catalyst is then charged into reactor, together with feed olefin stream containing some scavenger or co-activator. In another alternative, the whole or part of the co-activator is pre-mixed with the feed olefins and charged into the reactor at the same time as the other catalyst solution containing metallocene and activators and/or co-activator.

In some embodiments, a small amount of poison scavenger, such as trialkylaluminum (trimethylaluminum, triethylaluminum, triisopropylaluminum, triisobutylaluminum, tri-n-hexylaluminum, tri-n-octylaluminum) or methylalumoxane is added to the feed olefin stream to further improve catalyst activity. In a preferred embodiment, the monomers are contacted with an alkylaluminum compound, preferably a trialkylaluminum compound, prior to being introduced into the reactor. In another preferred embodiment, the metallocene and or activator are combined with an alkylaluminum compound, preferably a trialkylaluminum compound, prior to entering the reactor. Preferably the alkylaluminum compound is represented by the formula: $R_3Al$, where each R is independently a C1 to C20 alkyl group, preferably the R groups are independently selected from the group consisting of methyl, ethyl, propyl, isopropyl, butyl, isobutyl, n-butyl, pentyl, isopentyl, n-pentyl, hexyl, isohexyl, n-hexyl, heptyl, octyl, isoocotyl, n-octyl, nonyl, isononyl, n-nonyl, decyl, isodecyl, n-cecyl, undecyl, isoundecyl, n-undecyl, dodecyl, isododecyl, and n-dodecyl, preferably isobutyl, n-octyl, n-hexyl, and n-dodecyl. Preferably the alkylaluminum compound is selected from tri-isobutylaluminum, tri n-octylaluminum, tri-n-hexylaluminum, and tri-n-dodecylaluminum.

In one embodiment of any of the processes described herein the feed olefins and or solvents are treated to remove catalyst poisons, such as peroxides, oxygen- or nitrogen-containing organic compounds or acetylenic compounds. The feed olefins, the solvents if used, or the purge gas (usually nitrogen) are purified by typical feed purification techniques. In the case of a liquid feed, the liquid is usually degassed under a vacuum of for a period of 1 to 60 minutes to remove any dissolved gases. Alternatively, the feed olefins, solvents or purging gases are purified by passing through an activated molecular sieve (3A, 4A, 5A or 13X molecular sieve) or commercial absorbing beds made of activated alumina, silica or other purifying solids. These purifying solids can remove trace water, alcohols, nitrogen compounds, or any other polar impurities. Alternatively, the feed olefins, solvents or purging gas are purified by passing through an activated oxygenate-removal solid catalyst (de-ox catalyst), which usually contains copper, chromium and/or other metal oxides in reduced oxidation states. U.S. Pat. No. 6,987,152 describes the examples of the feed purification. Depending on the feed quality and the desired feed purity, one or two or all methods described above can be used in combination to obtain best results.

Typically, in this invention, such treatment will increase catalyst productivity at least 20% to 1000% or more as compared to systems absent such treatment. The improved process also includes special treatment of the feed olefins to remove catalyst poisons, such as peroxides, oxygen-, sulfur- or nitrogen-containing organic compounds or other trace impurities. This treatment can increase catalyst productivity substantially (typically more than 10-fold). Preferably the feed olefins are contacted with a molecular sieve, activated alumina, silica gel, oxygen-removing catalyst, and or purifying clays to reduce the heteroatom-containing compounds in the feed, preferably below 50 ppm, preferably below 10 ppm.

The catalyst compositions can be used individually, or can be mixed with other known polymerization catalysts to prepare polymer or oligomer blends. Monomer and catalyst selection allows polymer or oligomer blend preparation under conditions analogous to those using individual catalysts. Polymers having increased MWD are available from polymers made with mixed catalyst systems and can thus be achieved. Sometimes it is advantageous to produce fluids with increased MWD, which may improve the fluid blending properties. Mixed catalyst can comprise two or more catalyst precursors and or two or more activators.

Generally, when using metallocene catalysts, after pre-treatment of feed olefins, solvents, diluents and after precautions to keep the catalyst component stream(s) and reactor free of impurities, the reaction should proceed well. In some embodiments, when using metallocene catalysts, particularly when they are immobilized on a support, the complete catalyst system will additionally comprise one or more scavenging compounds. Here, the term scavenging compound means a compound that removes polar impurities from the reaction environment. These impurities adversely affect catalyst activity and stability. Typically, purifying steps are usually used before introducing reaction components to a reaction vessel. But such steps will rarely allow polymerization or oligomerization without using some scavenging compounds. Normally, the polymerization process will still use at least small amounts of scavenging compounds (such as those described above).

Typically, the scavenging compound will be an organometallic compound such as the Group-13 organometallic compounds of U.S. Pat. Nos. 5,153,157, 5,241,025 and WO-A-91/09882, WO-A-94/03506, WO-A-93/14132, and that of WO 95/07941. Exemplary compounds include triethylaluminum, triethylborane, tri-iso-butylaluminum, diisobutylaluminum hydride, methylalumoxane, iso-butylalumoxane, and tri-n-octylaluminum. Those scavenging compounds having bulky or $C_6$-$C_{20}$ linear hydrocarbyl substituents connected to the metal or metalloid center usually minimize adverse interaction with the active catalyst. Examples include triethylaluminum, but more preferably, bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. Alumoxanes also may be added in scavenging quantities with other activators, e.g., methylalumoxane, $[Me_2HNPh]^+[B(pfp)_4]^-$ or $B(pfp)_3$ where pfp is perfluorophenyl ($C_6F_5$), Me is methyl and Ph is phenyl.

The PAO's described herein can also be produced in homogeneous solution processes. Generally this involves polymerization or oligomerization in a continuous reactor in which the polymer formed and the starting monomer and catalyst materials supplied, are agitated to reduce or avoid concentration or temperature gradients. Temperature control in the reactor is generally obtained by balancing the heat of polymerization and with reactor cooling by reactor jackets or cooling coils or a cooled side-stream of reactant to cool the contents of the reactor, auto refrigeration, pre-chilled feeds, vaporization of liquid medium (diluent, monomers or solvent) or combinations of the above. Adiabatic reactors with pre-chilled feeds may also be used. The reactor temperature depends on the catalyst used and the product desired. Higher temperatures tend to give lower molecular weights and lower temperatures tend to give higher molecular weights, however this is not a hard and fast rule. In general, the reactor temperature preferably can vary between −10° C. to 250° C., preferably from 10° C. to 220° C., preferably from 10° C. to 180° C., preferably from 10° C. to 170° C.

Generally, it is of interest to control the reaction temperature as tightly as possible within a pre-determined band. In order to produce fluids with narrow molecular weight distribution, such as to promote the highest possible shear stability, it is useful to control the reaction temperature to obtain minimum temperature fluctuation throughout the reactor with minimal variation over the course of the reaction time. If multiple reactors are used in series or in parallel, it is useful to keep the temperature constant within a pre-determined value band to minimize any broadening of the molecular weight distribution. In order to produce fluids with a broad molecular weight distribution, one can adjust the reaction temperature, swing profile, or fluctuation; or as in series operation, the second reactor temperature is preferably higher than the first reactor temperature. In parallel reactor operation, the temperatures of the two reactors are independent. Alternatively, the MWD can also be intentionally broadened by using multiple types of metallocene catalysts.

The pressure in any reactor used herein can vary from about 0.1 atmosphere to 100 atmospheres (1.5 psi to 1500 psi), preferably from 0.5 bar atm to 75 atm (8 psi-1125 psi), most preferably from 1.0 to 50 atm (15 psi to 750 psi). The reaction can be carried out under an atmosphere of nitrogen, or with some hydrogen or sometimes with a partial pressure from other volatile components, such as propylene, PP stream, 1-butene, $C_4$ streams, 1-pentene, etc. Sometimes a small amount of hydrogen is added to the reactor to improve the catalyst productivity. The amount of hydrogen is preferably kept at such a level for improving catalyst productivity, but not high enough to induce any hydrogenation of olefins, —especially the feed alpha-olefins because the conversion of alpha-olefins into saturated paraffins is very detrimental to the efficiency of the process. The amount of hydrogen partial pressure is preferred to be kept low, less than 300 psi, preferably less than 100 psi, preferably less than 50 psi, preferably less than 25 psi, preferably less than 10 psi In a particularly preferred embodiment in any of the processes described herein, the concentration of hydrogen in the reactor is less than 30,000 ppm, preferably less than 5,000 ppm, preferably less than 1,000 ppm, preferably less than 500 ppm, preferably less than 100 ppm, preferably less than 50 ppm, preferably less than 10 ppm.

The reaction time or reactor residence time is usually dependent on the type of catalyst used, the amount of catalyst used, and the desired conversion level. Different metallocenes have different activities. Usually, a higher degree of alkyl substitution on the cyclopentadienyl ring improves catalyst productivity. Catalysts such as bis(1,2-dimethylcyclopentadienyl)zirconium dichloride, bis(1,3-dimethylcyclopentadienyl)zirconium dichloride, bis(1-methyl-3-n-butylcyclopentadienyl)zirconium dichloride, bis(1-methyl-3-n-propylcyclopentadienyl)zirconium dichloride, bis(1-ethyl-3-n-butylcyclopentadienyl)zirconium dichloride, bis (1-methyl-3-n-hexylcyclopentadienyl)zirconium dichloride, bis(1,2-diethylcyclopentadienyl)zirconium dichloride, bis(1, 3-diethylcyclopentadienyl)zirconium dichloride, bis(1,2,3,4-tetramethylcyclopentadienyl)zirconium dichloride or bis(1, 2,4-trimethylcyclopentadienyl)zirconium dichloride, or bis (1,2,3-trimethylcyclopentadienyl)zirconium dichloride, (1,2, 3,4-tetramethylcyclopentadienyl)(1,3-dimethylcyclopentadienyl)zirconium dichloride or (1,2,4-trimethylcyclopentadienyl)(1,3-dimethylcyclopentadienyl) zirconium dichloride, or bis(indenyl)zirconium dichloride, or bis(1-methylindenyl)zirconium dichloride, or bis(2-methyl-indenyl)zirconium dichloride, or bis(1,2-dimethylindenyl) zirconium dichloride, or bis(4-methylindenyl)zirconium dichloride, or bis(4,7-dimethylindenyl)zirconium dichloride or bis(tetrahydroindenyl)zirconium dichloride, bis(2-methyl-tetrahydroindenyl)zirconium dichloride, or bis(1,2-dimethyl-tetrahydroindenyl)zirconium dichloride, or bis(1-methyl-tetrahydroindenyl)zirconium dichloride, or bis(4-methyl-tetrahydroindenyl)zirconium dichloride, bis(4,7-dimethyl-tetrahydroindenyl)zirconium dichloride, or their dialkyl analogs have desirable high productivity and stability than unsubstituted metallocenes. Usually the amount of catalyst components used is determinative. High amounts of catalyst loading tends to gives high conversion at short reaction time. However, high amount of catalyst usage makes the production process uneconomical and difficult to manage the reaction heat and to control the reaction temperature. Therefore, it is useful to choose a catalyst with maximum catalyst productivity to minimize the amount of metallocene and the amount of activators needed. When the catalyst system is metallocene plus a Lewis acid or an ionic promoter with NCA component, the metallocene used is typically in the range of 0.01 microgram to 500 micrograms (or 0.5 milligram) of metallocene component/gram of alpha-olefin feed. Usually the preferred range is from 0.1 microgram to 100 microgram of metallocene component per gram of alpha-olefin feed. Furthermore, the molar ratio of the NCA activator to metallocene is in the range from 0.1 to 10, preferably 0.5 to 5, preferably 0.5 to 3. If a co-activator of alkylaluminum compound is used, the molar ratio of the Al to metallocene is in the range from 1 to 1000, preferably 2 to 500, preferably 4 to 400.

Typically one prefers to have the highest possible conversion (close to 100%) of feed alpha-olefin in the shortest possible reaction time. However, in CSTR operation, it is sometimes beneficial to run the reaction at an optimum conversion, which is less than 100% conversion. There are also occasions, when partial conversion is more desirable or when the narrowest possible MWD of the product is desired, because partial conversion can avoid a broadening of the MWD. If the reaction is conducted to less than 100% conversion of the alpha-olefin, the unreacted starting material after separation from other product and solvents/diluents can be recycled to increase the total process efficiency.

Desirable residence times for any process described herein are in the range between 1 minutes to 30 hours, more preferably from 5 minutes to 16 hours, more preferably from 10 minutes to 10 hours Each of these processes may also be employed in single reactor, parallel, or series reactor configurations. The liquid processes comprise contacting olefin monomers with the above-described catalyst system(s) in a suitable diluent or solvent and allowing said monomers to react for a sufficient time to produce the desired polymers or oligomers. Both aliphatic and aromatic hydrocarbon solvents are suitable. Aromatics such as toluene, xylenes, ethylbenzene, propylbenzene, cumene, t-butylbenzene are suitable. Alkanes, such as hexane, heptane, pentane, isopentane, and octane, Norpar or Isopar solvents (from ExxonMobil Chemical Company in Houston, Tex.) are also suitable. Generally, toluene is best suited to dissolve the catalyst components. Norpar, Isopar or hexanes are preferred as reaction diluents. Oftentimes, a mixture of toluene and Norpar, or toluene and Isopar, is used as a diluent or solvent. For process simplicity and high reactor efficiency, it is preferred to add as little as possible solvent or diluent into the reactor. Sometimes for high viscosity fluid production at low temperature, a solvent or diluent is added to facilitate reaction heat transfer, stirring, product handling, filtration, etc. Usually, less than 50 wt % extra solvent or diluent is added in the reactor, preferably less than 30 wt %, preferably less than 20 wt %, preferably less than 10 wt %, preferably no solvent is added to the reactor system. The reaction systems usually have a small amount of solvent or diluent carried over from the catalyst, activator or co-activator/scavenger solutions.

The process can be carried out in a continuous stirred tank reactor or plug flow reactor, or more than one reactor operated in series or parallel. These reactors may have or may not have internal cooling and the monomer feed may or may not be refrigerated. See the general disclosure of U.S. Pat. No. 5,705,577 for general process conditions.

When a solid-supported catalyst is used for the conversion, a slurry polymerization/oligomerization process generally operates in the similar temperature, pressure and residence time range as described previously. In a slurry polymerization or oligomerization, a suspension of solid catalyst, promoters, monomer and comonomers are added. The suspension including diluent is intermittently or continuously removed from the reactor. The catalyst is then separated from the product by filtration, centrifugation or settlement. The fluid is then subsequently distilled to remove solvent, any unreacted components, and light product. A portion of, or all of, the solvent and unreacted component or light components can be recycled for reuse.

If an un-supported solution catalyst is used, upon completion of the reaction or when the product is withdrawn from the reactor (such as in a CSTR), the product may still contain soluble, suspended or mixed catalyst components. These components are preferably deactivated or removed. Any of the usual catalyst deactivation methods or aqueous wash methods can be used to remove the catalyst component. Typically, the reaction is deactivated by addition of stoichiometric amount or excess of air, moisture, alcohol, isopropanol, etc. The mixture is then washed with dilute sodium hydroxide or with water to remove catalyst components. The residual organic layer is then subjected to distillation to remove solvent, which can be recycled for reuse. The distillation can further remove any light reaction products from $C_{18}$ and less. These light components can be used as a diluent for further reaction. Or they can be used as olefinic raw material for other chemical synthesis, as these light olefin product have vinylidene unsaturation, most suitable for further functionalization and for conversion to high performance fluids. Alternatively, these light olefin products can be hydrogenated for use as high quality paraffinic solvents.

Polymerization or oligomerization in the presence of a very small amount of hydrogen is also advantageous to provide polymers or oligomers with a high degree of unsaturated double bonds. These double bonds can be easily converted into functionalized fluids with multiple performance features. Examples for converting these polymers with MW greater than 300 can be found in the preparation of ashless dispersants, where the polymers are reacted with maleic anhydride to give PAO-succinic anhydride which can then be reacted with amines, alcohols, polyether alcohols and converted into dispersants. Examples for such conversion can be found in the book "Lubricant Additives: Chemistry and Application," ed. By Leslie R. Rudnick, Marcel Dekker, Inc. 2003, p. 143-170.

In another embodiment, any of polyalphaolefins produced herein is hydrogenated. In particular the polyalpha-olefin is preferably treated as described above to reduce heteroatom containing compounds to less than 600 ppm, and then contacted with hydrogen and a hydrogenation catalyst to produce a polyalpha-olefin having a bromine number less than 2. In a preferred embodiment, the treated polyalpha-olefin comprises 100 ppm of heteroatom containing compounds or less, preferably 10 ppm of heteroatom containing compounds or less. (A heteroatom containing compound is a compound containing at least one atom other than carbon and hydrogen.) Preferably the hydrogenation catalyst is selected from the group consisting of supported Group 7, 8, 9, and 10 metals, preferably the hydrogenation catalyst selected from the group consisting of one or more of Ni, Pd, Pt, Co, Rh, Fe, Ru, Os, Cr, Mo, and W, supported on silica, alumina, clay, titania, zirconia, or mixed metal oxide supports or a mesoporous material, typical known as MCM-41 material or related material (as described in U.S. Pat. No. 5,264,203). A preferred hydrogenation catalyst is nickel supported on kieselguhr, or platinum or palladium supported on alumina or MCM-41, or cobalt-molydenum supported on alumina. Usually, a high nickel content catalyst, such as 60% Ni on Keiselguhr catalyst is used, or a supported catalyst with a high amount of Co—Mo loading. Alternatively, the hydrogenation catalyst is nickel supported on keisleghur, silica, alumina, clay or silica-alumina. Alternatively, the catalyst is Pd or Pt supported on MCM-41 or a related material.

In a preferred embodiment the polyalpha-olefin is contacted with hydrogen and a hydrogenation catalyst at a temperature from 25° C. to 350° C., preferably 100° C. to 300° C. In another preferred embodiment the polyalpha-olefin is contacted with hydrogen and a hydrogenation catalyst for a time period from 5 minutes to 100 hours, preferably from 5 minutes to 24 hours. In another preferred embodiment the poly-alpha-olefin is contacted with hydrogen and a hydrogenation catalyst at a hydrogen pressure of from 25 psi to 2500 psi, preferably from 100 to 2000 psi. In another preferred embodiment the hydrogenation process reduces the number of mm triad groups in a polyalpha-olefin by 1 to 80%. For further information on hydrogenation of PAO's please see U.S. Pat. No. 5,573,657 and "Lubricant Base Oil Hydrogen Refining Processes" (page 119 to 152 of Lubricant Base Oil and Wax Processing, by Avilino Sequeira, Jr., Marcel Dekker, Inc., NY, 1994) which disclose more information on hydrogenation of PAO's.

This hydrogenation process can be accomplished in a slurry reactor in a batch operation, or in a continuous stirred tank reactor (CSTR), where the hydrogenation catalyst is at a level of 0.001 wt % to 20 wt % of the PAO feed, or preferably 0.01 wt % to 10 wt % of the PAO feed. Hydrogen and the polyalpha-olefins are continuously added to the reactor to allow for a certain chosen residence time, usually 5 minutes to 10 hours, to allow complete hydrogenation of the unsaturated olefins. The amount of catalyst added is usually very small, just yet is high enough to compensate for the catalyst deactivation. The catalyst and hydrogenated PAO are continuously withdrawn from the reactor. The product mixture is then filtered, centrifuged or settled to remove the solid hydrogenation catalyst. The catalyst can be regenerated and reused. The hydrogenated PAO can be used as is, or further distilled or fractionated to a particular component composition if necessary. In some cases, when the hydrogenation catalyst shows no catalyst deactivation over long term operation, a stir tank hydrogenation process can be carried out in a manner where a fixed amount of catalyst is maintained in the reactor, usually 0.1 wt % to 10% of the total reactants, and only hydrogen and PAO feed need to be continuously added at a feed rate and only hydrogenated PAO is withdrawn from the reactor.

The hydrogenation process can also be accomplished by a fixed bed process, in which the solid catalyst is packed inside a tubular reactor and heated to reactor temperature. Hydrogen and PAO feed can be fed through the reactor simultaneously from the top or bottom or countercurrently to maximize the contact between hydrogen, PAO and catalyst and to allow best heat management. The feed rate of the PAO and hydrogen are adjusted to give appropriate residence to allow complete hydrogenation of the unsaturated olefins in the feed and/or to allow a desirable conversion of mm triads in the process. The hydrogenated PAO fluid can be used as is or further distilled or fractionated to give the right component, if necessary. Usually, the finished hydrocarbon PAO fluids have bromine number less than 2.

The new poly-alpha-olefins when used alone or blended with other fluids have unique lubrication properties.

In another embodiment, a novel lubricant of the present invention comprises the PAO's produced in this invention, together with one or more other base stocks, including Group I to Group VI base stocks with viscosity range from 1.5 to 100 cSt at 100° C. to formulate suitable viscosity grades. In addition, additives of one or more of: thickeners, VI improvers, antioxidants, anti-wear additives, detergent/dispersant/inhibitor (DDI) packages, and/or anti-rust additives may be added. In a preferred embodiment the PAO's produced herein are combined with one or more of dispersants, detergents, friction modifiers, traction improving additives, demulsifiers, defoamants, chromophores (dyes), and/or haze inhibitors. These fully formulated lubricants can be used in automotive crank case oil (engine oil), industrial oil, grease, hydraulic, gear oils, heat transfer fluids or gas turbine engine oils. These are examples of additives used in finished lubricant formulations. Additional information on the use of PAO's in the formulations of full synthetic, semi-synthetic or part synthetic lubricant or functional fluids can be found in "Synthetic Lubricants and High-Performance Functional Fluids", 2nd Ed. L. Rudnick, etc. Marcel Dekker, Inc., N.Y. (1999). Additional information on additives used in product formulation can be found in "Lubricants and Lubrications, Ed. By T. Mang and W. Dresel, by Wiley-VCH GmbH, Weinheim 2001.

In another embodiment, this invention relates to:

1. A process to produce a liquid poly-alpha olefin (PAO) having a $KV_{100}$ of greater than 20 cSt to about 10,000 cSt (30 to 7500 cSt, preferably 40 to 5000 cSt) comprising:
    contacting one or more alpha-olefin monomers having 3 to 24 carbon atoms with an unbridged substituted bis(cyclopentadienyl) transition metal compound represented by the formula:

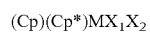
    $(Cp)(Cp^*)MX_1X_2$ wherein:
    M is the metal center, and is a Group 4 metal, preferably Ti, Hf or Zr, more preferably Hf or Zr;
    Cp and Cp* are the same or different cyclopentadienyl rings that are each bonded to M, and 1) both Cp and Cp* are substituted with at least one non-hydrogen substituent R group or 2) Cp is substituted with from two to five substituent R groups, each substituent group R being, independently, a radical group which is a hydrocarbyl, substituted hydrocarbyl, halocarbyl, substituted halocarbyl, silylcarbyl or germylcarbyl, or Cp and Cp* are the same or different cyclopentadienyl rings in which any two adjacent R groups are optionally joined to form a substituted or unsubstituted, saturated, partially unsaturated, or aromatic cyclic or polycyclic substituent;
    $X_1$ and $X_2$ are, independently, hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand; and
    a non-coordinating anion activator, and optionally an alkyl-aluminum compound, where the molar ratio of transition metal compound to activator is 10:1 to 0.1:1, and if the alkyl aluminum compound is present then the molar ratio of alkyl aluminum compound to transition metal compound is 1:4 to 4000:1,
    under polymerization conditions wherein:
    i) hydrogen is present at a partial pressure of 0.1 to 300 psi, based upon the total pressure of the reactor or the concentration of the hydrogen is from 1 to 30,000 ppm or less by weight (preferably from 1 to 20,000 ppm or less by wt);
    ii) wherein the alpha-olefin monomer(s) having 3 to 24 carbon atoms are present at 10 wt % or more based upon the total wt of the catalyst/activator/alkylaluminum compound solutions, monomers, and any diluents or solvents present in the reaction; and
    iii) provided that ethylene is not present at more than 40 wt % of the monomers entering the reactor.
2. The process of paragraph 1 wherein both Cp and Cp* are substituted with at least one non-isoalkyl substituent, where the isoalkyl substituent is defined as —CH(R*)$_2$, wherein each R* independently is a C1 to C20 alkyl group.

3. The process of paragraph 1 or 2 wherein both Cp and Cp* are substituted with from two to five non-hydrogen substituents.

4. The process of paragraph 1, 2 or 3 wherein both Cp and Cp* are substituted with five non-hydrogen substituents.

5. The process of paragraph 1, 2, 3 or 4 wherein the transition metal compound is an unbridged substituted bis(cyclopentadienyl) transition metal compound represented by the formula:

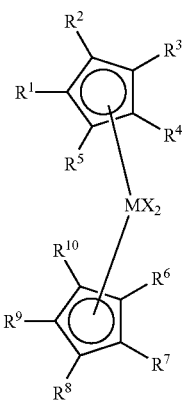

where M is a Group 4 metal, preferably Ti, Hf or Zr, more preferably Hf or Zr;

each X is, independently, is hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from 3 to 20 carbon atoms; or both X together can be an olefin, diolefin or aryne ligand, preferably each X is, independently, a C1 to C20 hydrocarbyl or a halogen, more preferably each X is, independently, a methyl, ethyl, propyl, isopropyl, butyl, isobutyl, hexyl, octyl, decyl, or dodecyl group or the halogen is chloride or bromide;

$R^1$ to $R^{10}$ are each independently, a radical group which is a hydrogen, a heteroatom, hydrocarbyl, substituted hydrocarbyl, halocarbyl, substituted halocarbyl, silylcarbyl or germylcarbyl, provided that at least one of $R^1$ to $R^5$ is not hydrogen and at least one of $R^6$ to $R^{10}$ is not hydrogen and where any two adjacent R groups are optionally joined to form a substituted or unsubstituted, saturated, partially unsaturated, or aromatic cyclic or polycyclic substituent, preferably $R^1$ to $R^{10}$ are selected from hydrogen, a C1 to C30 hydrocarbyl, a substituted C1 to C30 hydrocarbyl, or a heteroatom.

6. The process of paragraph 5 further provided that 1) at least one of $R^1$ to $R^5$ is not hydrogen and is a non-isoalkyl substitutent and at least one of $R^6$ to $R^{10}$ is not hydrogen and is a non-isoalkyl substitutent or 2) at least two of $R^1$ to $R^5$ are not hydrogen, or 3) at least two of $R^1$ to $R^5$ are not hydrogen and at least two of $R^6$ to $R^{10}$ are not hydrogen.

7. The process of any of paragraphs 5 to 6 wherein three, alternately four, alternately five of $R^1$ to $R^5$ are not hydrogen.

8. The process of any of paragraphs 5 to 6 wherein three, alternately four, alternately five of $R^6$ to $R^{10}$ are not hydrogen.

9. The process of any of paragraphs 5 to 8 wherein when one of $R^1$ to $R^5$ is an isoalkyl, then at least one other of $R^1$ to $R^5$ is not hydrogen and if one of $R^6$ to $R^{10}$ is an isoalkyl, then at least one other of $R^6$ to $R^{10}$ is not hydrogen.

10. The process of any of paragraphs 5 to 9 wherein none of $R^1$ to $R^{10}$ are isoalkyl groups.

11. The process of any of paragraphs 5 to 9 wherein two adjacent R groups form one of an indenyl, tetrahydroindenyl, substituted indenyl, substituted tetrahydroindenyl, fluorenyl or substituted fluorenyl group.

12. The process of any of paragraphs 1 through 11 wherein the PAO has a pour point of 10° C. or less, preferably 0° C., preferably −15° C. or less, preferably −25° C. or less.

13. The process of any of paragraphs 1 through 12 wherein the polyalpha-olefin has an Mw/Mn of between 1 and 3.5, preferably between 1 and 2.6.

14. The process of any of paragraphs 1 through 13 wherein the polyalpha-olefin is polydecene.

15. The process of any of paragraphs 1 through 14 wherein the polyalpha-olefin has a Bromine number of 1.8 or more.

16. The process of any of paragraphs 1 through 15 wherein the polyalph-olefin has a vinylidene content of greater than 50 mole % and a kinematic viscosity at 100° C. of less than 3000 cSt.

17. The process of any of paragraphs 1 through 16 wherein the polyalph-olefin has a methyl content of X or less, where X=−3.4309Ln(Kv at 100° C. in cSt)+29.567.

18. The process of any of paragraphs 1 through 17 further comprising the step of obtaining the polyalpha-olefin and thereafter hydrogenating the polyalpha-olefin, wherein the polyalpha-olefin comprises at least 50 mole % of at least one or more of C3 to C24 alpha-olefin monomers and the hydrogenated product has bromine number of less than 1.8.

19. The process of any of paragraphs 1 through 18 wherein the polyalpha-olefin has a kinematic viscosity at 40° C. of from 50 to 100,000 cSt.

20. The process of any of paragraphs 1 through 19 wherein the polyalpha-olefin has a viscosity index of 50 or more, preferably from 100 to 450.

21. The process of any of paragraphs 1 through 20 wherein the polyalpha-olefin has a weight average molecular weight of 250 to 200,000 g/mol, preferably from 250 to 100,000 g/mol.

22. The process of any of paragraphs 1 through 21 wherein the monomers having 3 to 24 carbon atoms are present at 60 wt % or more, preferably 70 wt % or more.

23. The process of any of paragraphs 1 through 22 wherein the polyalpha-olefin(s) are selected from the group consisting of propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 1-uneicosene, 1-docosene, 1-tricosene, 1-tetracosene, 1-pentacosene, 1-hexacosene, 4-methyl-1-pentene, 4-phenyl-1-butene, and 5-phenyl-1-pentene, preferably the polyalpha-olefin(s) are selected from the group consisting of propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene and 1-hexadecene, more preferably the polyalpha-olefin(s) are selected from the group consisting of 1-hexene, 1-octene, 1-decene, 1-dodecene, 1-tetradecene, 1-hexadecene and 1-octadecene, more preferably the polyalpha-olefin comprises octene, decene, and dodecene, alternately the polyalpha-olefin comprises hexene, decene, and dodecene; or hexene, decene, and tetradecene; or butene, hexene and dodecene; or propylene, butene, and dodecene, etc.

24. The process of any of paragraphs 1 through 23 wherein the polyalpha-olefin has a flash point of 150° C. or more.
25. The process of any of paragraphs 1 through 24 wherein the polyalpha-olefin has a specific gravity of 0.6 to 0.9 g/cm³.
26. The process of any of paragraphs 1 through 25 wherein ethylene, propylene and butene monomers are present at less than 1 weight %.
27. The process of any of paragraphs 1 through 43 wherein propylene and/or butene monomers are present at least 1 weight %, preferably at up to 100 wt % pure propylene or butene or combination of the two.
28. The process of any of paragraphs 1 through 44 wherein ethylene is present in less than 30 wt %, preferably less than 20 wt %, preferably less than 10 wt %, preferably less than 5 wt %, preferably less than 1 wt %, based upon the weight of the feed.
29. The process of any of paragraphs 1 through 28 wherein the monomers having 3 to 24 carbon atoms are present at 60 mole % or more, preferably 70 mole % or more.
30. The process of any of paragraphs 1 through 29 further comprising
    1) optionally treating the polyalpha-olefin to reduce heteroatom containing compounds to less than 600 ppm,
    2) optionally separating the polyalpha-olefins from solvents or diluents and other lighter product fractions;
    3) contacting the polyalpha-olefin with hydrogen and a hydrogenation catalyst; and
    4) obtaining a polyalpha-olefin having a bromine number less than 1.8.
31. The process of paragraph 30 wherein the polyalpha-olefin is treated to remove heteroatom containing compounds prior to contacting with the hydrogen and or the hydrogenation catalyst, preferably the treated polyalpha-olefin comprises 100 ppm of heteroatom containing compounds or less preferably the treated polyalpha-olefin comprises 10 ppm of heteroatom containing compounds or less.
32. The process of any of paragraphs 1 through 31 where scavenger is present and comprises methylalumoxane and or modified methylalumoxane.
33. The process of any of paragraphs 1 through 32 wherein the non-coordinating anion activator comprises one or more of N,N-dimethylanilinium tetrakis(pentafluorophenyl)borate, N,N-dialkylphenylanilinium tetrakis(pentafluorophenyl)borate, trityl tetrakis(pentafluorophenyl)borate, tris(pentafluorophenyl)boron, tri-alkylammonium tetrakis(pentafluorophenyl)borate, tetra-alkylammonium tetrakis(pentafluorophenyl)borate, N,N-dimethylanilinium tetrakis(perfluoronapthyl)borate, N,N-dialkylphenylanilinium tetrakis (perfluoronapthyl)borate, trityl tetrakis(perfluoronapthyl)borate, tris(perfluoronapthyl)boron, tri-alkylammonium tetrakis(perfluoronapthyl)borate, tetra-alkylammonium tetrakis(perfluoronapthyl)borate, where preferably the alkyl groups are C1 to C18 alkyl groups.
34. The process of any of paragraphs 1 through 33 wherein the transition metal compound comprises one or more of:
bis(1,2,4-trimethylcyclopentadienyl)zirconium dichloride;
bis(1,3-dimethylcyclopentadienyl)zirconium dichloride;
bis(1,2,3-trimethylcyclopentadienyl)zirconium dichloride;
bis(1,2,3,4-tetrahydroindenyl)zirconium dichloride;
bis(tetramethylcyclopentadienyl)zirconium dichloride;
bis(pentamethylcyclopentadienyl)zirconium dichloride;
bis(indenyl)zirconium dichloride;
bis(1,2,4-trimethylcyclopentadienyl)zirconium dimethyl;
bis(1,2,3-trimethylcyclopentadienyl)zirconium dimethyl;
bis(1,3-dimethylcyclopentadienyl)zirconium dimethyl;
bis(tetramethylcyclopentadienyl)zirconium dimethyl;
bis(pentamethylcyclopentadienyl)zirconium dimethyl; or
bis(1,2,3,4-tetrahydroindenyl)zirconium dimethyl.
35. The process of any of paragraphs 1 through 33 wherein the transition metal compound comprises one or more of:
bis(1,2-dimethylcyclopentadienyl)zirconium dichloride,
bis(1,3-dimethylcyclopentadienyl)zirconium dichloride,
bis(1,2,3-trimethylcyclopentadienyl)zirconium dichloride,
bis(1,2,4-trimethylcyclopentadienyl)zirconium dichloride,
bis(1,2,3,4-tetramethylcyclopentadienyl)zirconium dichloride,
bis(1,2,3,4,5-pentamethylcyclopentadienyl)zirconium dichloride,
bis(1-methyl-2-ethylcyclopentadienyl)zirconium dichloride,
bis(1-methyl-2-n-propylcyclopentadienyl)zirconium dichloride,
bis(1-methyl-2-n-butylcyclopentadienyl)zirconium dichloride,
bis(1-methyl-3-ethylcyclopentadienyl)zirconium dichloride,
bis(1-methyl-3-n-propylcyclopentadienyl)zirconium dichloride,
bis(1-methyl-3-n-butylcyclopentadienyl)zirconium dichloride,
bis(1-methyl-3-n-pentylcyclopentadienyl)zirconium dichloride,
bis(1,2-dimethyl-4-ethylcyclopentadienyl)zirconium dichloride,
bis(1,2-dimethyl-4-n-propylcyclopentadienyl)zirconium dichloride,
bis(1,2-dimethyl-4-n-butylcyclopentadienyl)zirconium dichloride,
bis(1,2-diethylcyclopentadiehyl)zirconium dichloride,
bis(1,3-diethylcyclopentadienyl)zirconium dichloride,
bis(1,2-di-n-propylcyclopentadienyl)zirconium dichloride,
bis(1,2-di-n-butylcyclopentadienyl)zirconium dichloride,
bis(1-methyl-2,4-diethylcyclopentadienyl)zirconium dichloride,
bis(1,2-diethyl-4-n-propylcyclopentadienyl)zirconium dichloride,
bis(1,2-diethyl-4-n-butylcyclopentadienyl)zirconium dichloride,
bis(1-methyl-3-i-propylcyclopentadienyl)zirconium dichloride,
bis(1-ethyl-3-i-propylcyclopentadienyl)zirconium dichloride,
(1,2-dimethylcyclopentadienyl)(cyclopentadienyl)zirconium dichloride,
(1,3-dimethylcyclopentadienyl)(cyclopentadienyl)zirconium dichloride,
(1,2-dimethylcyclopentadienyl)(methylcyclopentadienyl)zirconium dichloride,
(1,2-dimethylcyclopentadienyl)(ethylcyclopentadienyl)zirconium dichloride,
(1,2-dimethylcyclopentadienyl)(1,2-di-n-butylcyclopentadienyl)zirconium dichloride,
(1,3-dimethylcyclopentadienyl)(cyclopentadienyl)zirconium dichloride,
(1,3-dimethylcyclopentadienyl)(1,2-dimethylcyclopentadienyl)zirconium dichloride,
(1,3-dimethylcyclopentadienyl)(1,3-diethylcyclopentadienyl)zirconium dichloride, bis(indenyl)zirconium dichloride,
bis(1-methylindenyl)zirconium dichloride,
bis(2-methylindenyl)zirconium dichloride,
bis(4-methylindenyl)zirconium dichloride,
bis(4,7-dimethylindenyl)zirconium dichloride,
bis(4,5,6,7-tetrahydroindenyl)zirconium dichloride,
bis(4,5,6,7-tetrahydro-2-methylindenyl)zirconium dichloride, bis(4,5,6,7-tetrahydro-4,7-dimethylindenyl)zirconium dichloride,
(cyclopentadienyl)(4,5,6,7-tetrahydroindenyl)zirconium dichloride,
bis(1,2-dimethylcyclopentadienyl)zirconium dimethyl,
bis(1,3-dimethylcyclopentadienyl)zirconium dimethyl,
bis(1,2,3-trimethylcyclopentadienyl)zirconium dimethyl,
bis(1,2,4-trimethylcyclopentadienyl)zirconium dimethyl,
bis(1,2,3,4-tetramethylcyclopentadienyl)zirconium dimethyl,
bis(1,2,3,4,5-pentamethylcyclopentadienyl)zirconium dimethyl,
bis(1-methyl-2-ethylcyclopentadienyl)zirconium dimethyl,
bis(1-methyl-2-n-propylcyclopentadienyl)zirconium dimethyl,
bis(1-methyl-2-n-butylcyclopentadienyl)zirconium dimethyl,
bis(1-methyl-3-ethylcyclopentadienyl)zirconium dimethyl,
bis(1-methyl-3-n-propylcyclopentadienyl)zirconium dimethyl,
bis(1-methyl-3-n-butylcyclopentadienyl)zirconium dimethyl,
bis(1-methyl-3-n-pentylcyclopentadienyl)zirconium dimethyl,
bis(1,2-dimethyl-4-ethylcyclopentadienyl)zirconium dimethyl,
bis(1,2-dimethyl-4-n-propylcyclopentadienyl)zirconium dimethyl,
bis(1,2-dimethyl-4-n-butylcyclopentadienyl)zirconium dimethyl,
bis(1,2-diethylcyclopentadienyl)zirconium dimethyl,
bis(1,3-diethylcyclopentadienyl)zirconium dimethyl,
bis(1,2-di-n-propylcyclopentadienyl)zirconium dimethyl,
bis(1,2-di-n-butylcyclopentadienyl)zirconium dimethyl,
bis(1-methyl-2,4-diethylcyclopentadienyl)zirconium dimethyl,
bis(1,2-diethyl-4-n-propylcyclopentadienyl)zirconium dimethyl,
bis(1,2-diethyl-4-n-butylcyclopentadienyl)zirconium dimethyl,
bis(1-methyl-3-i-propylcyclopentadienyl)zirconium dimethyl,
bis(1-ethyl-3-i-propylcyclopentadienyl)zirconium dimethyl,
(1,2-dimethylcyclopentadienyl)(cyclopentadienyl)zirconium dimethyl,
(1,3-dimethylcyclopentadienyl)(cyclopentadienyl)zirconium dimethyl,
(1,2-dimethylcyclopentadienyl)(methylcyclopentadienyl)zirconium dimethyl,
(1,2-dimethylcyclopentadienyl)(ethylcyclopentadienyl)zirconium dimethyl,
(1,2-dimethylcyclopentadienyl)(1,2-di-n-butylcyclopentadienyl)zirconium dimethyl,
(1,3-dimethylcyclopentadienyl)(cyclopentadienyl)zirconium dimethyl,
(1,3-dimethylcyclopentadienyl)(1,2-dimethylcyclopentadienyl)zirconium dimethyl,
(1,3-dimethylcyclopentadienyl)(1,3-diethylcyclopentadienyl)zirconium dimethyl,
bis(indenyl)zirconium dimethyl,
bis(1-methylindenyl)zirconium dimethyl,
bis(2-methylindenyl)zirconium dimethyl,
bis(4-methylindenyl)zirconium dimethyl,
bis(4,7-dimethylindenyl)zirconium dimethyl,
bis(4,5,6,7-tetrahydroindenyl)zirconium dimethyl,
bis(4,5,6,7-tetrahydro-2-methylindenyl)zirconium dimethyl,
bis(4,5,6,7-tetrahydro-4,7-dimethylindenyl)zirconium dimethyl, or
(cyclopentadienyl)(4,5,6,7-tetrahydroindenyl)zirconium dimethyl.

35. The process of any of paragraphs 1 through 33 wherein the transition metal compound comprises one or more of:
bis(1,2-dimethylcyclopentadienyl)hafnium dichloride,
bis(1,3-dimethylcyclopentadienyl)hafnium dichloride,
bis(1,2,3-trimethylcyclopentadienyl)hafnium dichloride,
bis(1,2,4-trimethylcyclopentadienyl)hafnium dichloride,
bis(1,2,3,4-tetramethylcyclopentadienyl)hafnium dichloride,
bis(1,2,3,4,5-pentamethylcyclopentadienyl)hafnium dichloride,
bis(1-methyl-2-ethylcyclopentadienyl)hafnium dichloride,
bis(1-methyl-2-n-propylcyclopentadienyl)zirconium dichloride,
bis(1-methyl-2-n-butylcyclopentadienyl)hafnium dichloride,
bis(1-methyl-3-ethylcyclopentadienyl)hafnium dichloride,
bis(1-methyl-3-n-propylcyclopentadienyl)hafnium dichloride,
bis(1-methyl-3-n-butylcyclopentadienyl)hafnium dichloride,
bis(1-methyl-3-n-pentylcyclopentadienyl)hafnium dichloride,
bis(1,2-dimethyl-4-ethylcyclopentadienyl)hafnium dichloride,
bis(1,2-dimethyl-4-n-propylcyclopentadienyl)hafnium dichloride,
bis(1,2-dimethyl-4-n-butylcyclopentadienyl)hafnium dichloride,
bis(1,2-diethylcyclopentadienyl)hafnium dichloride,
bis(1,3-diethylcyclopentadienyl)hafnium dichloride,
bis(1,2-di-n-propylcyclopentadienyl)hafnium dichloride,
bis(1,2-di-n-butylcyclopentadienyl)hafnium dichloride,
bis(1-methyl-2,4-diethylcyclopentadienyl)hafnium dichloride,
bis(1,2-diethyl-4-n-propylcyclopentadienyl)hafnium dichloride,
bis(1,2-diethyl-4-n-butylcyclopentadienyl)hafnium dichloride,
bis(1-methyl-3-i-propylcyclopentadienyl)hafnium dichloride,
bis(1-ethyl-3-i-propylcyclopentadienyl)hafnium dichloride,
(1,2-dimethylcyclopentadienyl)(cyclopentadienyl)hafnium dichloride,
(1,3-dimethylcyclopentadienyl)(cyclopentadienyl)hafnium dichloride,
(1,2-dimethylcyclopentadienyl)(methylcyclopentadienyl)hafnium dichloride,
(1,2-dimethylcyclopentadienyl)(ethylcyclopentadienyl)hafnium dichloride,
(1,2-dimethylcyclopentadienyl)(1,2-di-n-butylcyclopentadienyl)hafnium dichloride,
(1,3-dimethylcyclopentadienyl)(cyclopentadienyl)hafnium dichloride,
(1,3-dimethylcyclopentadienyl)(1,2-dimethylcyclopentadienyl)hafnium dichloride,
(1,3-dimethylcyclopentadienyl)(1,3-diethylcyclopentadienyl)hafnium dichloride,
bis(indenyl)hafnium dichloride,
bis(1-methylindenyl)hafnium dichloride,
bis(2-methylindenyl)hafnium dichloride,
bis(4-methylindenyl)hafnium dichloride,
bis(4,7-dimethylindenyl)hafnium dichloride,
bis(4,5,6,7-tetrahydroindenyl)hafnium dichloride,
bis(4,5,6,7-tetrahydro-2-methylindenyl)hafnium dichloride,
bis(4,5,6,7-tetrahydro-4,7-dimethylindenyl)hafnium dichloride,
(cyclopentadienyl)(4,5,6,7-tetrahydroindenyl)hafnium dichloride,
bis(1,2-dimethylcyclopentadienyl)hafnium dimethyl,
bis(1,3-dimethylcyclopentadienyl)hafnium dimethyl, bis(1,2,3-trimethylcyclopentadienyl)hafnium dimethyl,
bis(1,2,4-trimethylcyclopentadienyl)hafnium dimethyl,
bis(1,2,3,4-tetramethylcyclopentadienyl)hafnium dimethyl,
bis(1,2,3,4,5-pentamethylcyclopentadienyl)hafnium dimethyl,
bis(1-methyl-2-ethylcyclopentadienyl)hafnium dimethyl,
bis(1-methyl-2-n-propylcyclopentadienyl)hafnium dimethyl,
bis(1-methyl-2-n-butylcyclopentadienyl)hafnium dimethyl,
bis(1-methyl-3-ethylcyclopentadienyl)hafnium dimethyl,
bis(1-methyl-3-n-propylcyclopentadienyl)hafnium dimethyl,
bis(1-methyl-3-n-butylcyclopentadienyl)hafnium dimethyl,
bis(1-methyl-3-n-pentylcyclopentadienyl)hafnium dimethyl,
bis(1,2-dimethyl-4-ethylcyclopentadienyl)hafnium dimethyl,
bis(1,2-dimethyl-4-n-propylcyclopentadienyl)hafnium dimethyl,
bis(1,2-dimethyl-4-n-butylcyclopentadienyl)hafnium dimethyl,
bis(1,2-diethylcyclopentadienyl)hafnium dimethyl,
bis(1,3-diethylcyclopentadienyl)hafnium dimethyl,
bis(1,2-di-n-propylcyclopentadienyl)hafnium dimethyl,
bis(1,2-di-n-butylcyclopentadienyl)hafnium dimethyl,
bis(1-methyl-2,4-diethylcyclopentadienyl)hafnium dimethyl,
bis(1,2-diethyl-4-n-propylcyclopentadienyl)hafnium dimethyl,
bis(1,2-diethyl-4-n-butylcyclopentadienyl)hafnium dimethyl,
bis(1-methyl-3-i-propylcyclopentadienyl)hafnium dimethyl,
bis(1-ethyl-3-i-propylcyclopentadienyl)hafnium dimethyl,
(1,2-dimethylcyclopentadienyl)(cyclopentadienyl)hafnium dimethyl,
(1,3-dimethylcyclopentadienyl)(cyclopentadienyl)hafnium dimethyl,
(1,2-dimethylcyclopentadienyl)(methylcyclopentadienyl)hafnium dimethyl,
(1,2-dimethylcyclopentadienyl)(ethylcyclopentadienyl)hafnium dimethyl,
(1,2-dimethylcyclopentadienyl)(1,2-di-n-butylcyclopentadienyl)hafnium dimethyl,
(1,3-dimethylcyclopentadienyl)(cyclopentadienyl)hafnium dimethyl,
(1,3-dimethylcyclopentadienyl)(1,2-dimethylcyclopentadienyl)hafnium dimethyl,
(1,3-dimethylcyclopentadienyl)(1,3-diethylcyclopentadienyl)hafnium dimethyl,
bis(indenyl)hafnium dimethyl,
bis(1-methylindenyl)hafnium dimethyl,
bis(2-methylindenyl)hafnium dimethyl,
bis(4-methylindenyl)hafnium dimethyl,
bis(4,7-dimethylindenyl)hafnium dimethyl,
bis(4,5,6,7-tetrahydroindenyl)hafnium dimethyl,
bis(4,5,6,7-tetrahydro-2-methylindenyl)hafnium dimethyl,
bis(4,5,6,7-tetrahydro-4,7-dimethylindenyl)hafnium dimethyl, or
(cyclopentadienyl)(4,5,6,7-tetrahydroindenyl)hafnium dimethyl.

36. The process of any of paragraphs 1 through 33 wherein the transition metal compound comprises one or more of:
bis(1,2-dimethylcyclopentadienyl)zirconium dichloride, bis(1,3-dimethylcyclopentadienyl)zirconium dichloride, bis(1,2,4-trimethylcyclopentadienyl)zirconium dichloride, bis(tetramethylcyclopentadienyl)zirconium dichloride, bis(1-methyl-2-ethylcyclopentadienyl)zirconium dichloride, bis(1-methyl-3-ethylcyclopentadienyl)zirconium dichloride, bis(1-methyl-3-n-propylcyclopentadienyl)zirconium dichloride, bis(1-methyl-3-n-butylclopentadienyl) zirconium dichloride, bis(4,5,6,7-tetrahydro indenyl)zirconium dichloride, bis(indenyl)zirconium dichloride, bis(1,2-dimethylcyclopentadienyl)zirconium dimethyl, bis(1,3-dimethylcyclopentadienyl)zirconium dimethyl, bis(1,2,4-trimethylcyclopentadienyl)zirconium dimethyl, bis(tetramethylcyclopentadienyl)zirconium dimethyl, bis(1-methyl-2-ethylcyclopentadienyl)zirconium dimethyl, bis(1-methyl-3-ethylcyclopentadienyl)zirconium dimethyl, bis(1-methyl-3-n-propylcyclopentadienyl)zirconium dimethyl, bis(1-methyl-3-n-butylclopentadienyl)zirconium dimethyl, bis(4,5,6,7-tetrahydro indenyl)zirconium dichloride, or bis(indenyl)zirconium dimethyl.

37. The process of any of paragraphs 1 through 36 wherein an alkylaluminum compound is present and the alkylaluminum compound is represented by the formula: $R'_3Al$, where each R' is, independently, selected from the group consisting of methyl, ethyl, n-propyl, iso-propyl, iso-butyl, n-butyl, t-butyl, n-pentyl, iso-pentyl, neopentyl, n-hexyl, iso-hexyl, n-heptyl, iso-heptyl, n-octyl, iso-octyl, n-nonyl, n-decyl, n-undecyl, n-dodecyl, n-tridecyl, n-tetradecyl, n-pentadecy, n-hexadecyl, n-heptadecyl, n-octadecyl, and their iso-analogs.

38. The process of any of paragraphs 1 through 37 wherein the process is a continuous process, preferably a continuous process comprising:
a) continuously introducing a feed stream comprising at least 10 wt % of the one or more C3 to C24 alpha-olefins into a reactor,
b) continuously introducing the transition metal compound and the activator into the reactor,
c) optionally continuously introducing co-activator into the reactor, and
d) continuously withdrawing the polyalpha-olefin from the reactor.

39. The process of paragraph 38 wherein the process further comprises:
1) optionally, continuously treating the polyalpha-olefin to reduce heteroatom containing compounds to less than 600 ppm,
2) optionally, continuously fractionating the polyalpha-olefin to separate the light and heavy fractions, where the heavy fractions have 20 or more carbons,
3) continuously contacting the polyalpha-olefin with hydrogen and a hydrogenation catalyst,
4) continuously obtaining a polyalpha-olefin having a bromine number less than 1.8.

40. The process of any of paragraphs 1 through 39 wherein the temperature in the reactor is from −10° C. to 250° C., preferably from 10° C. to 220° C., preferably from 20° C. to 180° C., preferably from 40° C. to 150° C., preferably from 30 to 100° C.

41. The process of any of paragraphs 1 through 40 wherein the monomers, catalyst compound and activator are contacted for a residence time of 5 minutes to 100 hours, preferably from 10 minutes to 20 hours.

42. The process of any of paragraphs 1 through 41 wherein solvent or diluent is present, preferably the solvent or diluent is selected from the group consisting of propane, butanes, 2-butenes, iso-butene, pentanes, hexanes, heptanes, octanes, nonanes, decanes, undecanes, dodecanes, tridecanes, tetradecanes, pentadecanes, hexadecanes, benzene, toluene, o-xylene, m-xylene, p-xylene, mixed xylenes, ethylbenzene, isopropylbenzene, and n-butylbenzene.

43. The process of any of paragraphs 1 through 42 wherein the monomers are contacted with the transition metal compound and the activator in a reactor and the reactor is a continuous stirred tank reactor.

44. The process of any of paragraphs 1 through 43 wherein catalyst residue is removed from the product by contacting with a solid sorbent.
45. The process of any of paragraphs 1 through 44 where the monomers are contacted with the transition metal compound and the activator in the solution phase or the slurry phase.
46. The process of any of paragraphs 1 through 45 wherein the monomers are contacted with an alkylaluminum compound prior to being introduced into the reactor, and/or the metallocene and or activator are combined with an alkylaluminum compound prior to entering the reactor, preferably the alkylaluminum compound is selected from tri-isobutylaluminum, tri-n-octylaluminum, tri-n-hexylaluminum, tri-n-decylaluminum and tri-n-dodecylaluminum.
47. The process of any of paragraphs 1 through 46 where in the polyalpha-olefin is contacted with hydrogen and a hydrogenation catalyst preferably selected from the group consisting of supported Group 7, 8, 9, and 10 metals, preferably the hydrogenation catalyst selected from the group consisting of one or more of Ni, Pd, Pt, Co, Rh, Fe, Ru, Os, Cr, Mo, and W, supported on silica, alumina, clay, titania, zirconia, mesoporous material, MCM41 or mixed metal oxide supports, preferably the hydrogenation catalyst is nickel supported on keisleghur, silica, alumina, clay mesoporous material MCM41 or silica-alumina.
48. The process of any of paragraphs 1 through 47 wherein the polyalpha-olefin is contacted with hydrogen and a hydrogenation catalyst at a temperature from 25 to 350° C.
49. The process of any of paragraphs 1 through 48 wherein the product produced has 60 wt % or less C10 dimer, preferably 40 wt % or less C10 dimer.
50. The process of any of paragraphs 1 through 49 wherein the process further comprises:
1) catalyst residue is removed from the polyalpha-olefin by contacting the polyalpha-olefin with a solid sorbent,
2) optionally, treating the polyalpha-olefin to reduce heteroatom containing compounds to less than 600 ppm,
3) optionally, fractionating the polyalpha-olefin to separate the light and heavy fractions, where the heavy fractions have 20 or more carbons,
4) contacting the polyalpha-olefin with hydrogen and a hydrogenation catalyst, and
5) obtaining a polyalpha-olefin having a bromine number less than 1.8.
51. The process of any of paragraphs 1 through 50 wherein the productivity of the process is at least 1.5 kg of product per gram of transition metal compound and/or the productivity of the process is at least 1.5 kg of product per g of non-coordinating anion activator.
52. The process of any of paragraphs 1 through 51 wherein the process is semi-continuous.
53. The process of any of paragraphs 1 through 52 wherein temperature in the reaction zone does not rise by more than 20° C. during the reaction, preferably the temperature in the reaction zone does not rise by more than 10° C. during the reaction, preferably the temperature in the reaction zone does not rise by more than 5° C. during the reaction, preferably the temperature in the reaction zone does not rise by more than 3° C. during the reaction.
54. The process of any of paragraphs 1 through 53 wherein the liquid polyalphaolefin product has X wt % dimer or less, where X wt %=0.8×[231.55×(fluid Kv in cSt at 100° C.)$^{(-0.9046)}$].
55. The process of any of paragraphs 1 through 54 wherein the liquid polyalphaolefin product has less than 40 mole % of mm or rr triads, preferably less than 30 mole %, preferably less than 20 mole %.
56. The process of any of paragraphs 1 through 55 wherein the liquid polyalphaolefin product has 50 mole % or more of mr triads.
57. The process of any of paragraphs 1 through 56 wherein the liquid polyalphaolefin product does not have a melting point measurable by DSC.
58. The process of any of paragraphs 1 through 57 wherein 1,2 disubstituted olefins are present in the polyalphaolefin product at less than Z mole %, where Z=8.420*Log(V)−4.048 where V is the kinematic viscosity of the polyalpha-olefin in cSt measured at 100° C., preferably at 7 mole % or less, preferably at 5 mole % or less.
50. The process of any of paragraphs 1 through 58, wherein the polyalpha-olefin has less than Z mole % of units represented by the formula:

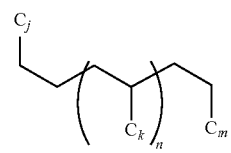

where j, k and m are each, independently, 3, 4, 5, 6, 7, 8, 9, 10, 11, 12, 13, 14, 15, 16, 17, 18, 19, 20, 21, or 22, n is an integer from 1 to 350, and where Z=8.420*Log(V)−4.048, where V is the kinematic viscosity of the polyalpha-olefin measured at 100° C. in cSt.

EXAMPLES

Fluid properties were measured by following standard methods and their commonly recognized equivalent methods, except when described otherwise: kinematic viscosity at 40 and 100° C. in cSt by ASTM D 445 method; pour point by ASTM D 97 method; and viscosity index (VI) according to ASTM D 2270.

The following examples are for purposes of illustration only and are non-limiting examples.

The 1-decene used for all of the experiments was purified by mixing 1 liter of untreated raw material with 20 grams of activated 13× molecular sieve, (which was activated by calcining at 200° C. for at least four hours under a stream of purging dry nitrogen gas), and 10 grams of Oxi-Clear catalyst (purchased from Altech Associates, Inc of Deerfield, Ill. 60115) for at least two days inside a glove box under a dry, inert atmosphere of nitrogen. The molecular sieve and de-oxygenation catalyst were then removed by filtration in the glove box to provide purified 1-decene. Alternatively, the feeds were purified by passing through a bed of activated 13× molecular sieve alone under nitrogen atmosphere.

The data in Table 1 were generated as follows. A continuous run was conducted in the following manner. A feed stream of 1-decene (40 ml/minute) and metallocene catalyst, bis(1-methl-3-n-butylcyclopentadienyl)zirconium dimethyl, solution, and NCA activator N,N-dimethylanilinium tetrakis (pentafluorophenyl)borate, solution of 1 micromole/ml each in toluene (2.482 ml/minute) and tri-n-octylaluminum solution of 4 micromole/ml (2.482 ml/minute) was fed into a one-liter autoclave at constant reaction temperature with stirring at 1000 rpm. The reaction temperature was controlled to be within ±3° C. of the set temperature. The residence time of the reaction was 20 minutes. The product was continuously withdrawn from the reactor and collected for property evaluation. The crude product was then treated with trace water to deactivate the catalyst. The catalyst residual was removed by addition of small amount of solid absorbing alumina and removal of the solid alumina by filtration.

TABLE 1

| | Example No. | | | | | | | | |
|---|---|---|---|---|---|---|---|---|---|
| | 1 | 2 | 3 | 4 | 5 | 6 | 7 | 8 | 9 |
| Reaction Temp, °C | 100 | 100 | 120 | 120 | 90 | 80 | 70 | 60 | 50 |
| H2, scc/min | 5 | 20 | 5 | 20 | 5 | 5 | 5 | 5 | 0* |
| Conversion | 59.8 | 76.4 | 73.2 | 83.8 | 62.3 | 70.0 | 63.2 | 55.4 | 45.4 |
| Product Selectivity, wt % | | | | | | | | | |
| dimer | 12.8 | 18.3 | 40.8 | 47.7 | 8.2 | 8.6 | 3.4 | 1.2 | 0.4 |
| Lube | 87.2 | 81.7 | 59.2 | 52.3 | 91.8 | 91.4 | 96.6 | 98.8 | 99.6 |
| Lube Property | | | | | | | | | |
| Kv at 100° C., cSt | 8.05 | 6.53 | 4.58 | 4.36 | 11.03 | 10.52 | 19.61 | 44.34 | 95.56 |
| Kv at 40° C., cSt | 43.43 | 32.50 | 20.00 | 18.54 | 65.08 | 61.10 | 124.7 | 363.65 | 890 |
| VI | 161 | 160 | 151 | 150 | 162 | 163 | 179 | 180 | 199 |
| Pour Point, °C | <−60.9 | <−60.3 | −51 | −45 | −57 | −57 | −51 | −42 | −36 |
| Mn | 1000 | 904 | 754 | 729 | 1160 | 1135 | 1516 | 2282 | 3311 |
| MWD | 1.186 | 1.143 | 1.072 | 1.059 | 1.255 | 1.239 | 1.370 | 1.528 | 1.688 |
| Catalyst Productivity | | | | | | | | | |
| g total product/g catalyst | 6,134 | 7,832 | 7,503 | 8,596 | 6,388 | 7,175 | 6,477 | 5,685 | 4,651 |
| g lube/g catalyst | 5,349 | 6,400 | 4,442 | 4,495 | 5,866 | 6,558 | 6,254 | 5,617 | 4,631 |

*indicates that there was a trace amount of hydrogen present in the reaction system as reactions were run in tandem and the equipment had residual amounts of hydrogen.
Examples 1 through 7 are comparative PAOs in reference to the PAOs provides in Examples 8 and 9 which are illustrative of the present invention.

The crude product with a known amount of n-hexadecane as internal standard was then analyzed by a gas chromatograph HP5890 model equipped with a 30 meter, DB1 column which separates hydrocarbons according to their boiling points. Column conditions; initial temperature 70° C./0 minutes, programmed at 10° C./minute to 300° C. and hold for 30 minutes. The wt % of 1-decene conversion, and wt % selectivities to decene dimer and lube fractions of $C_{30}$ and higher hydrocarbons, were than calculated from the gas chromatograph data using an internal standard method.

The crude product was then fractionated under vacuum to remove light solvents, such as toluene or hexanes, and further fractionated under high vacuum of 0.1 millitorr or lower at 150° C. to remove any unreacted decene fraction and decene dimer $C_{20}$ fraction. The conversion and selectivities to $C_{20}$ or lube fraction by distillation method are consistent with the GC analytical results. The 40° C. and 100° C. kinematic viscosities, VI, pour points and GPC of the lube fractions were measured according to standard methods as described earlier. The catalyst productivity was calculated based on the weight of the total product or lube product per gram of metallocene and catalyst used.

It was noted that the processes in Table 1 all have very high catalyst productivity, ranging from 4650 g total product/g of catalyst (metallocene+activator) to 8596 g total product/g of catalyst. Furthermore, these runs have the desirable high selectivities to lube fraction and low selectivities to the lighter $C_{20}$ fraction.

TABLE 2

Comparative Examples from U.S. Pat. No. 6,548,724
U.S. Pat. No. 6,548,724

| | Comparative example | | | | | | |
|---|---|---|---|---|---|---|---|
| | 1 | 2 | 3 | 4 | 5 | 6 | 7 |
| catalyst type | $Cp_2ZrC$ | $Cp_2ZrCl_2$ | $Cp_2ZrCl_2$ | $Cp_2ZrCl_2$ | $Cp_2ZrCl$ | $(MeCp)_2ZrCl$ | $(nBuCp)2ZrCl2$ |
| metallocene wt., mg | 37 | 37 | 37 | 8.8025 | 8.8025 | 8.8025 | 8.8025 |
| MAO, gram | 3.3454 | 3.3454 | 3.3454 | 0.6106 | 0.6106 | 0.6106 | 0.6106 |
| 1-C10 feed, gram | 1096 | 1096 | 1096 | 1099 | 1098 | 1098 | 1100 |
| temp., °C | 65 | 75 | 100 | 70 | 110 | 110 | 110 |
| % dimer selectivity | 31 | 39.2 | 52.4 | 24.3 | 55.3 | 40.4 | 49.1 |
| Kv at 100° C., cSt | 9.5 | 7 | 5.5 | 17.5 | 5.9 | 8.2 | 6.7 |
| Catalyst Productivity | | | | | | | |
| g lube/g catalyst | 193 | 169 | 128 | 759 | 179 | 390 | 332 |
| g total product/g cataly | 280 | 278 | 269 | 1,003 | 401 | 654 | 652 |

| | Comparative example | | | | | |
|---|---|---|---|---|---|---|
| | 8 | 9 | 10 | 11 | 12 | 13 |
| catalyst type | $(iPrCp)_2ZrCl_2$ | $(tBuCp)_2ZrCl_2$ | $(1,3-Me_2Cp)2ZrCl_2$ | $(1,3-Me_2Cp)_2ZrCl_2$ | $(Me_4Cp)_2ZrCl_2$ | $(Me_5Cp)2ZrCl_2$ |
| metallocene wt., mg | 8.8025 | 8.8025 | 8.8025 | 8.8025 | 8.8025 | 8.8025 |
| MAO, gram | 0.6106 | 0.6106 | 0.6106 | 0.6106 | 0.6106 | 0.6106 |
| 1-C10 feed, gram | 1099 | 1095 | 1102 | 1114 | 1147 | 1121 |
| temp., °C | 110 | 70 | 70 | 110 | 70 | 70 |

TABLE 2-continued

| Comparative Examples from U.S. Pat. No. 6,548,724 U.S. Pat. No. 6,548,724 | | | | | | |
|---|---|---|---|---|---|---|
| % dimer selectivity | 49.5 | 31.7 | 6.4 | 15.2 | 1.4 | 4.8 |
| Kv at 100° C., cSt | 5.7 | nd | 61.2 | 16.5 | 154 | 114.6 |
| Catalyst Productivity | | | | | | |
| g lube/g catalyst | 327 | 87 | 1,121 | 900 | 1,232 | 231 |
| g total product/g cataly | 648 | 127 | 1,197 | 1,061 | 1,249 | 243 |

Figure 2:
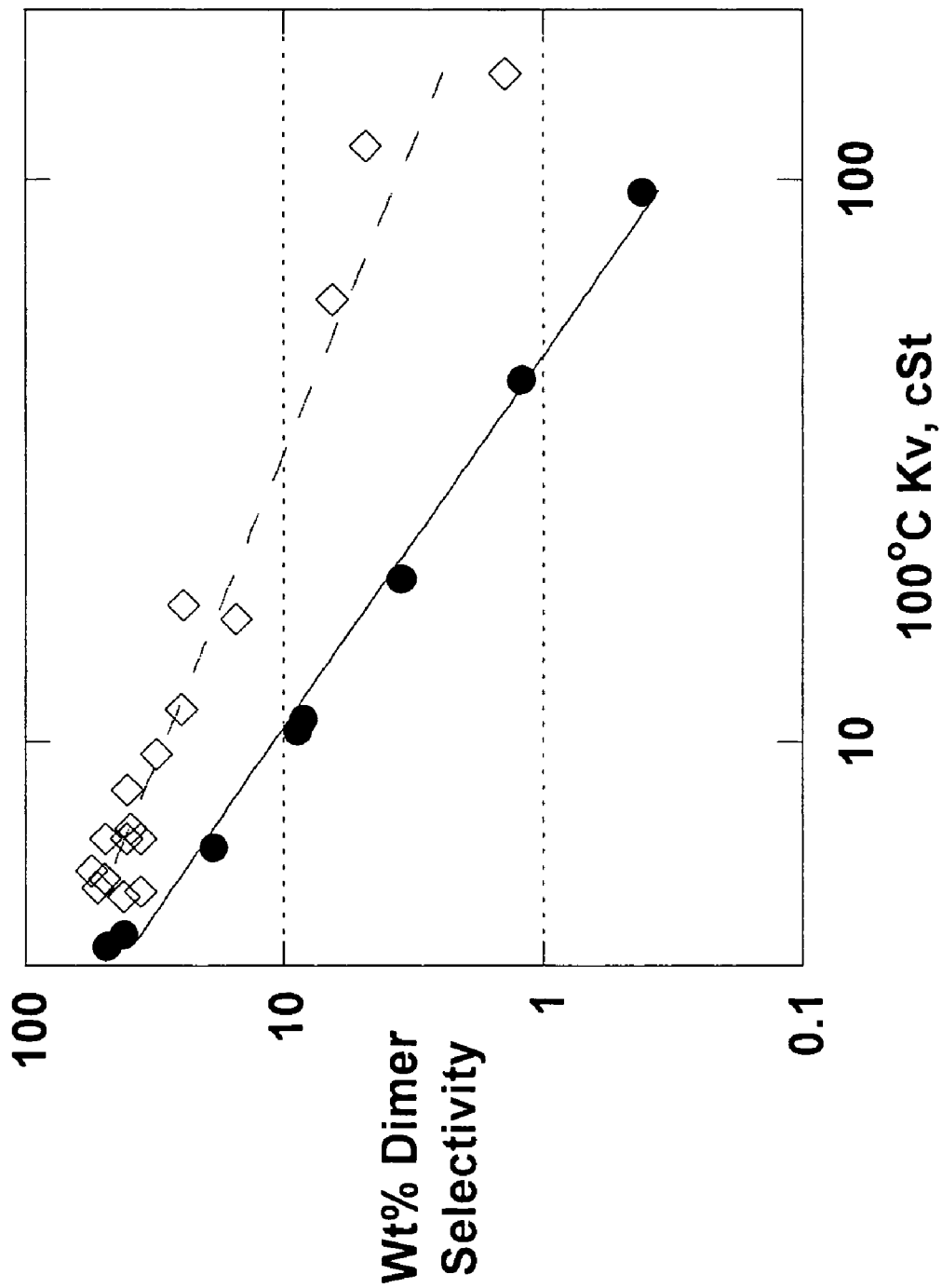
FIG. 2 is a comparison of dimer selectivity of this invention vs. that disclosed in U.S. Pat. No. 6,548,724. ● Dimer selectivity by the present invention, y=350.68*x^(−1.5091)

Comparison of Examples 1-9 of Table 1 versus Comparative Examples 1-13 of Table 2 based on U.S. Pat. No. 6,548,724, demonstrate that the present invention provides very low selectivity to dimer $C_{20}$ throughout the vis range as shown in FIG. 2.

This lower wt % $C_{20}$ is especially pronounced for >20 cSt high viscosity products. Lower selectivity to C20 means high selectivity to lube fraction product, which is more desirable.

The inventive examples consistently produce less than 80% of the amount of dimer from the comparative examples. On average, the amount of dimer by the comparative examples in the prior art is defined by this equation:

(wt % dimer)=231.55×(100° C. Kv in cSt)$^{(-0.90465)}$.

The upper limit upper limit for the wt % dimer in this invention examples is defined by the following equation:

(wt % dimer) is less than or equal to 0.8×[231.55× (100° C. Kv in cSt)$^{(-0.90465)}$.]

By using metallocene with an NCA as a catalyst, Examples 7 to 9 of Table 1 have much higher catalyst productivity, ranging from 4651 to 6477 g product/g catalyst for greater than 20 cSt fluids. In comparison, Examples 10, 12 and 13 of U.S. Pat. No. 6,548,724, which also produced >20 cSt fluids, have much lower catalyst productivity, ranging from 243 to 1197 g total product/g catalyst.

The process of the present invention provides higher catalyst productivity and lower undesirable $C_{20}$ by-product(s) or higher lube yields. Yet, the lube quality is not changed. Data in Table 1 show that Examples 7 through 9 have very high VI, very low pour point and very narrow MWD. Narrow MWD is of interest for superior shear stability. These product properties are comparable to the hi vis products of Examples 10, 12 and 13 in U.S. Pat. No. 6,548,724. The following two graphs (FIG. 3 and FIG. 4) show the comparison of VI and pour point of Examples 1 through 9 of Table 1 versus Comparative Examples 1 through 13 of U.S. Pat. No. 6,548,724.

Preparation of >20 cSt poly-alpha-olefins from 1-butenes 100 grams of pure 1-butene or 1-butene in mixed butenes were charged into a 600-ml autoclave at room temperature, followed by hydrogen when hydrogen was present). The reactor was then heated to reaction temperature. At reaction temperature, the catalyst solution containing all catalyst components (metallocene, activator and triisobutylaluminum scavenger) was added in two to three stages to reactors, so that the reaction temperature was maintained as constant as possible. The reaction was quenched after 16 hours and lube product was isolated in similar a manner as in runs in Table 1. The results of poly-1-butene synthesis are summarized in Table 3. The data demonstrates that the catalyst activities are much greater than 1,200 g product/g of catalyst.

TABLE 3

| | Example No. | | | | | | |
|---|---|---|---|---|---|---|---|
| | 10 | 11 | 12 | 13 | 14 | 15 | 16 |
| Catalyst | A | A | A | A | A | A | A |
| Reaction Temperature, ° C. | 25 | 80 | 50 | 80 | 50 | 35 | 25 |
| H$_2$ Pressure, PSI | 0 | 0 | 0 | 30 | 30 | 30 | 30 |
| microgram metallocene/g 1-C$_4$ | 18.24 | 18.24 | 18.24 | 18.24 | 18.24 | 18.24 | 18.24 |
| Wt % Conversion | 45 | 43 | 60 | 88 | 75 | 27 | 40 |
| Wt % Product Selectivity | | | | | | | |
| light fraction | 0 | 31.1 | 2.0 | 54.1 | 7.2 | 2.3 | 1.4 |
| lube fraction | 100 | 68.9 | 98.0 | 45.9 | 92.8 | 97.7 | 98.6 |
| Lube Properties | | | | | | | |
| 100° C. Kv, cSt | 4864.9 | 9.64 | 177.9 | 9.68 | 56.9 | 429.82 | 1001.8 |
| 40° C. Kv, cSt | | 93.66 | 8110.7 | 94.39 | 1528.3 | 26140 | 78235 |
| VI | | 62 | 92 | 62 | 74 | 111 | 138 |
| Pour Point, ° C. | | −45 | −6 | −32 | −21 | | |
| Bromine number | | 26 | 8.9 | 25.6 | 12.6 | 1.6 | 1.1 |
| Catalyst Productivity | | | | | | | |
| g lube/g catalyst | 8,925 | 5,875 | 11,666 | 7,984 | 13,837 | 5,285 | 7,905 |
| g total product/g catalyst | 8,925 | 8,533 | 11,901 | 17,404 | 14,916 | 5,407 | 8,018 |

TABLE 3-continued

| | Example No. | | | | |
|---|---|---|---|---|---|
| | 17 | 18 | 19 | 20 | 21 |
| Catalyst | B | B | B | B | B |
| Reaction Temperature, °C. | 55 | 40 | 30 | 25 | 20 |
| H2 Pressure, PSI | 0 | 30 | 30 | 30 | 30 |
| microgram metallocene/g 1-C4 | 18.24 | 18.24 | 18.24 | 9.12 | 4.56 |
| Wt % Conversion | 74 | 100 | 99 | 99 | 86 |
| Wt % Pdt Selectivity | | | | | |
| light fraction | 23.9 | 7.8 | 4.3 | 3.4 | 1.6 |
| lube fraction | 76.1 | 92.2 | 95.7 | 96.6 | 98.4 |
| Lube Properties | | | | | |
| 100° C. Kv, cSt | 24.84 | 65.89 | 141.16 | 176.98 | 460.51 |
| 40° C. Kv, cSt | 445.93 | 1772.7 | 6075.9 | 8198.2 | 32759.5 |
| VI | 58 | 81 | 86 | 91 | 106 |
| Pour Point, °C. | −30 | −21 | | | |
| Bromine number | 19.3 | 13.1 | | | |
| Catalyst Productivity | | | | | |
| g lube/g catalyst | 11,259 | 18,367 | 18,781 | 38,164 | 67,112 |
| g total product/g catalyst | 14,795 | 19,921 | 19,623 | 39,487 | 68,203 |

Catalyst A = (1-Me,3-n-PrCp)$_2$ZrMe$_2$,
Catalyst B = (Me$_4$Cp)$_2$ZrCl$_2$,
Activator = N,N-dimethylanilinium tetrakis(perfluorophenyl)borate
Molar ratio of Zr/Activator/Tri-isobutylaluminum = 1/1/160

In a comparison case, a metallocene activated with methylalumoxane (MAO) was used as the catalyst for 1-butene polymerization, similar to the procedure for polymerization of 1-decene used in U.S. Pat. No. 6,548,724. The results are summarized in Table 4.

TABLE 4

Comparative Examples of poly-1-butene by metallocene and MAO catalyst

| | Comparative Example | | | |
|---|---|---|---|---|
| | 14 | 15 | 16 | 17 |
| Catalyst | C | B | B | B |
| temperature, °C. | 35 | 35 | 55 | 80 |
| Lube Property | | | | |
| 100° C. Kv, cSt | 47.83 | 4602 | 1600 | 82.39 |
| 40° C. Kv, cSt | 1195.61 | na | na | 2813.5 |
| VI | 70 | na | na | 80 |
| pour point, °C. | −22 | na | na | −16 |
| M$_w$ | 1760 | 26529 | na | na |
| M$_n$ | 1234 | 10149 | na | na |
| MWD | 1.426 | 2.614 | na | na |

TABLE 4-continued

Comparative Examples of poly-1-butene by metallocene and MAO catalyst

| | Comparative Example | | | |
|---|---|---|---|---|
| | 14 | 15 | 16 | 17 |
| Wt % product selectivity | | | | |
| Light fraction | 22.9 | <1 | 1 | 6.9 |
| lube | 77.1 | 99 | 99 | 93.1 |
| g lube/g of catalyst | 366 | 510 | 492 | 451 | na = not available.
Catalyst B = bis(1,2,3,4-tetramethylcyclopentadienyl)zirconium dichloride
Catalyst C = bis(ethylcyclopentadienyl)zirconium dichloride As the data indicate, this catalyst system has exhibited very low catalyst productivity—in the range of 300 to 500 gram of lube product/g of catalyst. In comparison, the present inventive examples have much higher catalyst productivity, usually greater than 1000 gram lube/g of catalyst.

The poly-1-butenes produced from the present invention Table 3 (Example 10 to 21) also have very different chemical compositions than the poly-1-butene from the comparative examples in Table 4 as analyzed by proton and $^{13}$C NMR. These are summarized in Table 3A and Table 4A respectively.

TABLE 3A

Mole-% of olefinic end group and non-terminal methyl group by H- and C13-NMR in poly-1-butene Examples 10 to 21

| | 10 | 11 | 12 | 13 | 14 | 15 | 16 |
|---|---|---|---|---|---|---|---|
| Lube Properties | | | | | | | |
| 100° C. Kv, cSt | 4865 | 9.64 | 177.9 | 9.68 | 56.9 | 429.8 | 1002 |

TABLE 3A-continued

Mole-% of olefinic end group and non-terminal methyl group by H- and C13-NMR in poly-1-butene Examples 10 to 21

| Olefin Distribution(mole %), by H-NMR | | | | | | | |
|---|---|---|---|---|---|---|---|
| Vinyl | — | — | — | — | — | — | — |
| 1,2-disub | 2.8 | 0.6 | 1.2 | 0.5 | 0.6 | 1.1 | 1.6 |
| tri-sub | 18.9 | 16.3 | 17.2 | 18.8 | 15.1 | 15.6 | 15.7 |
| vinylidene | 78.3 | 83.1 | 81.6 | 80.8 | 84.3 | 83.3 | 82.7 |
| Methyl branches per 1000 carbons | | | | | | | |
| $1B_1$ | 1 | 6 | 0 | 9 | 4 | 2 | 3 |

| | Example No. | | | | |
|---|---|---|---|---|---|
| | 17 | 18 | 19 | 20 | 21 |
| Lube Properties | | | | | |
| 100° C. Kv, cSt | 24.84 | 65.89 | 141.16 | 176.98 | 460.51 |
| Olefin Distribution (mole-%), by $^1$H-NMR | | | | | |
| Vinyl | — | — | — | — | — |
| 1,2-disubstituted | — | — | — | — | — |
| tri-substituted | 19.1 | 16 | 16 | 15.3 | 15.2 |
| vinylidene | 80.9 | 84 | 84 | 84.7 | 84.8 |
| Methyl branches per 1000 carbons | 10 | 5 | 2 | 2 | 2 |

TABLE 4A

Mole % of olefinic end group and non-terminal methyl group by $^1$H- and $^{13}$C-NMR in poly-1-butene of Comparative Examples 14 to 17.

| | Comparative Example | | | |
|---|---|---|---|---|
| | 14 | 15 | 16 | 17 |
| 100° C. Kv, cSt | 47.83 | 4602 | 1600 | 82.39 |
| Olefin Distribution (mole %), by $^1$H-NMR | | | | |
| Vinyl | — | — | — | — |
| 1,2-disubstituted | 4 | — | 0.3 | 0.6 |
| tri-substituted | 7.7 | 38.1 | 52.4 | 61 |
| vinylidene | 88.3 | 61.9 | 47.4 | 38.4 |
| Methyl Group per 1000 Carbons | 4 | 1 | 7 | 16 |

When the amount of mole % vinylidene in the oligomer/polymer is plotted against the Kv at 100° C. in (FIG. 5), it is clear that present invention produces much higher amounts of vinylidene olefin in the product than examples based on competitive teachings. Similarly when the amount of methyl branches per 1000 carbons is plotted against the Kv at 100° C. in (FIG. 6), the present invention has a much lower amount of extra methyl branches than examples shown in the related art. These data all show that the present catalyst systems do not produce extra methyl branches. Extra methyl branches generated in the process usually reduced product VI and increase volatility, which is not as desirable.

Preparation of >20 cSt poly-alpha-olefins from propylene

The reactions were carried out as described above for 1-butene, except propylene was used as the feed. The results are summarized in Table 5. The data demonstrates that using metallocene and an NCA in the presence of hydrogen produces poly-alpha-olefin lube product with high viscosity, high catalyst productivity and good lube properties (high VI and low pour points).

TABLE 5

Polypropylene fluid synthesis and property

| | Example No. | |
|---|---|---|
| | 22 | 23 |
| Reaction Temperature, ° C. | 66 | 51 |
| $H_2$ Pressure, psi | 30 | 30 |
| Wt % Conversion by GC | 97.6 | 96.5 |
| Wt % Product selectivity | | |
| light fraction | 2.3 | 1 |
| lube | 97.7 | 99 |
| total | 100 | 100 |
| Lube Properties | | |
| 100° C. Kv, cSt | 209.58 | 833.57 |
| 40° C. Kv, cSt | 15506.85 | 118502 |
| VI | 73 | 98 |
| $M_w$ | 5428 | 10842 |
| $M_n$ | 2748 | 4707 |
| MWD | 1.975 | 2.303 |
| Catalyst Productivity by GC | | |
| g lube/g catalyst | 20,397 | 20,435 |
| g total product/g catalyst | 20,877 | 20,642 |

Again, these data in Table 5 demonstrated that propylene was converted into performance fluids with good VI, high catalyst productivity and low selectivity to light fractions and high selectivity to lube fractions.

All documents described herein are incorporated by reference herein in their entirety, including any priority documents and/or testing procedures to the extent they are not inconsistent with this specification. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

The invention claimed is:

1. A process to produce a liquid poly-alpha olefin having a $KV_{100}$ of greater than 20 cSt to about 10,000 cSt comprising:
   a) contacting one or more alpha-olefin monomers having 3 to 24 carbon atoms with an unbridged substituted bis (cyclopentadienyl) transition metal compound represented by the formula:

$(Cp)(Cp^*)M^*X_1X_2$ wherein:
   M* is the metal center, and is a Group 4 metal;
   Cp and Cp* are the same or different cyclopentadienyl rings that are each bonded to M, and 1) both Cp and Cp* are substituted with at least one non-hydrogen substituent R group or 2) Cp is substituted with from two to five substituent R groups, each substituent group R being, independently, a radical group which is a hydrocarbyl, substituted hydrocarbyl, halocarbyl, substituted halocarbyl, silylcarbyl or germylcarbyl, or Cp and Cp* are the same or different cyclopentadienyl rings in which any two adjacent R groups are optionally joined to form a substituted or unsubstituted, saturated, partially unsaturated, or aromatic cyclic or polycyclic substituent;
   $X_1$ and $X_2$ are, independently, hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand; and
   a non-coordinating anion activator, and an alkyl-aluminum compound, where the molar ratio of transition metal compound to activator is 10:1 to 0.1:1, and the molar ratio of alkyl aluminum compound to transition metal compound is 1:4 to 4000:1,
   under polymerization conditions wherein:
      i) hydrogen is present at a partial pressure of 0.1 to 300 psi, based upon the total pressure of the reactor or the concentration of the hydrogen is from 1 to 30,000 ppm or less by weight;
      ii) wherein the alpha-olefin monomer(s) having 3 to 24 carbon atoms are present at 10 wt % or more based upon the total wt of the catalyst/activator/alkylaluminum compound solutions, monomers, and any diluents or solvents present in the reaction;
      iii) provided that ethylene is not present at more than 40 wt % of the monomers entering the reactor; and
      iv) the productivity of the process is greater than 4,650 grams of total product per gram of catalyst wherein the grams of catalyst is based on the amount of metal compound and activator; and
   b) obtaining a polyalpha-olefin having a $KV_{100}$ of greater than 20 cSt to about 10,000 cSt, and wherein the polyalpha-olefin has X wt % dimer or less, where X wt %=$0.8 \times [231.55 \times (\text{fluid Kv in cSt at } 100° C)^{(-0.9046)}]$.

2. The process of claim 1 wherein both Cp and Cp* are substituted with at least one non-isoalkyl substituent where the isoalkyl substituent is defined as $—CH(R^*)_2$, wherein each R* independently is a C1 to C20 alkyl group.

3. The process of claim 1 wherein M* is titanium, zirconium or hafnium.

4. The process of claim 1 wherein both Cp and Cp* are substituted with from two to five non-hydrogen substituents.

5. The process of claim 1 wherein the transition metal compound is an unbridged substituted bis(cyclopentadienyl) transition metal compound represented by the formula:

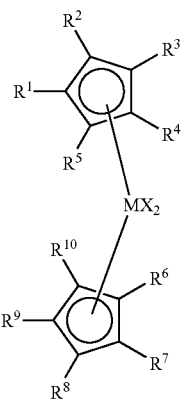

where M is a Group 4 metal;
each X is, independently, is hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from 3 to 20 carbon atoms; or both X together can be an olefin, diolefin or aryne ligand;
$R^1$ to $R^{10}$ are each independently, a radical group which is a hydrogen, a heteroatom, hydrocarbyl, substituted hydrocarbyl, halocarbyl, substituted halocarbyl, provided that at least one of $R^1$ to $R^5$ is not hydrogen and at least one of $R^6$ to $R^{10}$ is not hydrogen and where any two adjacent R groups are optionally joined to form a substituted or unsubstituted, saturated, partially unsaturated, or aromatic cyclic or polycyclic substituent.

6. The process of claim 5 wherein M is titanium, zirconium or hafnium.

7. The process of claim 5 wherein each X is a C1 to C20 hydrocarbyl, or a halogen.

8. The process of claim 7 wherein the hydrocarbyl is a methyl, ethyl, propyl, isopropyl, butyl, isobutyl, hexyl, octyl, decyl, or dodecyl group or the halogen is chloride or bromide.

9. The process of claim 5 wherein $R^1$ to $R^{10}$ are selected from hydrogen, a C1 to C30 hydrocarbyl, a substituted C1 to C30 hydrocarbyl, or a heteroatom.

10. The process of claim 5 provided that 1) at least one of $R^1$ to $R^5$ is not hydrogen and is a non-isoalkyl substitutent and at least one of $R^6$ to $R^{10}$ is not hydrogen and is a non-isoalkyl substitutent or 2) at least two of $R^1$ to $R^5$ are not hydrogen, or 3) at least two of $R^1$ to $R^5$ are not hydrogen and at least two of $R^6$ to $R^{10}$ are not hydrogen.

11. The process of claim 10 wherein all of $R^1$ to $R^{10}$ are not hydrogen.

12. The process of claim 5 wherein when one of $R^1$ to $R^5$ is an isoalkyl, then at least one other of $R^1$ to $R^5$ is not hydrogen and if one of $R^6$ to $R^{10}$ is an isoalkyl, then at least one other of $R^6$ to $R^{10}$ is not hydrogen.

13. The process of claim 5 wherein none of $R^1$ to $R^{10}$ are isoalkyl groups.

14. The process of claim 5 wherein two adjacent R groups form one of an indenyl, tetrahydroindenyl, substituted indenyl, substituted tetrahydroindenyl, fluorenyl or substituted fluorenyl group.

15. The process of claim 1 wherein the temperature in the reaction zone does not rise by more than 20° C. during the reaction.

16. The process of claim 1 wherein the poly-alpha olefin has a pour point of 10° C. or less.

17. The process of claim 1 wherein the temperature in the reaction zone does not rise by more than 10° C. during the reaction.

18. The process of claim 1 wherein the temperature in the reaction zone does not rise by more than 5° C. during the reaction.

19. The process of claim 1 wherein the poly-alpha olefin has a pour point of 10° C. or less.

20. The process of claim 1 wherein the temperature in the reaction zone does not rise by more than 3° C. during the reaction.

21. The process of claim 1 wherein the polyalpha-olefin has an Mw/Mn of between 1 and 3.5.

22. The process of claim 1 wherein the polyalpha-olefin has a Bromine number of 1.8 or more.

23. The process of claim 1 wherein the polyalph-olefin has kinematic viscosity at 100° C. of less than 3000 cSt and a vinylidene content of greater than 50 mole %.

24. The process of claim 1 wherein the polyalph-olefin has a methyl content of X or less, where X=−3.4309Ln(Kv at 100° C. in cSt) +29.567.

25. The process of claim 1 wherein the polyalpha-olefin has a kinematic viscosity at 100° C. of 30 to 5,000 cSt.

26. The process of claim 1 further comprising the step of obtaining the polyalpha-olefin and thereafter hydrogenating the polyalpha-olefin, wherein the polyalpha-olefin comprises at least 50 mole % of at least one or more of C3 to C24 alpha-olefin monomers and the hydrogenated product has bromine number of less than 1.8.

27. The process of claim 1 wherein the polyalpha-olefin has a kinematic viscosity at 40° C. of from 50 to 100,000 cSt.

28. The process of claim 1 wherein the polyalpha-olefin has a viscosity index of 50 or more.

29. The process of claim 1 wherein the polyalpha-olefin has a viscosity index of 100 to 450.

30. The process of claim 1 wherein the polyalpha-olefin has a weight average molecular weight of 250 to 200,000 g/mol.

31. The process of claim 1 wherein the monomers having 3 to 24 carbon atoms are present at 60 wt % or more.

32. The process of claim 1 wherein the polyalpha-olefin(s) are selected from the group consisting of propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 1- uneicosene, 1-docosene, 1-tricosene, 1-tetracosene, 1-pentacosene, 1-hexacosene, 4-methyl-1-pentene, 4-phenyl-1-butene, and 5-phenyl-1-pentene.

33. The process of claim 1 wherein the polyalpha-olefin has a flash point of 150° C. or more.

34. The process of claim 1 wherein the polyalpha-olefin has a specific gravity of 0.6 to 0.9 g/cm³.

35. The process of claim 1 wherein the product produced has 40 wt % or less C10 dimer.

36. The process of claim 1 wherein the product produced has 60 wt % or less C10 dimer.

37. The process of claim 1 wherein ethylene, propylene and butene monomers are present at less than 1 weight %.

38. The process of claim 1 wherein propylene and/or butene monomers are present at least 1 weight %.

39. The process of claim 1 wherein the temperature in the reactor is from −10° C. to 250° C.

40. The process of claim 1 wherein the temperature in the reactor is from 30° C. to 100° C.

41. The process of claim 1 wherein ethylene is present in less than 30 wt %.

42. The process of claim 1 where in the polyalpha-olefin is contacted with hydrogen and a hydrogenation catalyst selected from the group consisting of supported Group 7, 8, 9, and 10 metals.

43. The process of claim 1 wherein the polyalpha-olefin is contacted with hydrogen and a hydrogenation catalyst selected from the group consisting of one or more of Ni, Pd, Pt, Co, Rh, Fe, Ru, Os, Cr, Mo, and W, supported on silica, alumina, clay, titania, zirconia, mesoporous material, MCM141 or mixed metal oxide supports.

44. The process of claim 1 wherein the polyalpha-olefin is contacted with hydrogen and a hydrogenation catalyst at a temperature from 25 to 350° C.

45. The process of claim 1 further comprising
 1) optionally treating the polyalpha-olefin to reduce heteroatom containing compounds to less than 600 ppm,
 2) optionally separating the polyalpha-olefins from solvents or diluents and other lighter product fractions;
 3) contacting the polyalpha-olefin with hydrogen and a hydrogenation catalyst; and
 4) obtaining a polyalpha-olefin having a bromine number less than 1.8.

46. The process of claim 45 wherein the polyalpha-olefin is treated to remove heteroatom containing compounds prior to contacting with the hydrogen and or the hydrogenation catalyst.

47. The process of claim 46 wherein the treated polyalpha-olefin comprises 100 ppm of heteroatom containing compounds or less.

48. The process of claim 1 wherein the process is semi-continuous.

49. The process of claim 1 where scavenger is present and comprises methylalumoxane and or modified methylalumoxane.

50. The process of claim 1 wherein the non-coordinating anion activator comprises one or more of N,N-dimethylanilinium tetrakis(pentafluorophenyl)borate, N,N-dialkylphenylanilinium tetrakis(pentafluorophenyl)borate, trityl tetrakis(pentafluorophenyl)borate, tris(pentafluorophenyl)boron, tri-alkylammonium tetrakis(pentafluorophenyl)borate, tetra-alkylammonium tetrakis(pentafluorophenyl)borate, N,N-dimethylanilinium tetrakis(perfluoronapthyl)borate, N,N-dialkylphenylanilinium tetrakis (perfluoronapthyl)borate, trityl tetrakis (perfluoronapthyl)borate, tris(perfluoronapthyl)boron, tri-alkylammonium tetrakis (perfluoronapthyl)borate, tetra-alkylammonium tetrakis (perfluoronapthyl)borate.

51. The process of claim 50 wherein the alkyl groups are C1 to C18 alkyl groups.

52. The process of claim 1 wherein the transition metal compound comprises one or more of:
 bis(1,2,4-trimethylcyclopentadienyl)zirconium dichloride;
 bis(1,3-dimethylcyclopentadienyl)zirconium dichloride;
 bis(1,2,3-trimethylcyclopentadienyl)zirconium dichloride;
 bis(1,2,3,4-tetrahydroindenyl)zirconium dichloride;
 bis(tetramethylcyclopentadienyl)zirconium dichloride;

bis(pentamethylcyclopentadienyl)zirconium dichloride;
bis(indenyl)zirconium dichloride;
bis(1,2,4-trimethylcyclopentadienyl)zirconium dimethyl;
bis(1,2,3-trimethylcyclopentadienyl)zirconium dimethyl;
bis(1,3-dimethylcyclopentadienyl)zirconium dimethyl;
bis(tetramethylcyclopentadienyl)zirconium dimethyl;
bis(pentamethylcyclopentadienyl)zirconium dimethyl; or
bis(1,2,3,4-tetrahydroindenyl)zirconium dimethyl.

53. The process of claim 1 wherein solvent or diluent is present.

54. The process of claim 53 wherein the solvent or diluent is selected from the group consisting of propane, butanes, 2-butenes, iso-butene, pentanes, hexanes, heptanes, octanes, nonanes, decanes, undecanes, dodecanes, tridecanes, tetradecanes, pentadecanes, hexadecanes, benzene, toluene, o-xylene, m-xylene, p-xylene, mixed xylenes, ethylbenzene, isopropylbenzene, and n-butylbenzene.

55. The process of claim 1 wherein catalyst residue is removed from the product by contacting with a solid sorbent.

56. The process of claim 1 wherein an alkylaluminum compound is present and the alkylaluminum compound is represented by the formula: $R'_3Al$, where each R' is, independently, selected from the group consisting of methyl, ethyl, n-propyl, iso-propyl, iso-butyl, n-butyl, t-butyl, n-pentyl, iso-pentyl, neopentyl, n-hexyl, iso-hexyl, n-heptyl, iso-heptyl, n-octyl, iso-octyl, n-nonyl, n-decyl, n-undecyl, n-dodecyl, n-tridecyl, n-tetradecyl, n-pentadecy, n-hexadecyl, n-heptadecyl, n-octadecyl, and their iso-analogs.

57. The process of claim 1 wherein the process is a continuous process.

58. The process of claim 1 wherein the process is a continuous process comprising:
    a) continuously introducing a feed stream comprising at least 10 wt % of the one or more C3 to C24 alpha-olefins into a reactor,
    b) continuously introducing the transition metal compound and the activator into the reactor,
    c) optionally continuously introducing co-activator into the reactor, and
    d) continuously withdrawing the polyalpha-olefin from the reactor.

59. The process of claim 58 further comprising maintaining a concentration of hydrogen in the reactor of 20,000 ppm or less by weight.

60. The process of claim 58 wherein the process further comprises:
    1) optionally, continuously treating the polyalpha-olefin to reduce heteroatom containing compounds to less than 600 ppm,
    2) optionally, continuously fractionating the polyalpha-olefin to separate the light and heavy fractions, where the heavy fractions have 20 or more carbons,
    3) continuously contacting the polyalpha-olefin with hydrogen and a hydrogenation catalyst,
    4) continuously obtaining a polyalpha-olefin having a bromine number less than 1.8.

61. The process of claim 1 wherein the monomers, metallocene and activator are contacted for a residence time of 5 minutes to 100 hours.

62. The process of claim 1 wherein the monomers are contacted with the transition metal compound and the activator in a reactor and the reactor is a continuous stirred tank reactor.

63. The process of claim 1 where the monomers are contacted with the transition metal compound and the activator in the solution phase.

64. The process of claim 1 where the monomers are contacted with the transition metal compound and the activator in the slurry phase.

65. The process of claim 1 wherein the monomers are contacted with an alkylaluminum compound prior to being introduced into the reactor.

66. The process of claim 1 where the metallocene and or activator are combined with an alkylaluminum compound prior to entering the reactor.

67. The process of claim 1 wherein the process further comprises:
    1) catalyst residual is removed from the polyalpha-olefin by contacting the polyalpha-olefin with a solid sorbent,
    2) optionally, treating the polyalpha-olefin to reduce heteroatom containing compounds to less than 600 ppm,
    3) fractionating the polyalpha-olefin to separate the light and heavy fractions, where the heavy fractions have 20 or more carbons,
    4) contacting the polyalpha-olefin with hydrogen and a hydrogenation catalyst, and
    5) obtaining a polyalpha-olefin having a bromine number less than 1.8.

68. The process of claim 1 wherein the liquid polyalpha-olefin product has less than 40 mole % of mm or rr triads.

69. The process of claim 1 wherein the liquid polyalpha-olefin product has 50 mole % or more of mr triads.

* * * * *